(12) United States Patent
Eda

(10) Patent No.: US 11,628,361 B2
(45) Date of Patent: *Apr. 18, 2023

(54) COMPUTER CONTROL METHOD, CONTROL PROGRAM AND COMPUTER

(71) Applicant: GREE, INC., Tokyo (JP)

(72) Inventor: Taiki Eda, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,810

(22) Filed: May 24, 2019

(65) Prior Publication Data

US 2019/0275427 A1    Sep. 12, 2019

Related U.S. Application Data

(63) Continuation of application No. 15/393,646, filed on Dec. 29, 2016, now Pat. No. 10,398,978, which is a
(Continued)

(30) Foreign Application Priority Data

Sep. 27, 2013    (JP) .................................. 2013-202721
Apr. 9, 2014     (JP) .................................. 2014-080554

(51) Int. Cl.
*A63F 9/24*      (2006.01)
*A63F 13/537*    (2014.01)
(Continued)

(52) U.S. Cl.
CPC ............ *A63F 13/537* (2014.09); *A63F 13/31* (2014.09); *A63F 13/55* (2014.09); *A63F 13/63* (2014.09); *A63F 13/822* (2014.09); *A63F 13/92* (2014.09)

(58) Field of Classification Search
USPC ....................................................... 463/29–42
See application file for complete search history.

(56) References Cited

U.S. PATENT DOCUMENTS 4,422,639 A    12/1983  Del Principe et al.
5,472,191 A    12/1995  Hendricks
(Continued)

FOREIGN PATENT DOCUMENTS

DE    60035382 T2    10/2007
EP       1040855 A2  10/2000
(Continued)

OTHER PUBLICATIONS

Office Action for corresponding JP Application No. 2015-022433 dated Feb. 23, 2016 (3 pages) (with English Translation).
(Continued)

*Primary Examiner* — Masud Ahmed
(74) *Attorney, Agent, or Firm* — Oblon, McClelland, Maier & Neustadt, L.L.P.

(57) ABSTRACT

Provided is a method for controlling a computer, etc., which makes it possible to improve the usability of city building games. The computer is provided with a storage unit configured to store game contents arranged within a game space, positions of the game contents, and a template defining positions of one or more of game contents, and progresses a game by arranging the game contents within the game space based on a command by a player. The method includes when the template is applied to a predetermined area within the game space based on the command by the player, moving, by the computer, the game contents arranged within the game space to the positions of the game contents defined by the template.

18 Claims, 15 Drawing Sheets

Related U.S. Application Data continuation of application No. 14/983,984, filed on Dec. 30, 2015, now Pat. No. 9,597,594, which is a continuation of application No. PCT/JP2014/075673, filed on Sep. 26, 2014.

(51) Int. Cl.
| | |
|---|---|
| A63F 13/822 | (2014.01) |
| A63F 13/63 | (2014.01) |
| A63F 13/92 | (2014.01) |
| A63F 13/55 | (2014.01) |
| A63F 13/31 | (2014.01) |

(56) References Cited

U.S. PATENT DOCUMENTS

| | | |
|---|---|---|
| 6,398,646 B1 | 6/2002 | Wei et al. |
| 6,454,653 B1 | 9/2002 | Kawazu |
| 7,628,704 B1 | 12/2009 | Uhlir |
| 7,708,641 B2 | 1/2010 | Tawara |
| 7,921,136 B1 | 4/2011 | Shuman |
| 7,967,678 B2 | 6/2011 | Dougherty et al. |
| 8,029,348 B2 | 10/2011 | Suzuki |
| 8,128,498 B2 | 3/2012 | Aguilar, Jr. et al. |
| 8,145,702 B2 | 3/2012 | Patterson |
| 8,206,224 B2 | 6/2012 | Farone et al. |
| 8,376,857 B1 | 2/2013 | Shuman |
| 8,734,254 B2 | 5/2014 | Aguilar, Jr. et al. |
| 8,764,534 B1* | 7/2014 | DeSanti .............. A63F 13/335 463/31 |
| 8,821,260 B1* | 9/2014 | DeSanti ................ A63F 13/69 463/25 |
| 8,827,788 B2 | 9/2014 | Takagi et al. |
| 8,845,423 B1* | 9/2014 | Monahan .............. A63F 13/00 463/29 |
| 9,022,869 B1* | 5/2015 | DeSanti ............. G07F 17/3225 463/42 |
| 9,079,105 B2 | 7/2015 | Kim et al. |
| 9,272,208 B1 | 3/2016 | LeTourneau et al. |
| 9,517,403 B1 | 12/2016 | Kim et al. |
| 9,597,594 B2 | 3/2017 | Eda |
| 9,891,799 B2 | 2/2018 | Nishida |
| 10,076,708 B2 | 9/2018 | Yoshikawa et al. |
| 10,300,385 B2 | 5/2019 | Eda |
| 10,307,677 B2 | 5/2019 | Eda |
| 10,307,675 B2 | 6/2019 | Eda |
| 10,307,678 B2 | 6/2019 | Eda |
| 10,307,876 B2 | 6/2019 | Eda |
| 10,328,346 B2 | 6/2019 | Atobe |
| 10,328,347 B2 | 6/2019 | Eda |
| 10,335,682 B2 | 7/2019 | Eda |
| 10,335,683 B2 | 7/2019 | Eda |
| 10,335,689 B2 | 7/2019 | Wada et al. |
| 10,398,978 B2 | 9/2019 | Eda |
| 10,413,832 B2 | 9/2019 | Yoshikawa et al. |
| 2003/0020239 A1 | 1/2003 | Hagen et al. |
| 2003/0177187 A1 | 9/2003 | Levine et al. |
| 2004/0030556 A1 | 2/2004 | Bennett et al. |
| 2004/0242293 A1 | 12/2004 | McWilliams |
| 2005/0202861 A1 | 9/2005 | Dougherty et al. |
| 2005/0202862 A1 | 9/2005 | Shuman et al. |
| 2007/0087827 A1 | 4/2007 | Hirota |
| 2007/0105626 A1 | 5/2007 | Cho et al. |
| 2007/0265091 A1 | 11/2007 | Aguilar, Jr. et al. |
| 2007/0298886 A1 | 12/2007 | Aguilar, Jr. et al. |
| 2008/0078758 A1 | 4/2008 | Shimura |
| 2008/0161111 A1 | 7/2008 | Schuman |
| 2008/0207306 A1 | 8/2008 | Higbie |
| 2008/0294782 A1 | 11/2008 | Patterson |
| 2009/0163272 A1 | 6/2009 | Baker et al. |
| 2010/0015579 A1 | 1/2010 | Schlabach |
| 2010/0130285 A1* | 5/2010 | Luciano, Jr. ......... G07F 17/323 463/30 |
| 2010/0160039 A1* | 6/2010 | Nathan .................. A63F 13/12 463/31 |
| 2010/0227682 A1* | 9/2010 | Reville .................. A63F 13/12 463/29 |
| 2010/0295702 A1 | 11/2010 | Zhao et al. |
| 2011/0319170 A1* | 12/2011 | Shimura ............... H04W 4/203 463/42 |
| 2012/0021835 A1 | 1/2012 | Keller et al. |
| 2012/0090021 A1* | 4/2012 | Luh ......................... G06F 9/468 726/17 |
| 2012/0122570 A1 | 5/2012 | Baronoff |
| 2012/0295702 A1* | 11/2012 | Otero ...................... A63F 13/77 463/31 |
| 2013/0060362 A1 | 3/2013 | Murphy et al. |
| 2013/0138590 A1 | 5/2013 | Huke et al. |
| 2013/0217489 A1* | 8/2013 | Bronstein Bendayan ................... A63F 13/12 463/31 |
| 2013/0288757 A1* | 10/2013 | Guthridge ............... A63F 13/12 463/2 |
| 2014/0066199 A1 | 3/2014 | Takagi et al. |
| 2014/0164921 A1 | 6/2014 | Salinas |
| 2015/0005051 A1* | 1/2015 | Smalley ................ A63F 13/792 463/25 |
| 2016/0107085 A1 | 4/2016 | Eda |
| 2017/0106287 A1 | 4/2017 | Eda |
| 2017/0296923 A1 | 10/2017 | Eda |
| 2017/0296924 A1 | 10/2017 | Eda |
| 2017/0296925 A1 | 10/2017 | Eda |
| 2019/0351326 A1 | 11/2019 | Eda |
| 2020/0135049 A1 | 4/2020 | Atencio et al. |

FOREIGN PATENT DOCUMENTS

| | | |
|---|---|---|
| EP | 1082984 A2 | 3/2001 |
| EP | 1 574 238 A1 | 9/2005 |
| EP | 2 444 134 A1 | 4/2012 |
| JP | 2000-279637 A | 10/2000 |
| JP | 2001-079269 | 3/2001 |
| JP | 2002-052249 A | 2/2002 |
| JP | 2002-143555 | 5/2002 |
| JP | 2002-143555 A | 5/2002 |
| JP | 2002-292135 | 10/2002 |
| JP | 2007-215757 | 8/2007 |
| JP | 2007-215757 A | 8/2007 |
| JP | 2007-296199 A | 11/2007 |
| JP | 2009-207624 A | 9/2009 |
| JP | 2009-207624 A | 9/2009 |
| JP | 2009-233098 A | 10/2009 |
| JP | 2009-247474 A | 10/2009 |
| JP | 2010-125023 | 6/2010 |
| JP | 2010-125023 A | 6/2010 |
| JP | 2010-125023 A | 6/2010 |
| JP | 2010-125222 | 6/2010 |
| JP | 2011-000170 A | 1/2011 |
| JP | 2011-142997 | 7/2011 |
| JP | 2011-161042 A | 8/2011 |
| JP | 2012-61024 | 3/2012 |
| JP | 2012-065831 | 4/2012 |
| JP | 5042200 B2 | 10/2012 |
| JP | 2013-165747 | 8/2013 |
| JP | 5270022 B1 | 8/2013 |
| JP | 5525096 | 4/2014 |
| JP | 5676032 B | 1/2015 |
| JP | 2015-066141 A | 4/2015 |
| WO | WO 2011/125265 A1 | 10/2011 |

OTHER PUBLICATIONS

Monster Hunter Frontier Online, Frontier Communication Forward. 3, Enterbrain, Inc., Feb. 15, 2012 p. 126 (with partial English translation).

The Convenience Store 2—Chain Store Development Throughout Japan—Game Winning Method Futabasha Publishers Ltd., Apr. 15, 1998, pp. 11-14, Sections for "Read Interior" and "Save Interior" (with partial English translation).

The Convenience Store DS, 1$^{st}$ Edition, Shinkigensha Co., Ltd.,Dec. 4, 2008, pp. 14-35 (with partial English translation).

(56) References Cited

OTHER PUBLICATIONS

Dengeki Play Station, Phantasy Star Online 2, vol. 19, ASCII Media Works Corporation, No. 21, Jun. 27, 2013, pp. 116-119, section "My Room Function, Layout Pattern Switching". (with partial English translation).
Decision of Admiral, Super Guide book, Fifth Edition, Koei Co., Ltd, Mar. 25, 1993, pp. 8-9, section "Scenario Selection Screen" (with partial English translation).
Office Action for corresponding JP Application No. 2015-123316, dated Oct. 7, 2016 (2 pages) (with English translation).
Nobunyaga No Yabou, Nekobukan, Koei Tecmo Games Co., Ltd., Jan. 27, 2012, Second printing, pp. 111 and 126.
Office Action for corresponding JP Application No. 2015-160034 dated Mar. 1, 2016 (4 pages). (with English translation).
Office Action for corresponding JP Application No. 2015-160035 dated Mar. 1, 2016 (6 pages). (with English translation).
Office Action for corresponding JP Application No. 2015-160035 dated May 17, 2016 (6 pages). (with English translation).
Office Action for corresponding JP Application No. 2015-160036 dated Mar. 1, 2016 (9 pages). (with English translation).
Office Action for corresponding JP Application No. 2015-160038 dated Mar. 1, 2016 (6 pages). (with English translation).
Office Action for corresponding JP Application No. 2015-160038 dated May 17, 2016 (2 pages). (with English translation).
Nobunyaga No Yabou, Nekobukan, Koei Tecmo Games Co., Ltd., Jan. 27, 2012, Second printing, pp. 112 and 113.
Nobunaga No Yabou/Tendou Handbook the second volume, Koei Co., Ltd., Nov. 1, 2009, First printing, pp. 60 and 61.
International Search Report for corresponding international application No. PCT/JP2014/075673; dated Oct. 21, 2014 (3 pages) (with English translation).
Final Rejection for corresponding JP Application No. 2015-123316 dated Sep. 30, 2015 (5 pages) (with English translation).
Office Action for corresponding JP Application No. 2015-123331 dated Jul. 6, 2015 (5 pages). (with English Translation).
Office Action for corresponding JP Application No. 2015-160032 dated Sep. 30, 2015 (13 pages). (with English Translation).
Office Action for corresponding JP Application No. 2015-160033 dated Oct. 5, 2015 (15 pages). (with English Translation).
Office Action for corresponding JP Application No. 2015-160034 dated Oct. 5, 2015 (13 pages). (with English Translation).
Office Action for corresponding JP Application No. 2015-160035 dated Sep. 30, 2015 (15 pages). (with English Translation).
Office Action for corresponding JP Application No. 2015-160036 dated Sep. 30, 2015 (15 pages). (with English Translation).
Office Action for corresponding JP Application No. 2015-160037 dated Sep. 30, 2015 (16 pages). (with English Translation).
Office Action for corresponding JP Application No. 2015-160038 dated Sep. 30, 2015 (15 pages). (with English Translation).
Office Action for corresponding JP Application No. 2015-123316 dated Jul. 6, 2015 (10 pages). (with English Translation).
Office Action for corresponding JP Application No. 2014-080554 dated Sep. 9, 2015 (4 pages). (with English Translation).
Office Action for corresponding JP Application No. 2014-080554 dated Jun. 19, 2014 (9 pages). (with English Translation).
Office Action for corresponding JP Application No. 2013-202721 dated Nov. 21, 2013 (7 pages). (with English Translation).
Office Action for corresponding JP Application No. 2014-259251 dated Mar. 6, 2015 (7 pages). (with English Translation).
Konami Official Guide for World Soccer Winning Eleven 2000 U-23, Konami Co., Ltd., on Dec. 8, 2000, Second Printing, p. 019.
Capcom, Jun. 19, 2007, Monster Hunter Frontier G, PC version, online manual, [Jun. 9, 2014 search], interface Netto <URL: http://cog-members.mhf-g.jp/sp/manual/page164.html # bf2e27ce883c8ca097adc4a41 f114562>.
A—Train7 Official Expert Guidebook—Simulation Game, Railroad Management, Urban Development, published Mar. 22, 2006 (with English translation).
A—Train9 Version 2.0 Professional Edition—Official Guidebook, published Dec. 19, 2012. (with English translation).

Frontier communication—Monster Hunter Frontier Online Forward. 3, published Feb. 15, 2012.
https://en.wikipedia.org/w/index.php?title=SimCity&oldid=572690969.
https://en.wikipedia.org/w/index.php?title=Clash of Clans&oldid=572472971.
PC Game Review of Medieval Lords, Aug. 2005. URL: http://game.watch.impress.co.jp/docs/20050801/medieval.htm (with English Translation).
Partial Supplementary European Search Report Application No. 14848832.3, dated Apr. 19, 2017; 8 pgs.
Singapore Office Action in Application No. 11201602230Q dated Jun. 15, 2017; 11 pgs.
Patent Owner's Response submitted Jul. 3, 2018 in case No. PGR2018-00008 of U.S. Pat. No. 9,597,594.
Japanese Office Action dated Feb. 27, 2018 in JP Application No. 2015-248965 (with English translation), 7 pgs.
European Search Report dated Jul. 28, 2017 issued in European Patent Application No. 14848832.3, 16 pgs.
Declaration of David Crane submitted Jul. 3, 2018 in case No. PGR2018-00008 of U.S. Pat. No. 9,597,594.
Office Action dated Oct. 9. 2018, in European Patent Application No. 14848832.3 (6 pgs.).
Patent Owner's Sur-Reply submitted Oct. 24, 2018 in case No. PGR-2018-00008 of U.S. Pat. No. 9,597,594.
Chinese Office Action dated Feb. 2, 2019 in Patent Application No. 201480052507.X (w/English-language translation).
Final Written Decision entered Jan. 2, 2019 in case No. PGR-2018-00008 of U.S. Pat. No. 9,597,594.
Decision on Request for Rehearing dated May 10, 2019; Paper No. 46, in case No. PGR2018-00008 of U.S. Pat. No. 9,597,594 B2; (8 pgs).
Patent Owner's Notice of Appeal, dated May 10, 2019; in case No. PGR2018-00008 of U.S. Pat. No. 9,597,594 B2; (6 pgs).
European Examination Report Application No. 14 848 832.3 dated Jan. 17, 2019.
Petitioner's Request for Rehearing and Reconsideration PGR2018-00008 dated Feb. 1, 2019.
Japanese Office Action dated Feb. 5, 2019 in Patent Application No. 2018-182989, (with English-language translation).
"Armored core" and weekly FAMI—a connoisseur, and ENTA, Inc. brain, Feb. 9, 2012 and the $27^{th}$ volume (with partial E English Translation).
Japanese Office Action dated Oct. 30, 2018 in Patent Application No. 2018-192989, (with English translation).
"How to Create StarCraft 2 Custom Map": captured by Wayback Machine, printed Oct. 18, 2018; https://web.archive.org/web/20130307210601/http://segmentnext.com:80/2010/10/14/how-to-create-starcraft-2-custom-map/, 5 pgs.
Office Action for corresponding JP application No. 2016-255511, dated Apr. 25, 2017, 15 pgs. (w/English translation).
Office Action for corresponding JP application No. 2016-255512, dated Apr. 25, 2017, 12 pgs. (w/English translation).
Taku Yamazaki, et al.; Super Family Computer Fire Emblem: Lineage of Crusades Walkthrough Guide Book, T2 Publishing Co., Ltd., Jul. 20, 1996, $2^{nd}$ impression, 5 pgs.
V Jump Books Game Series: Final Fantasy Tactics, Shueisha, Inc., Jan. 18, 1998, $3^{rd}$ impression, 5 pgs.
"Wikia, Clash of Clans WiKi Navigation", captured by Wayback Machine, submitted Jul. 27, 2017, 4 pages.
Declaration of Tommi Suvinen, submitted Sep. 14, 2017 in Case No. H29 YO 22046 of JP U.S. Pat. No. 5676032, 56 pages.
Declaration of Marika Appel, submitted Sep. 14, 2017 in Case No. H29 YO 22046 of JP U.S. Pat. No. 5676032, 41 pages.
"Mastermind's In-Game Builder idea (with LOADS of pictures!)", captured by Wayback Machine, printed Sep. 11, 2017, https://web.archive.org/web/20130915081112/http://forum.supercell.net:80/showthread.php/149687-Mastermind-s-In-Game-Builder-Idea-(with-LOADS-of-picutresI), 16 pages.
"Thread: Mastermind's In-Game Builder idea (with LOADS of pictures!)", captured by Wayback Machine, submitted Sep. 15,

(56) References Cited

OTHER PUBLICATIONS 2017, http://forum.supercell.net:80/showthread.php/149687-Mastermind-s-In-Game-Builder-Idea-(with-LOADS-of-picutres!), 13 pages.
"Mastermind's In-Game Builder idea (with LOADS of pictures!)", captured by Wayback Machine, printed Sep. 12, 2017. https://forum.supercell/com/showthread.php/149687-Mastermind-s-In-Game-Builder-Ideas-(with-LOADS-of-picutres!), 13 pages.
Takeo Nasu, A Report on Operation Check of Hotel Giants 2, submitted Oct. 17, 2017 in Case No. H29 YO 22046 of JP Patent No. 5676032, 8 pages.
Shinya Kamata, A Report on Operation Check of Winning Eleven 2011, submitted Oct. 17, 2017 in Case No. H29 YO 22046 of JP Patent No. 5676032, 7 pages.
Declaration of Sean Olesiuk, submitted Dec. 14, 2017 in Case No. H29 YO 22046 of JP Patent No. 5676032, 63 pages.
Takeo Nasu, A Report on Operation Check of Hotel Giants 2 ver.2, submitted Jan. 26, 2018 in Case No. H29 YO 22046 of JP Patent No. 5676032, 4 pages.
"StarCraft II: Wings of Liberty, Overview", captured by Wayback Machine, submitted Sep. 15, 2017, http://gamewaise.co/games/36254/ StarCraft-II-Wings-of-Liberty/Overview, 2 pages.
"StarCraft II: Wings of Liberty, Gameplay", captured by Wayback Machine. submitted Sep. 15, 2017, http://gamewaise.co/games/36254/ StarCraft-II-Wings-of-Liberty/Gameplay, 2 pages.
"StarCraft II: Wings of Liberty, Marine", captured by Wayback Machine, submitted Sep. 15, 2017, http://gamewaise.co/games/36254/ StarCraft-II-Wings-of-Liberty/Units/Terran/Marine, 3 pages.
"StarCraft II: Wings of Liberty, Structures", captured by Wayback Machine, submitted Sep. 15, 2017, https://gamewaise.co/games/36254/ StarCraft-II-Wings-of-Liberty/Structures, 2 pages.
"StarCraft II: Wings of Liberty, Terran", captured by Wayback Machine, submitted Sep. 15, 2017, http://gamewaise.co/games/36254/ StarCraft-II-Wings-of-Liberty/Structures/Terran, 2 pages.
"StarCraft II: Wings of Liberty, Missile Turret", captured by Wayback Machine, submitted Sep. 15, 2017, http://gamewaise.co/games/36254/ StarCraft-II-Wings-of-Liberty/Structures/Terran/Missile Turret, 2 pages.
"StarCraft II: Arcade", captured by Wayback Machine, submitted Sep. 15, 2017, us.battle.net/sc2/en/game/maps-and-mods/, 3 pages.
"StarCraft II: Map Making Tutorials, Terrain Module, Introduction", captured by Wayback Machine, submitted Sep. 15, 2017, http://us.battle.net/sc2/en/game/maps-and-mods/tutorials/terrain/1, 3 pages.
"StarCraft II: Map Making Tutorials, Terrain Module, Place some units", captured by Wayback Machine, submitted Sep. 15, 2017, http://us.battle.net/sc2/en/game/maps-and-mods/tutorials/terrain/3, 2 pages.
"StarCraft II: Map Making Tutorials, Terrain Module, Publishing", captured by Wayback Machine, submitted Sep. 15, 2017, http://us.battle.net/sc2/en/game/maps-and-mods/tutorials/publishing, 6 pages.
Takeo Nasu, A Report on Operation Check of StarCraft II, ver. 1, submitted Dec. 21, 2017 in Case No. H29 YO 22172 of JP Patent No. 5903518, 6 pages.
"StarCraft II: Wings of Liberty, Map Making Tutorials, Terrain Module, Publishing", captured by Wayback Machine, submitted Jan. 9, 2018, http://us.battle.net:80/sc2/en/game/maps-and-mods/tutorials/publishing, 5 pages.
"StarCraft II: Wings of Liberty, Map Making Tutorials, Terrain Module, Map Properties", captured by Wayback Machine, submitted Jan. 9, 2018, http://us.battle.net:80/sc2/en/game/maps-and-mods/tutorials/terrain/5, 5 pages.
"Play Station 3 System Software 4.00, User's Guide, Save Data", captured by Wayback Machine, submitted Oct. 17, 2017, http://manuals.playstation.net/document/jp/ps3/current/game/3savedata.html, 2 pages.
Declaration of Eric Gray submitted Nov. 8, 2017 in Case No. H29 YO 22041 of JP Patent No. 5911992, 3 pages.
Declaration of Antti Takala submitted Nov. 9, 2017 in Case No. H29 YO 22041 of JP Patent No. 5911992, 19 pages.
Takeo Nasu, A Report of Operation Check of Clash of Clans ver. 5.2 on Actual Device, submitted Nov. 10, 2017 in Case No. H29 YO 22041 of JP Patent No. 5911992, 6 pages.
Takeo Nasu, A Report on Operation Check of StarCraft II, submitted Oct. 20, 2017 in Case No. H29 YO 22163 of JP Patent No. 5952946, 3 pages.
"StarCraft 2 Beta: Battle.Net Impressions", printed Sep. 28, 2017, https://gamerant.com/starcraft-2-beta-battlenet-impressions-paul-11666/3/, 5 pages.
"StarCraft II, Map Making Tutorials, Terrain Module, Map Properties", captured by Wayback Machine, submitted Dec. 26, 2017, http://us.battle.net:80/sc2/en/game/maps-and-mods/tutorials/terrain/5, 7 pages.
Nobuhiko Suzuki, A Report on Operation Check of Civilization IV, submitted May 8, 2018 in Case No. H29 WA 34031 of JP Patent No. 5952946, 4 pages.
"Civilization IV, weekly article, "Bummeido, the snack at 3AM" vol. 1", printed Sep. 21, 2017, http://www.4gamer.net/weekly/civ4_001.shtml, 6 pages.
"Tips of Backup Technics for Saved Data of Popular Game Applications, before Purchasing New iPhone", Sep. 16, 2013, http://www.appbank.net/2013/09116/iphone-news/66683.php, 12 pages.
"How to migrate Data of Clash of Clans from iPhone5 to iPad mini", Jul. 25, 2013, https://blogs.yahoo.co.jp/syuel1009/68066740.html, 4 pages.
"Clash of Clans, Playing it lightly with iPhone Outside, Playing it deliberately with iPad at Home, and Setting of Notification", Jul. 5, 2013, http://kitchencompany.jp/post-3464/, 3 pages.
Supercell's First Brief, submitted Jul. 6, 2018 in Case No. H30 WA 10447 of JP Patent No. 5676032, 87 pages.
Nobuhiko Suzuki, A Report of Operation Check of Hotel Giants 2 on Actual Device, submitted Jul. 6, 2018 in Case No. H30 WA 10447 of JP Patent No. 5676032, 7 pages.
Supercell's First Brief, submitted Jul. 20, 2018 in Case No. H30 WA 10446 of JP Patent No. 5903517, 78 pages.
Supercell's First Brief, submitted Jan. 26. 2018 in Case No. H29 WA 34031 of JP Patent No. 5952946, 45 pages.
Gree's First Brief, submitted Feb. 5, 2018 in Case No. H29 WA 34031 of JP Patent No. 5952946, 112 pages.
Supercell's Third Brief, submitted Mar. 16, 2018 in Case No. H29 WA 34031 of JP Patent No. 5952946, 18 pages.
Gree's Second Brief, submitted May 16, 2018 in Case No. H29 WA 34031 of JP Patent No. 5952946, 16 pages.
Supercell's Fourth Brief, submitted May 8, 2018 in Case No. H29 WA 34031 of JP Patent No. 5952946, 72 pages.
Supercell's First Brief, submitted Feb. 6, 2018 in Case No. H29 WA 40193 of JP Patent No. 5952947, 60 pages.
Gree's First Brief, submitted Feb. 16, 2018 in Case No. H29 WA 40193 of JP Patent No. 5952947, 37 pages.
Supercell's Third Brief, submitted Mar. 23, 2018 in Case No. H29 WA 40193 of JP Patent No. 5952947, 26 pages.
Supercell's First Brief, submitted Jun. 25, 2018 in Case No. H30 WA 11146 of JP Patent No. 5953448, 72 pages.
Supercell's Third Brief, submitted Jul. 18, 2018 in Case No. H30 WA 11146 of JP Patent No. 5953448, 45 pages.
Gree's Second Brief, submitted Sep. 4. 2018 in Case No. H30 WA 11146 of JP Patent No. 5953448, 8 pages.
Motion for Preliminary Injunction, submitted Mar. 29, 2018 in Case No. H30 YO 22032 of JP Patent No. 5676032, 31 pages.
"Internet Archive's Terms of Use, Privacy policy and copyright policy", Archive.org, Dec. 31, 2014, https://archive.org/about/terms.php, 3 pages.
"Internet News of Stock, Nikkei.com", captured by Wayback Machine, printed Oct. 20, 2017, https://web.archive.org/web/20171017091811/ https://nikkei.com/markets/kabu/, 1 page.
"Internet News of Stock, Nikkei.com", Oct. 17, 2017, https://www.nikkei.com/articie/DGXLAS3LTSEC1_X11C17A0000000/. 1 page.
"Wayback Machine PlayBack . . . now with Timestamps!", Internet Archive Blogs, Oct. 5, 2017, 1 page.
"Function of Presenting Elements configuring Web Pages with Timestamps in List added to Wayback Machine, the Internet Archive", Current Awareness Portal by the National Diet Library, Oct. 5, 2017, http://current.ndl.go.jp/node/34792, 2 pages.

(56) References Cited

OTHER PUBLICATIONS

Hirofumi Tada. Search Report of Wayback Machine, submitted Oct. 20, 2018 in Case No. H30 YO 22032 of JP Patent No. 5676032, 9 pages.
Ada Lerner et al., Rewriting History: Changing the Archived Web from the Present, published at the 22nd ACM Conference on Computer and Communications Security, printed Oct. 30, 2017, 15 pages.
Supercell's Second Brief, submitted Jun. 1, 2018 in Case No. H30 YO 22032 of JP Patent No. 5676032, 86 pages.
Gree's First Brief, submitted Jun. 26, 2018 in Case No. H30 YO 22032 of JP Patent No. 5676032, 21 pages.
Motion for Preliminary Injunction, submitted Feb. 28, 2018 in Case No. H30 YO 22016 of JP Patent No. 5903517, 24 pages.
Search Result of "Image File, Meta Data, Edit", Google.co.jp, printed Dec. 28, 2017. 2 pages.
"Information Requests, The Internet Archive's Policy for Responding to Information Requests", Archive.org, printed Dec. 28, 2017, https://archive.org/legal/, 2 pages.
"Standard Affidavit", Archive.org, printed Dec. 28, 2017, https://archive.org/legal/affidavit.php, 1 page.
"App Statuses", Apple .com, printed Oct. 23, 2017, 3 pages.
Supercell's Second Brief, submitted Jun. 1, 2018 in Case No. H30 YO 22016 of JP Patent No. 5903517, 78 pages.
Gree's First Brief, submitted Jun. 18, 2018 in Case No. H30 YO 22016 of JP Patent No. 5903517, 19 pages.
Motion for Preliminary Injunction, submitted Mar. 2, 2018 in Case No. H30 YO 22019 of JP Patent No. 5911992, 31 pages.
Supercell's Second Brief, submitted May 31, 2018 in Case No. H30 YO 22019 of JP Patent No. 5911992, 77 pages.
Motion for Preliminary Injunction, submitted Feb. 28, 2018 in Case No. H30 YO 22017 of JP Patent No. 5952946, 23 pages.
Supercell's First Brief, submitted May 15, 2018 in Case No. H30 YO 22017 of JP Patent No. 5952946, 18 pages.
Gree's First Brief, submitted Jul. 6, 2018 in Case No. H30 YO 22017 of JP Patent No. 5952946, 27 pages.
Motion for Preliminary Injunction, submitted Apr. 6, 2018 in Case No. H30 YO 22042 of JP Patent No. 5952947, 31 pages.
Motion for Preliminary Injunction, submitted Feb. 28, 2018 in Case No. H30 YO 22018 of JP Patent No. 5903518, 22 pages.
Supercell's Second Brief, submitted May 31, 2018 in Case No. H30 YO 22018 of JP Patent No. 5903518, 74 pages.
Supercell's Fourth Brief, submitted Jul. 31, 2018 in Case No. H30 YO 22018 of JP Patent No. 5903518, 10 pages.
Nobuhiko Suzuki, A Report on Operation Check of Clash of Clans as of the Filing Date of the Original Application, submitted Jul. 30, 2018, 9 pages.
Naoki Okumura, A Report on Operation Check of Clash of Clans, submitted Jul. 31, 2018, 4 pages.
Naoki Okumura. A Report on Operation Check of Clash of Clans, submitted Jul. 30, 2018, 5 pages.
"Registration Reopened: Clash of Clans Fan Meet Up #1—San Francisco", printed Jul. 19, 2018, https://forum.supercell.com/showthread.php/150023-Registration-Reopend-Clash-of-Clans-Fan-Meet-Up-1-San-Francisco, 2 pages.
"Clash of Clans Meet Up: Sep. 25!", printed Jul. 19, 2018, https://forum.supercell.com/showthread.php/149458-Clash-of-Clans-Meet-Up-September-25th%21, 4 pages.
"Clash of Clans: Perfect Translation of Tutorial! Let's get started!", APPBANK.net, Jun. 5, 2013, 19 pages.
"Surging Players! Lecture of How to Play "Clash of Clans"", Famitsu.com, Jun. 4, 2013, https://app.famitsu.com/20130604_173029/, 11 pages.
"Village Edit Mode of Clash of Clans", printed Jul. 5, 2018, http://clashofclans.wikia.com/wiki/Village_Edit_Mode, 4 pages.
Motion for Preliminary Injunction, submitted Feb. 28, 2018 in Case No. H30 YO 22015 of JP Patent No. 5953448, 33 pages.
Supercell's Answer, submitted Mar. 15, 2018 in Case No. H30 YO 22015 of JP Patent No. 5953448, 3 pages.
Kengo Nakajima, Technology for Online Game, Gijutsu-Hyohron Co., Ltd., ISBN978-4-7741-4580-8 C3055, Apr. 25, 2011, 7 pages (p. 79-83, cover page, and back cover page).
Supercell's Fourth Brief, submitted Jun. 19, 2018 in Case No. H30 YO 22015 of JP Patent No. 5953448, 5 pages.
Gree's Second Brief, submitted Jun. 29, 2018 in Case No. H30 YO 22015 of JP Patent No. 5953448, 20 pages.
Supercell's Fifth Brief, submitted Jul. 20. 2018 in Case No. H30 YO 22015 of JP Patent No. 5953448, 45 pages.
Supercell's Petition, submitted Jul. 6. 2018 in Case No. H29 YO 22046 of JP Patent No. 5676032, 5 pages.
Supercell's First Brief, submitted Aug. 22, 2017 in Case No. H29 YO 22046 of JP Patent No. 5676032, 38 pages.
Supercell's Third Brief, submitted Oct. 17, 2017 in Case No. H29 YO 22046 of JP Patent No. 5676032, 59 pages.
Gree's Second Brief, submitted Nov. 8, 2017 in Case No. H29 YO 22046 of JP Patent No. 5676032, 40 pages.
Supercell's Fourth Brief, submitted Nov. 30, 2017 in Case No. H29 YO 22046 of JP Patent No. 5676032, 8 pages.
Gree's Third Brief, submitted Dec. 20, 2017 in Case No. H29 YO 22046 of JP Patent No. 5676032, 12 pages.
Gree's Fourth Brief, submitted Feb. 6. 2018 in Case No. H29 YO 22046 of JP Patent No. 5676032, 11 pages.
Supercell's Fifth Brief, submitted Jan. 26, 2018 in Case No. H29 YO 22046 of JP Patent No. 5676032, 28 pages.
Affidavit of Christopher Butler, submitted Dec. 11, 2017 in Case No. H29 YO 22046 of JP Patent No. 5676032, 21 pages.
Supercell's Answer, submitted Sep. 7, 2017 in Case No. H29 YO 22172 of JP Patent No. 5903518, 35 pages.
Supercell's First Brief, submitted Oct. 11, 2017 in Case No. H29 YO 22172 of JP Patent No. 5903518, 44 pages.
Supercell's Second Brief, submitted Nov. 27, 2017 in Case No. H29 YO 22172 of JP Patent No. 5903518, 18 pages.
"Executive Profile: Lassi Leppinen", Bloomberg.com, printed Oct. 26, 2017, 2 pages.
Supercell's Third Brief, submitted Jan. 9, 2018 in Case No. H29 YO 22172 of JP Patent No. 5903518, 28 pages.
Gree's Seventh Brief, submitted Feb. 16, 2018 in Case No. H29 YO 22172 of JP Patent No. 5903518, 22 pages.
Supercell's First Brief, submitted Aug. 22, 2017 in Case No. H29 YO 22043 of JP Patent No. 5953448, 35 pages.
Supercell's Third Brief, submitted Oct. 17, 2017 in Case No. H29 YO 22043 of JP Patent No. 5953448, 49 pages.
Gree's Second Brief, submitted Nov. 8. 2017 in Case No. H29 YO 22043 of JP Patent No. 5953448, 31 pages.
Supercell's Fourth Brief, submitted Dec. 22, 2017 in Case No. H29 YO 22043 of JP Patent No. 5953448, 22 pages.
Jun Wun Chul, Online Game Programming, Software Publishing Co., ISBN4-7973-2847-9, Mar. 3, 2005, 12 pages (p. iii, p. iv, p. v, p. 1-7, cover page and back cover page).
Yuichiroh Ohtsuki, Online Programming Class with C: Starting from Fourteen, Rutles Inc., ISBN978-4-89977-240-8, Apr. 10, 2009, 15 pages (p. 144-156, cover page and back cover page).
Gree's Third Brief, submitted Jan. 19, 2018 in Case No. H29 YO 22043 of JP Patent No. 5953448, 17 pages.
Supercell's First Brief, submitted Aug. 25, 2017 in Case No. H29 YO 22042 of JP Patent No. 5903517, 28 pages.
Supercell's First Brief, submitted Oct. 13, 2017 in Case No. H29 YO 22042 of JP Patent No. 5903517, 58 pages.
Gree's Second Brief, submitted Nov. 9, 2017 in Case No. H29 YO 22042 of JP Patent No. 5903517, 26 pages.
Supercell's Fourth Brief, submitted Dec. 21, 2017 in Case No. H29 YO 22042 of JP Patent No. 5903517, 26 pages.
Gree's Third Brief. submitted Jan. 22, 2018 in Case No. H29 YO 22042 of JP Patent No. 5903517, 15 pages.
Supercell's Seventh Brief. submitted Feb. 9, 2018 in Case No. H29 YO 22042 of JP Patent No. 5903517, 15 pages.
Supercell's First Brief, submitted Jul. 27. 2017 in Case No. H29 YO 22041 of JP Patent No. 5911992, 29 pages.
Supercell's Second Brief, submitted Sep. 15, 2017 in Case No. H29 YO 22041 of JP Patent No. 5911992, 54 pages.
Gree's Third Brief, submitted Oct. 10, 2017 in Case No. H29 YO 22041 of JP Patent No. 5911992, 26 pages.

(56) References Cited

OTHER PUBLICATIONS

Supercell's Third Brief, submitted Oct. 3, 2017 in Case No. H29 YO 22041 of JP Patent No. 5911992, 14 pages.
"Wikipedia: Soccer", Wikipedia.org, printed Sep. 25, 2017, https://ja.wikipedia.org/wiki/%E3%82%B5%E3%83%83%E3%82%AB%E3%83%BC, 14 pages.
Supercell's Fourth Brief, submitted Oct. 10, 2017 in Case No. H29 YO 22041 of JP Patent No. 5911992, 2 pages.
Supercell's Fifth Brief, submitted Nov. 10, 2017 in Case No. H29 YO 22041 of JP Patent No. 5911992, 21 pages.
Gree's Fourth Brief, submitted Nov. 17, 2017 in Case No. H29 YO 22041 of JP Patent No. 5911992, 17 pages.
Supercell's Seventh Brief, submitted Dec. 27, 2017 in Case No. H29 YO 22041 of JP Patent No. 5911992, 17 pages.
Gree's Fifth Brief, submitted Feb. 9, 2018 in Case No. H29 YO 22041 of JP Patent No. 5911992, 19 pages.
Supercell's Answer, submitted Sep. 13, 2017 in Case No. H29 YO 22163 of JP Patent No. 5952946, 33 pages.
Supercell's First Brief, submitted Oct. 20, 2017 in Case No. H29 YO 22163 of JP Patent No. 5952946, 40 pages.
Gree's Second Brief, submitted Nov. 17, 2017 in Case No. H29 YO 22163 of JP Patent No. 5952946, 13 pages.
Supercell's Third Brief, submitted Dec. 26, 2017 in Case No. H29 YO 22163 of JP Patent No. 5952946, 24 pages.
Gree's Second Brief, submitted Feb. 5, 2018 in Case No. H29 YO 22163 of JP Patent No. 5952946, 25 pages.
"Terran—StarCraft II: Wings of Liberty Structures", Gamewise, printed Jan. 19, 2018, 2 pages.
"Structures—StarCraft II: Wings of Liberty Structures", Gamewise, printed Jan. 19, 2018, https://web.archive.org/web/20130908134452/http://gamewise.co/games/36254/StarCraft-II-Wings-of-Liberty/Structures, 1 page.
Supercell's Answer, submitted Aug. 30, 2017 in Case No. H29 YO 22164 of JP Patent No. 5952947, 38 pages.
Supercell's First Brief, submitted Oct. 17, 2017 in Case No. H29 YO 22164 of JP Patent No. 5952947, 52 pages.
Gree's Second Brief, submitted Nov. 8, 2017 in Case No. H29 YO 22164 of JP Patent No. 5952947, 16 pages.
Supercell's Fourth Brief, submitted Dec. 26, 2017 in Case No. H29 YO 22164 of JP Patent No. 5952947, 21 pages.
Gree's Fourth Brief, submitted Aug. 23, 2018 in Case No. H30 YO 22018 of JP Patent No. 5903518, 6 pages.
Gree's First Brief, submitted Sep. 4, 2018 in Case No. H30 WA 10447 of JP Patent No. 5676032, 11 pages.
Japanese Office Action dated Aug. 21, 2018 in Japanese Patent Application No. 2015-248965 with translation, 6 pages.
"Shin-Temmakai—GOC IV, another side—", Dengeki Play Station, Media Works Corporation, No. 11, vol. 10, p. 198-199, Mar. 11, 2005, section "Point: Make more advantageous Battle Situation, Formation" in p. 199 with partial English translation, 5 pages.
Deposition of David Crane, submitted Sep. 4, 2018 in Case No. PGR2018-00008 of U.S. Pat. No. 9,597,594, 162 pages.
"Exeter Chess Club, A place to enjoy and learn about chess", printed Sep. 4, 2018, http://exeterchessclub.org.uk/content/new-starting-formations-tabiat, 9 pages.
"Chess History 1: Shatranj", printed Sep. 4, 2018, https://www.chess.com/clubs/forum/view/chess-history-1-shatranj, 5 pages.
Petitioner's Reply to Patent Owner's Response, submitted Sep. 4, 2018 in Case No. PGR2018-00008 of U.S. Pat. No. 9,597,594, 32 pages.
Website Fundamental Information of Clash of Clans for Beginners, 9 pgs.
Website information on Clash of Clans Data Linkage between iPhone and ipad, http://www.appbank.net/2013/06/25iphone-application/627513.php; 6 pgs., Sep. 8, 2017.
Play Manual of Hotel Giant 2. (32 pgs.).
Website Clash of Clans Wiki Village Edit Mode, http://clashofclans.wikia.com/wiki/Village_Edit_Mode_07/24/2017; 2 pgs.
Play Manual of Winning Eleven 2011, 20 pgs.
Play Manual of SidMeiers Civilization, 116 pgs.

Japanese Office Action dated Sep. 12, 2017 in Patent Application No. 2015-248965 (with English translation).
Konami Official Guide, "Perfect Series Palpitation Memorial 2 Perfect Guide", Konami Corporation, Dec. 20, 1999; first edition, p. 31 and Partial English Translation, 5 pgs.
Konami Official Guide, "Perfect Capture Series 47 Palpitation Memorial 2 Authorized-Guidebook Uncut Text", Konami Corporation: Jul. 10, 2001, $6^{th}$ printing, p. 53 and Partial English Translation, 5 pgs.
Japanese Office Action dated Mar. 20, 2018 in Japanese Patent Application No. 2017-242679 with translation.
Yoshie Hori et al.; "The Convenience Store DS: Adult Management Skills Training Official Perfect Guide", Shinkigensha Co., Ltd., first issue, Dec. 4, 2008, p. 4, 8, 35 with translation.
R. Barba, et al., "Star Craft, Wings of Liberty", Bradygames, Official Strategy Guide, ISBN-13: 978-074401128-9, ISBN-10: 074401128-0, Blizzard Entertainment, Inc., 2010, Total pages submitted herewith: 5 pages (The first page: the cover page, the second and third pages: pp. 188 and 196 of this reference, the fourth and fifth pages: the back cover pages).
Japanese Office Action dated May 29, 2018 in Japanese Patent Application No. 2017-242679 with translation.
Petition for Post-Grant Review of U.S. Pat. No. 9,597,594 dated Nov. 7, 2017 by Petitioner's Counsel.
Austin Lockwood, A Guide to Correspondence Chess in Wales, Welsh Correspondence Chess Federation, Jun. 17, 2016, Updated Feb. 9, 2017 by Austin Lockwood <ULR: https://www.welshccf.org.uk/content/19>.
Bryce D. Avery, Correspondence chess in America, ISBN 978-0-7864-7396-0, © 2000 Bryce D. Avery. All rights reserved., pp. ix, x, 1-3.
Microsoft Computer Dictionary, 4th edition, Microsoft Press, A Division of Microsoft Corporation, ISBN 0-7356-0615-3, 1999, p. 102.
USPTO Memorandum dated May 4, 2016, titled "Formulating a Subject Matter Eligibility Rejection and Evaluating the Applicant's Response to a Subject Matter Eligibility Rejection" from Deputy Commissioner for Patent Examination Policy.
Patent Owner's Preliminary Response dated Feb. 20, 2018 by Counsel for Patent Owner.
Jul. 2015 Update Appendix 1: Examples dated Jul. 30, 2015 by USPTO.
Petitioner's Reply to Patent Owner's Preliminary Response dated Mar. 21, 2018 by Petitioner's Counsel.
Patent Owner'S Surreply to Petitioner's Reply to Patent Owner's Preliminary Response dated Mar. 28, 2018 by Counsel for Patent Owner.
Decision dated May 1, 2018, Granting Institution of Post-Grant Review 35 U.S.C. § 324(a) by Patent Trial and Appeal Board.
Petitioner Supercell Oy's Notice of Cross Appeal, dated May 22, 2019; in case No. PGR2018-00008 of U.S. Pat. No. 9,597,594 B2. (5 pgs.).
Examination Report dated Nov. 8, 2019, in GB Patent Application No. GB1604478.6.
Supercell Oy's Invalidity Contentions and Disclosures dated Dec. 6, 2019 in Civil Action No. 2:19-cv-00200-JRG-RSP, 23 pages.
Brief of Appellant Gree, Inc filed Oct. 7, 2019 in Case: 19-1864, 154 pages.
Principal and Response Brief of Supercell Oy filed Jan. 17, 2020 in Case: 19-1864, 69 pages.
"Exhibit A-1: U.S. Pat. No. 10,300,385 to Age of Empires II, Game and Manual ("Age of Empires II")" Supercell, cited in Supercell Oy'S Invalidity Contentions and Disclosures, Dec. 6, 2019, 141 pages.
"Exhibit A-2: U.S. Pat. No. 10,300,385 to Backyard Monsters, Game and Manual ("Backyard Monsters")" Supercell, cited in Supercell Oy'S Invalidity Contentions and Disclosures, Dec. 6, 2019, 243 pages.
"Exhibit A-3: U.S. Pat. No. 10,300,385 to U.S. Patent Application 2007/0105626 ("Cho")" Supercell, cited in Supercell Oy's Invalidity Contentions and Disclosures, Dec. 6, 2019, 208 pages.

(56) References Cited

OTHER PUBLICATIONS

"Exhibit A-4: U.S. Pat. No. 10,300,385 to SID Meier's Civilization IV, Game and Manual ("Civilization IV")" Supercell, cited in Supercell Oy's Invalidity Contentions and Disclosures, Dec. 6, 2019, 171 pages.
"Exhibit A-5: U.S. Pat. No. 10,300,385 to U.S. Pat. No. 8,206,224 ("Farone")" Supercell, cited in Supercell Oy'S Invalidity Contentions and Disclosures, Dec. 6, 2019, 180 pages.
"Exhibit A-6: U.S. Pat. No. 10,300,385 to FIFA 13 (PS3 and XBOX), Game and Manual ("FIFA 13")" Supercell, cited in Supercell Oy's Invalidity Contentionsand Disclosures, Dec. 6, 2019, 234 pages.
"Exhibit A-7: U.S. Pat. No. 10,300,385 to Gratuitous Space Battles, Game and Manual ("Gratuitous Space Battles")" Supercell, cited in Supercell Oy's Invalidity Contentions and Disclosures, Dec. 6, 2019, 325 pages.
"Exhibit A-8: U.S. Pat. No. 10,300,385 to Gratuitous Tank Battles, Game and Manual ("Gratuitous Tank Battles")" Supercell, cited in Supercell Oy'S Invalidity Contentions and Disclosures, Dec. 6, 2019, 217 pages.
"Exhibit A-9: U.S. Pat. No. 10,300,385 to JP 5042200 B2 ("JP200")" Supercell, cited in Supercell Oy's Invalidity Contentions and Disclosures, Dec. 6, 2019, 254 pages.
"Exhibit A-10: U.S. Pat. No. 10,300,385 to U.S. Pat. No. 9,079,105 ("Kim")" Supercell, cited in Supercell Oy's Invalidity Contentions and Disclosures, Dec. 6. 2019, 389 pages.
"Exhibit A-11: U.S. Pat. No. 10,300,385 to Legend of Grimrock Dungeon Editor, Game and Manual ("Legend of Grimrock")" Supercell, cited in Supercell Oy's Invalidity Contentionsand Disclosures, Dec. 6. 2019, 142 pages.
"Exhibit A-12: U.S. Pat. No. 10,300,385 to Madden 25 (PS3 and XBOX), Game and Manual ("Madden 25")" Supercell, cited in Supercell Oy's Invalidity Contentions and Disclosures, Dec. 6, 2019, 248 pages.
"Exhibit A-13: U.S. Pat. No. 10,300,385 to Mastermind's In-Game Builder Post ("Mastermind")" Supercell, cited in Supercell Oy's Invalidity Contentions and Disclosures, Dec. 6, 2019, 275 pages.
"Exhibit A-14: U.S. Pat. No. 10,300,385 to Starcraft II, Game and Manual ("Starcraft II")" Supercell, cited in Supercell Oy's Invalidity Contentions and Disclosures, Dec. 6, 2019, 160 pages.
"Exhibit A-15: U.S. Pat. No. 10,300,385 to Stardrive, Game and Manual ("Stardrive")" Supercell, cited in Supercell Oy's Invalidity Contentionsand Disclosures, Dec. 6, 2019, 124 pages.
"Exhibit A-16: U.S. Pat. No. 10,300,385 to Supreme Commander, Game and Manual ("Supreme Commander")" Supercell, cited in Supercell Oy's Invalidity Contentions and Disclosures, Dec. 6, 2019, 173 pages.
"Exhibit A-17: U.S. Pat. No. 10,300,385 to Sword of the Stars, Game and Manual ("Sword of the Stars")" Supercell, cited in Supercell Oy's Invalidity Contentions and Disclosures, Dec. 6, 2019, 465 pages.
"Exhibit B-1: U.S. Pat. No. 10,307,675 to Age of Empires II, Game and Manual ("Age of Empires II")" Supercell, cited in Supercell Oy's Invalidity Contentions and Disclosures, Dec. 6, 2019, 384 pages.
"Exhibit B-2: U.S. Pat. No. 10,307,675 to Backyard Monsters, Game and Manual ("Backyard Monsters")" Supercell, cited in Supercell Oy's Invalidity Contentions and Disclosures, Dec. 6, 2019, 1000 pages.
"Exhibit B-3: U.S. Pat. No. 10,307,675 to U.S. Patent Application 2007/0105626 ("Cho")" Supercell, cited in Supercell Oy's Invalidity Contentions and Disclosures, Dec. 6, 2019, 582 pages.
"Exhibit B-4: U.S. Pat. No. 10,307,675 to SID Meier's Civilization IV, Game and Manual ("Civilieation IV") " Supercell, cited Supercell Oy's Invalidity Contentions and Disclosures, Dec. 6, 2019, 354 pages.
"Exhibit B-5: U.S. Pat. No. 10,307,675 to U.S. Pat. No. 8,206,224 ("Farone")" Supercell, cited in Supercell Oy's: Invalidity Contentions and Disclosures, Dec. 6, 2019, 390 pages.

"Exhibit B-6: U.S. Pat. No. 10,307,675 to FIFA 13 (PS3 and XBOX), Game and Manual ("FIFA 13")" Supercell, cited in Supercell Oy's Invalidity Contentions and Disclosures, Dec. 6, 2019, 691 pages.
"Exhibit B-7: U.S. Pat. No. 10,307,675 to Gratuitous Space Battles, Game and Manual ("Gratuitous Space Battles")" Supercell, cited in Supercell Oy's Invalidity Contentions and Disclosures, Dec. 6, 201 9, 914 pages.
"Exhibit B-8: U.S. Pat. No. 10,307,675 to Gratuitous Tank Battles, Game and Manual ("Gratuitous Tank Battles")" Supercell, cited in Supercell Oy's Invalidity Contentions and Disclosures, Dec. 6, 2019, 609 pages.
"Exhibit B-9: U.S. Pat. No. 10,307,675 to JP 5042200 B2 ("JP200")" Supercell, cited in Supercell Oy's invalidity Contentions and Disclosures, Dec. 6, 2019, 907 pages.
"Exhibit B-10: U.S. Pat. No. 10,307,675 in U.S. Pat. No. 9,079,105 ("Kim")" Supercell, cited in Supercell Oy'S Invalidity Contentions and Disclosures, Dec. 6, 2019, 1332 pages.
"Exhibit B-11: U.S. Pat. No. 10,307,675 to Legend of Grimrock Dungeon: Editor, Game and Manual ("Legend of Grimrock")" Supercell, 492 pages.
"Exhibit B-12: U.S. Pat. No. 10,307,675 to Madden 25 (PS3 and XBOX), Game and Manual ("Madden 2S")" Supercell, in Supercell Oy's Invalidity Contentions and Disclosures, Dec. 6, 2019, 710 pages.
"Exhibit B-13: U.S. Pat. No. 10,307,675 to Mastermind's In-Game Builder Post ("Mastermind")" Supercell, cited in Supercell Oy's Contentions and Disclostres, Dec. 6, 2019, 792 pages.
"Exhibit B-14: U.S. Pat. No. 10,307,675 to Starcraft II, Game and Manual ("Starcraft II")" Supercell, cited in Supercell Oy's Invalidity Contentions and Disclosures, Dec. 6, 2019, 416 pages.
"Exhibit B-15: U.S. Pat. No. 10,307,675 to Stardrive, Game and Manual ("Stardrive")" Supercell, cited in Supercell Oy's Invalidity Contentions and Disclosures, Dec. 6, 2019, 370 pages.
"Exhibit B-16; U.S. Pat. No. 10,307,675 to Supreme Commander, Game and Manual ("Supreme Commander")" Supercell, in Supercell Oy's Invalidity Contentions and Disclosures, Dec. 6, 2019, 328 pages.
"Exhibit B-17: U.S. Pat. No. 10,307,675 to Sword of the Stars, Game and Manual ("Sword of the Stars")" Supercell, cited Supercell Oy's Invalidity Contentions and Disclosures, Dec. 6, 2019, 1234 pages.
"Exhibit C-1 U.S. Pat. No. 10,307,676 to Age of Empires II, Game and Manual ("Age of Empires II")" Supercell, cited in Supercell Oy's Invalidity Contentions and Disclosures, Dec. 6, 2019, 258 pages.
"Exhibit C-2: U.S. Pat. No. 10,307,676 to Backyard Monsters, Game and Manual ("Backyard Monsters")" Supercell, cited in Supercell Oy's Invalidity Contentions and Disclosures, Dec. 6, 2019, 656 pages.
"Exhibit C-3: U.S. Pat. No. 10,307,676 to U.S. Patent Application 2007/0105626 ("Cho")" Supercell, cited in Supercell Oy's Invalidity Contentions and Disclosures, Dec. 6, 2019, 403 pages.
"Exhibit C-4: U.S. Pat. No. 10,307,676 to Sid Meier's Civilization IV, Game and Manual ("Civilization IV")" Supercell, cited Supercell Oy's Invalidily Contentions and Disclosures, Dec. 6, 2019, 225 pages.
"Exhibit C-5: U.S. Pat. No. 10,307,676 to U.S. Pat. No. 8,206,224 ("Farone")" Superceli, cited in Supercell Oy's Invalidity Contentions and Disclosures, Dec. 6, 2019, 299 pages.
"Exhibit C-6: U.S. Pat. No. 10,307,676 to FIFA 13 (PS3and XBOX), Game and Manual ("FIFA 13")" Superceli, cited in Supercell Oy'S Invalidity Contentions and Disclosures, Dec. 6, 2019, 419 pages.
"Exhibit C-7: U.S. Pat. No. 10,307,676 to Gratuitous Space Battles, Game and Manual ("Gratuitous Space Battles")" Supercell, cited in Supercell Oy's Invalidity Contentions and Disclosures, Dec. 6, 2019, 632 pages.
"Exhibit C-8: U.S. Pat. No. 10,307,676 to Gratuitous Tank Battles, Game and Manual ("Gratuitous Tank Battles")" Supercell, cited in Supercell Oy's Invalidity Contentions and Disclosures, Dec. 6, 2019, 423 pages.

(56) References Cited

OTHER PUBLICATIONS

"Exhibit C-9: U.S. Pat. No. 10,307,676 to JP 5042200 B2 ("JP200"")" Supercell, cited in Supercell Oy'S Invalidity Contentions and Disclosures, Dec. 6, 2019, 605 pages.

"Exhibit C-10: U.S. Pat. No. 10,307,676 to U.S. Pat. No. 9,079,105 ("Kim")" Supercell, cited in Supercell Oy's Invalidity Contentions and Disclosures, Dec. 6, 2019, 950 pages.

"Exhibit C-11: U.S. Pat. No. 10,307,676 to Legend of Grimrock Dungeon Editor, Game and Manual ("Legend of Grimrock")" Supercell, cited in Supercell Oy's Invalidity Contentions and Disclosures, Dec. 6, 2019, 336 pages.

"Exhibit C-12: U.S. Pat. No. 10,307,676 to Madden 25 (PS3 and XBOX), Game and Manual ("Madden 25")" Supercell, cited in Supercell Oy's Invalidity Contentions and Disclosures, Dec. 6, 2019, 453 pages.

"Exhibit C-13: U.S. Pat. No. 10,307,676 to Mastermind's In-Game Builder Post ("Mastermind")" Supercell, cited in Supercell Oy's Invalidity Contentions and Disclosures, Dec. 6, 2019, 538 pages.

"Exhibit C-14: U.S. Pat. No. 10,307,676 to Starcraft 11, Game and Manual ("Starcraft II")" Supercell, cited in Supercell Oy's Invalidity Contentions and Disclosures, Dec. 6, 2019, 290 pages.

"Exhibit C-15: U.S. Pat. No. 10,307,676 to Stardrive, Game and Manual ("Stardrive")" Supercell, cited in Supercell Oy's Invalidity Contentions and Disclosures, Dec. 6, 2019, 243 pages.

"Exhibit C-16: U.S. Pat. No. 10,307,676 to Supreme Commander, Game and Manual ("Supreme Commander")" Supercell cited in Supercell Oy's Invalidity Contentions and Disclosures, Dec. 6, 2019, 239 pages.

"Exhibit C-17: U.S. Pat. No. 10,307,676 to Sword of the Stars, Game and Manual ("Sword of the Stars")" Supercell, cited in Supercell Oy's Invalidity Contentions and Disclosures, Dec. 6, 2019, 806 pages.

"Exhibit D-1: U.S. Pat. No. 10,307,677 to Age of Empires II, Game and Manual ("Age of Empires II")" Supercell, cited in Supercell Oy's Invalidity Contentionsand Disclosures, Dec. 6, 2019, 248 pages.

"Exhibit D-2: U.S. Pat. No. 10,307,677 to Backyard Monsters, Game and Manual ("Backyard Monsters")" Supercell, cited in Supercell Oy's Invalidity Contentions and Disclosures, Dec. 6, 2019, 564 pages.

"Exhibit D-3: U.S. Pat. No. 10,307,677 to U.S. Patent Application 2007/0105626 ("Cho")" Supercell, cited in Supercell Oy's Invalidity Contentions and Disclosures, Dec. 6, 2019, 342 pages.

"Exhibit D-4: U.S. Pat. No. 10,307,677 to SID Meier's Civilization IV, Game and Manual ("Civilization IV")" Supercell, cited in Supercell Oy's Invalidity Contentions and Disclosures, Dec. 6, 2019, 220 pages.

"Exhibit D-5: U.S. Pat. No. 10,307,677 to U.S. Pat. No. 8,206,224 ("Farone")" Supercell, cited in Supercell Oy's Invalidity Contentions and Disclosures, Dec. 6, 2019, 272 pages.

"Exhibit D-6: U.S. Pat. No. 10,307,677 to FIFA 13 (PS3 and XBOX), Game and Manual ("FIFA 13")" Supercell, cited in Supercell Oy's Invalidity Contentions and Disclosures, Dec. 6, 2019, 432 pages.

"Exhibit D-7: U.S. Pat. No. 10,307,877 to Gratuitous Space Battles, Game and Manual ("Gratuitous Space Battles")" Supercell, cited in Supercell Oy's Invalidity Contentions and Disclosures, Dec. 6, 2018, 578 pages.

"Exhibit D-8: U.S. Pat. No. 10,307,677 to Gratuitous Tank Battles, Game and Manual ("Gratuitous Tank Battles")" Supercell, cited in Supercell Oy's Invalidity Contentions and Disclosures, Dec. 6, 2019, 379 pages.

"Exhibit D-9: U.S. Pat. No. 10,307,677 to JP 5042200 B2 ("JP200")" Supercell, cited in Supercell Oy's Invalidity Contentions and Disclosures, Dec. 6, 2019, 541 pages.

"Exhibit D-10: U.S. Pat. No. 10,307,677 to U.S. Pat. No. 9,079,105 ("Kim")" Supercell, cited in Supercell Oy's Invalidity Contentions and Disclosures, Dec. 6, 2019, 849 pages.

"Exhibit D-11: U.S. Pat. No. 10,307,677 to Legend of Grimrock Dungeon Editor, Game and Manual ("Legend of Grimrock")" Supercell, cited in Supercell Oy's Invalidity Contentions and Disclosures, Dec. 6, 2019, 263 pages.

"Exhibit D-12: U.S. Pat. No. 10,307,677 to Madden 25 (PS3 and XBOX), Game and Manual ("Madden 25")" Supercell, in Supercell Oy's Invalidity Contentionsand Disclosures, Dec. 6, 2019, 410 pages.

"Exhibit D-13: U.S. Pat. No. 10,307,677 to Mastermind's In-Game Builder Post ("Mastermind")" Supercell, cited in Supercell Oy's Invalidity Contentions and Disclosures, Dec. 6, 2019, 490 pages.

"Exhibit D-14: U.S. Pat. No. 10,307,677 to Starcraft II, Game and Manual ("Starcraft II")" Supercell, cited in Supercell Oy's Invalidity Contentionsand Disclosures, Dec. 6, 2019, 285 pages.

"Exhibit D-15: U.S. Pat. No. 10,307,677 to Stardrive, Game and Manual ("Stardrive")" Supercell, cited Supercell Oy's Invalidity Contentions and Disclosures, Dec. 6, 2019, 247 pages.

"Exhibit D-16: U.S. Pat. No. 10,307,677 to Supreme Commander, Game and Manual ("Supreme Commander")" Supercell, in Supercell Oy's Invalidity Contentions and Disclosures, Dec. 8, 2019, 216 pages.

"Exhibit D-17: U.S. Pat. No. 10,307,677 to Sword of the Stars, Game and Manual ("Sword of the Stars")" Supercell, cited Supercell Oy's Invalidity Contentions and Disclosures, Dec. 8, 2019, 783 pages.

"Exhibit E-1: U.S. Pat. No. 10,307,878 to Age of Empires II. Game and Manual ("Age of Empires II")" Supercell, cited in Supercell Oy's Invalidity Contenllons and Disclosures, Dec. 6, 2019, 159 pages.

"Exhibit E-2: U.S. Pat. No. 10,307,678 Backyard Monsters, Game and Manual ("Backyard Monsters")" Suspercell, cited Supercell Oy's Invalidity Contentions and Disclosures, Dec. 6, 2019, 340 pages.

"Exhibit E-3: U.S. Pat. No. 10.307,678 to U.S. Patent Application 20070105626 ("Cho")" Supercell, cited in Supercell Oy's Invalidity Contentions and Disclosures, Dec. 6, 2019, 226 pages.

"Exhibit E-4: U.S. Patent Ne, 10,307,678 to SID Meier's Civilization IV, Gams and Manual ("Civilization IV")" Supercell, cited in Supercell Oy's Invalidity Contentions and Disclosures, Dec. 5, 2019, 157 pages.

"Exhibit E-5: U.S. Pat. No. 10,307,678 to U.S. Pat. No. 8,206,224 ("Farone")" Superell, cited in Supercell Oy's Invalidity Contentions and Disclosures, Dec. 6, 2019, 187 pages.

"Exhibit E-6: U.S. Pat. No. 10,307,878 to FIFA 13 (PS3 and XBOX), Game and Manual ("FIFA 13")" Supercell, cited in Supercell Oy's Invalidity Contentions and Disclosures, Dec. 6, 2019, 239 pages.

"Exhibit E-7: U.S. Pat. No. 10,307,878 to Gratuitous Space Battles, Game and Manual ("Gratultous Space Battles")" Supercell, cited to Supercell Oy's Invalidity Contentions and Disclosures, Dec. 6, 2019, 334 pages.

"Exhibit E-8: U.S. Pat. No. 10,307,678 to Gratuitous Tank Battles, Game and Manual ("Gratuitous Tank Battles")" Supercell, cited in Supercell Oy's Invalidity Contentions and Disclosures, Dec. 6, 2019, 236 pages.

"Exhibit E-9: U.S. Pat. No. 10,307,678 to JP 5042200 B2 ("JP200")" Supercell, cited in Supercell Oy's Invalidity Contentions and Disclosures, Dec. 6, 2019, 321 pages.

"Exhibit E-10: U.S. Pat. No. 10,307,678 to U.S. Pat. No. 9,079,105 ("Kim")" Supercell, cited in Supercell Oy's Invalidity Contentions and Disclosures, Dec. 6, 2019, 418 pages.

"Exhibit E-11: U.S. Pat. No. 10,307,678 to Legend of Grimrock Dungeon Editor, Game and Manual ("Legend of Grimrock")" Supercell, cited in Supercell Oy's Invalidity Contentions and Disclosures, Dec. 6, 2019, 183 pages.

"Exhibit E-12: U.S. Pat. No. 10,307,678 to Madden 25 (PS3 and XBOX), Game and Manual ("Madden 25")" Supercell, cited in Supercell Oy's Invalidity Contentions and Disclosures, Dec. 6, 2019, 259 pages.

"Exhibit E-13: U.S. Pat. No. 10,307,678 to Mastermind's In-Game Builder Post ("Mastermind")" Supercell, cited In Supercell Oy's Invalidity Contentions and Disclosures, Dec. 6, 2019, 330 pages.

"Exhibit E-14: U.S. Pat. No. 10,307,678 to Starcraft II, Game and Manual ("Starcraft II")" Supercell, cited in Supercell Oy's Invalidity Contentions and Disclosures, Dec. 6, 2019, 182 pages.

(56) References Cited

OTHER PUBLICATIONS

"Exhibit E-15: U.S. Pat. No. 10,307,678 to Stardrive, Game and Manual ("Stardrive")" Supercell, cited in Supercell Oy's Invalidity Contentions and Disclosures, Dec. 6, 2019, 126 pages.
"Exhibit E-16: U.S. Pat. No. 10,307,678 to Supreme Commander, Game and Manual ("Supreme Commander")" Supercell, cited in Supercell Oy's Invalidity Contentions and Disclosures, Dec. 6, 2019, 155 pages.
"Exhibit E-17: U.S. Pat. No. 10,307,678 to Sword of the Stars, Game and Manual ("Sword of the Stars")" Supercell, cited in Supercell Oy's Invalidity Contentions and Disclosures, Dec. 6, 2019, 451 pages.
"Exhibit F-1: U.S. Pat. No. 10,328,347 to Age of Empires II, Game and Manual ("Age of Empires II")" Supercell, cited in Supercell Oy's Invalidity Contentions and Disclosures, Dec. 6, 2019, 323 pages.
"Exhibit F-2: U.S. Pat. No. 10,328,347 to Backyard Monsters, Game and Manual ("Backyard Monsters")" Supercell, cited in Supercell Oy's Invalidity Contentions and Disclosures, Dec. 6, 2019, 863 pages.
"Exhibit F-3: U.S. Pat. No. 10,328,347 to U.S. Patent Application 2007/0105626 ("Cho")" Supercell, cited in Supercell Oy's Invalidity Contentions and Disclosures, Dec. 6, 2019, 493 pages.
"Exhibit F-4: U.S. Pat. No. 10,328,347 to SID Meier's Civilization IV, Game and Manual ("Civilization IV")" Supercell, cited in Supercell Oy's Invalidity Contentions and Disclosures, Dec. 6, 2019, 269 pages.
"Exhibit F-5: U.S. Pat. No. 10,328,347 to U.S. Pat. No. 8,206,224 ("Farone")" Supercell, cited in Supercell Oy's Invalidity Contentions and Disclosures, Dec. 6, 2019, 349 pages.
"Exhibit F-6: U.S. Pat. No. 10,328,347 to FIFA 13 (PS3 and XBOX), Game and Manual ("FIFA 13")" Supercell, cited in Supercell Oy's Invalidity Contentions and Disclosures, Dec. 6, 2019, 534 pages.
"Exhibit F-7: U.S. Pat. No. 10,328,347 to Gratuitous Space Battles, Game and Manual ("Gratuitous Space Battles")" Supercell, cited in Supercell Oy's Invalidity Contentions and Disclosures, Dec. 6, 2019, 760 pages.
"Exhibit F-8: U.S. Pat. No. 10,328,347 to Gratuitous Tank Battles, Game and Manual ("Gratuitous Tank Battles")" Supercell, cited in Supercell Oy's Invalidity Contentions and Disclosures, Dec. 6, 2019, 535 pages.
"Exhibit F-9: U.S. Pat. No. 10,328,347 to JP 5042200 B2 ("JP200")" Supercell, cited in Supercell Oy's Invalidity Contentions and Disclosures, Dec. 6, 2019, 755 pages.
"Exhibit F-10: U.S. Pat. No. 10,328,347 to U.S. Pat. No. 9,079,105 ("Kim")" Supercell, cited in Supercell Oy's Invalidity Contentions and Disclosures, Dec. 6, 2019, 1175 pages.
"Exhibit F-11: U.S. Pat. No. 10,328,347 to Legend of Grimrock Dungeon Editor, Game and Manual ("Legend of rock")" Supercell, cited in Supercell Oy's. Invalidity Contentions and Disclosures, Dec. 8, 2019, 434 pages.
"Exhibit F-12: U.S. Pat. No. 10,328,347 to Madden 25 (PS3 and XBOX), Game and Manual ("Madden 25")" Supercell, in Supercell Oy's Invalidily Contentions and Disclosures, Dec. 6, 2019, 534 Pages.
"Exhibit F-13: U.S. Pat. No. 10,328,347 to Mastemind's In-Game Builder Post ("Mastermind")" Supercell, cited in Supercell Oy's Invalidity Contentions and Disclosures, Dec. 6, 2019, 645 pages.
"Exhibit F-14: U.S. Pat. No. 10,328,347 to Starcraft II, Game and Manual ("Starcraft II")" Supercell, cited in Supercell Oy's Invalidity Contentions and Disolosures, Dec. 6, 2019, 357 pages.
"Exhibit F-15: U.S. Pat. No. 10,328,347 to Stardrive, Game and Manual ("Stardrive")" Supercell, cited in Supercell Oy's Invalidity Contentions and Disclosures, Dec. 6, 2019, 315 pages.
"Exhibit F-16: U.S. Pat. No. 10,328,347 to Supreme Commander, Game and Manual ("Supreme Commander")" Supercell, in Supercell Oy's Invalidity Contentions and Disclosures, Dec. 6, 2019, 289 pages.

"Exhibit F-17: U.S. Pat. No. 10,328,347 to Sword of the Stars, Game and Manual ("Sword of the Stars")" Supercell, cited Supercell Oy's Invalidity Contentions and Disclosures, Dec. 6, 2019, 917 pages.
"Exhibit G-1: U.S. Pat. No. 10,335,682 to Age of Empires II, Game and Manual ("Age of Empires II")" Supercell, cited in Supercell Oy's Invalidity Contentions and Disclosures, Dec. 6, 2019, 145 pages.
"Exhibit G-2: U.S. Pat. No. 10,335,682 to Backyard Monsters, Game and Manual ("Backyard Monsters")" Supercell, cited Supercell Oy's Invalidity Contentions and Disclosures, Dec. 6, 2019, 329 pages.
"Exhibit G-3: U.S. Pat. No. 10,335,682 to U.S. Patent Application 2007/0105626("Cho")" Supercell, cited in Supercell Oy's Invalidity Contentions and Disclosures, Dec. 6, 2019, 237 pages.
"Exhibit G-4: U.S. Pat. No. 10,335,682 to SID Meier's Civilization IV, Game and Manual ("Civilization IV")" Supercell, cited Supercell Oy's Invalidity Contentions and Disclosures, Dec. 6, 2019, 155 pages.
"Exhibit G-5: U.S. Pat. No. 10,335,683 to U.S. Pat. No. 8,206,224 ("Farone")" Supercell, cited in Supercell Oy's Invalidity Contentions and Disclosures, Dec. 6, 2019, 197 pages.
"Exhibit G-6: U.S. Pat. No. 10,335,682 to FIFA 13 (PS3 and XBOX), Game and Manual ("FIFA 13")" Supercell, cited in Supercell Oy's Invalidity Contentions and Disclosures, Dec. 6, 2019, 247 pages.
"Exhibit G-7: U.S. Pat. No. 10,335,682 to Gratuitaus Space Battles, Game and Manual ("Gratuitous Space Battles")" Supercell, cited in Supercell Oy's Invalidily Contentions and Disclosures, Dec. 6, 2019, 375 pages.
"Exhibit G-8: U.S. Pat. No. 10,335,682 to Gratuitous Tank Battles, Game and Manual: ("Gratuitous Tanks Battles")" Supercell, cited in Supercell Oy's Invalidity Contentions and Disclosures, Dec. 6, 2019, 248 pages.
"Exhibit G-9: U.S. Pat. No. 10,335,682 to JP 5042200 B2 ("200")" Supercell, cited in Supercell Oy's Invalidity Contentions and Disclosures, Dec. 6, 2019, 307 pages.
"Exhibit G-10: U.S. Pat. No. 10,335,682 to U.S. Pat. No. 9,079,105 ("Kim")" Supercell, cited in Supercell Oy's Invalidity Contentions and Disclosures, Dec. 8, 2019, 482 pages.
"Exhibit G-11: U.S. Pat. No. 10,335,682 to Legend of Grimrock Dungeon Editar, Game and Manual ("Legend of Grimrock")" Supercell, cited in Supercell Oy's Invalidity Contentions and Disclosures, Dec. 6, 2019, 188 pages.
"Exhibit G-12: U.S. Pat. No. 10,335,682 to Madden 25 (PS3 and XBOX), Game and Manual ("Madden 25")" Supercell, cited in Supercell Oy's Invalidity Contentions and Disclosures, Dec. 6, 2019, 235 pages.
"Exhibit G-13: U.S. Pat. No. 10,335,682 to Mastermind's In-Game Builder Post ("Mastermind")" Supereell, cited in Supercell Oy's Invalidity Contentionsand Disclosures, Dec. 6, 2019, 336 pages.
"Exhibit G-14: U.S. Pat. No. 10,333,682 to Starcraft II, Game and Manual ("Starcraft II")" Supercell, cited in Supercell Oy's Invalidity Contentions and Disclosures, Dec. 6, 2019, 199 pages.
"Exhibit G-15: U.S. Pat. No. 10,335,682 to Stardrive, Game and Manual ("Stardrive")" Supercell, cited In Supercell Oy's Invalidity Contentions and Disclosures, Dec. 6, 2019, 140 pages.
"Exhibit G-16: U.S. Pat. No. 10,335,682 to Supreme Commander, Game and Manual ("Supreme Commander")" Supercell, cited in Supercell Oy's Invalidity Contentions and Disclosures, Dec. 6, 2019, 186 pages.
"Exhibit G-17: U.S. Pat. No. 10.335,682 to Sword of the Stars, Game and Manual ("Sword of the Stars")" Supercell, cited in Supercell Oy's Invalidity Contentions and Disclosures, Dec. 6, 2019, 480 pages.
"Exhibit H-1: U.S. Pat. No. 10,335,683 to Age of Empires II, Game and Manual ("Age of Empires II")" Supercell, cited in Supercell Oy's Invalidity Contentions and Disclosures, Dec. 6, 2019,144 pages.
"Exhibit H-2: U.S. Pat. No. 10,335,683 to Backyard Monsters, Game and Manual ("Backyard Monsters")" Supercell, cited in Supercell Oy's Invalidity Contentionsand Disclosures, Dec. 6, 2019, 253 pages.

(56) References Cited

OTHER PUBLICATIONS

"Exhibit H-3: U.S. Pat. No. 10,335,683 to U.S. Patent Application 2007/0105626 ("Cho")" Supercell, cited in Supercell Oy's Invalidity Contentions and Disclosures, Dec. 6, 2019, 210 pages.

"Exhibit H-4: U.S. Pat. No. 10,335,683 to SID Meier's Civilization IV, Game and Manual ("Civilization IV")" Supercell, cited in Supercell Oy's Invalidity Contentions and Disclosures, Dec. 6, 2019, 168 pages.

"Exhibit H-5: U.S. Pat. No. 10,335,682 to U.S. Pat. No. 6,206,224 ("Farone")" Supercell, cited In Supercell Oy's Invalidity Contentions and Disclosures, Dec. 6, 2019, 198 pages.

"Exhibit H-6: U.S. Pat. No. 10,335,683 to FIFA 13 (PS3 and XBOX), Game and Manual ("FIFA 13")" Supercell, cited in Supercell Oy's Invalidity Contentions and Disclosures, Dec. 6, 2019, 254 pages.

"Exhibit H-7: U.S. Pat. No. 10,335,683 to Gratuitous Space Battles, Game and Manual ("Gratuitous Space Battles")" Supercell, cited in Supercell Oy's Invalidity Contentions and Disclosures, Dec. 6, 2019, 330 pages.

"Exhibit H-8: U.S. Pat. No. 10,335,683 to Gratuitous Tank Battles, Game and Manual ("Gratuitous Tank Battles")" Supercell, cited in Supercell Oy's Invalidity Contentions and Disclosures, Dec. 6, 2019, 221 pages.

"Exhibit H-9: U.S. Pat. No. 10,335.683 to JP 5042200 B2 ("JP200")" Supercell, cited in Supercell Oy's Invalidity Contentions and Disclosures, Dec. 6, 2019, 256 pages.

"Exhibit H-10: U.S. Pat. No. 10,335,683 to U.S. Pat. No. 9,079,105 ("Kim")" Supercell, cited In Supercell Oy's Invalidity Contentions and Disclosures, Dec. 6, 2019, 386 pages.

"Exhibit H-11; U.S. Pat. No. 10,335,683 to Legend of Grimrock Dungeon Editor, Game and Manual ("Legend of Grimrock")" Supercell, cited In Supercell Oy's Invalidity Contentions and Disclosures, Dec. 6, 2019, 171 pages.

"Exhibit H-12: U.S. Pat. No. 10,335,683 to Madden 25 (PS3 and XBOX). Game and Manual ("Madden 25")" Supercell, cited in Supercell Oy's Invalidity Contentions and Disclosures, Dec. 6, 2019, 232 pages.

"Exhibit H-13: U.S. Pat. No. 10,335,683 to Mastermind's In-Game Builder Post ("Mastermind")" Supercell, cited in Supercell Oy's Invalidity Contentionsand Disclosures, Dec. 6, 2019, 297 pages.

"Exhibit H-14: U.S. Pat. No. 10,335,683 to Starcraft II, Game and Manual ("Starcraft II")" Supercell, cited in Supercell Oy's Invalidity Contentions and Disclosures, Dec. 6, 2019, 176 pages.

"Exhibit H-15: U.S. Pat. No. 10,335,683 to Stardrive, Game and Manual ("Stardrive")" Supercell, cited in Supercell Oy's Invalidity Contentions and Disclosures, Dec. 6, 2019, 123 pages.

"Exhibit H-16: U.S. Pat. No. 10,335,683 to Supreme Commander, Game and Manual ("Supreme Commander")" Supercell, in Supercell Oy's Invalidity Contentions and Disclosures, Dec. 6, 2019, 187 pages.

"Exhibit H-17: U.S. Pat. No. 10,335,683 to Sword of the Stars, Game and Manual ("Sword of the Stars")" Supercell, cited in Supercell Oy's Invalidity Contentions and Disclosures, Dec. 6, 2019, 400 pages.

"Exhibit I-1: U.S. Pat. No. 10,398,978 to Age of Empires II, Game and Manual ("Age of Empires II")" Supercell, cited in Supercell Oy's Invalidity Contentions and Disclosures, Dec. 6, 2019, 213 pages.

"Exhibit I-2: U.S. Pat. No. 10,398,978 to Backyard Monsters, Game and Manual ("Backyard Monsters")" Supercell, cited in Supercell Oy's Invalidity Contentions and Disclosures, Dec. 6, 2019, 563 pages.

"Exhibit I-3: U.S. Pat. No. 10,398,978 to U.S. Patent Application 2007/0105628 ("Cho")"Supercell, cited in Supercell Oy's Invalidity Contentions and Disclosures, Dec. 6, 2019, 346 pages.

"Exhibit I-4: U.S. Pat. No. 10,398,978 to SID Meter's Civilization IV, Game and: Manual ("Civilization IV")" Supercell, cited in Supercell Oy's Invalidity Contentions and Disclosures, Dec. 6, 2019, 189 pages.

"Exhibit I-5: U.S. Pat. No. 10,398,978 to U.S. Pat. No. 8,206,224 ("Farone")" Supercell cited in Supercell Oy's cited in Contentions and Disclosures, Dec. 6, 2019, 248 pages.

"Exhibit I-6: U.S. Pat. No. 10,398,978 to FIFA 13 (PS3 and XBOX), Game and Manual ("FIFA 13")" Supercell, cited in Supercell Oy's Invalidity Contentions and Disclosures, Dec. 6, 2019, 358 pages.

"Exhibit I-7: U.S. Pat. No. 10,398,978 to Gratuitous Space Battles, Game and Manual ("Gratuitous Space Battles")" Supercell, cited in Supercell Oy's Invalidity Contentions and Disclosures, Dec. 6, 2019, 525 pages.

"Exhibit I-8: U.S. Pat. No. 10,398,978 to Gratuitous Tank Battles, Game and Manual ("Gratuitous Tank Battles")" Supercell, cited in Supercell Oy's Invalidity Contentions and Disclosures, Dec. 6, 2019, 331 pages.

"Exhibit I-9: U.S. Pat. No. 10,398,978 to JP 5042200 B2 ("JP200")" Supercell, cited in Supercell Oy's Invalidity Contentions and Disclosures, Dec. 6, 2019, 496 pages.

"Exhibit I-10: U.S. Pat. No. 10,398,978 to U.S. Pat. No. 9,079,105 ("Kim")" Supetcell, cited in Supereell Oy's Invalidity Contentions and Disclosures, Dec. 6, 2019, 767 pages.

"Exhibit I-11: U.S. Pat. No. 10,398,978 to Legend of Grimrock Dungeon Editor, Game and Manual ("Legend of Grimrock")" Supercell, cited in Supercell Oy's Invalidity Contentions and Disclosures, Dec. 6, 2019, 308 pages.

"Exhibit I-12: U.S. Pat. No. 10,398,978 to Madden 25 (PS3 and XBOX), Game and Manual ("Madden 25")" Supercell, cited in Supercell Oy's Invalidity Contentions and Disclosures, Dec. 6, 2019, 331 pages.

"Exhibit I-13: U.S. Pat. No. 10,398,978 to Mastermind's In-Game Builder Post ("Mastermind")" Supercell, cited in Supercell Oy's Invalidity Contentions and Disclosures, Dec. 6. 2019, 448 pages.

"Exhibit I-14: U.S. Pat. No. 10,398,978 to Starcraft II, Game and Manual ("Starcraft II")" Supercell, cited in Supercell Oy's, Invalidity Contentionsand Disclosures, Dec. 6, 2019, 261 pages.

"Exhibit I-15: U.S. Pat. No. 10,398,978 to Stardrive, Game and Manual ("Stardrive")" Supercell cited in Supercell Oy's Invalidity Contentions and Disclosures, Dec. 6, 2012, 193 pages.

"Exhibit I-16: U.S. Pat. No. 10,398,978 to Supreme Commander, Game and Manual ("Supreme Commander")" Supercell, in Supercell Oy's Invalidily Contentions and Disclosures, Dec. 6, 2019, 193 pages.

"Exhibit I-17: U.S. Pat. No. 10,398,978 to Sword of the Stars, Game and Manual ("Sword of the Stars")" Supercell, cited in Supercell Oy's Invalidity Contentions and Disclosures, Dec. 6, 2019, 624 pages.

"Attack move—Starcraft and StarCraft II Wiki" captured by Wayback Machine on Nov. 3, 2012, 1 page.

"Mastermind's In-Game Builder Idea (with LOADS of picturesl)" captured by Wayback Machine on Sep. 15, 2013, http://web.archive.org/web/20130915081112/http://forum.supercell.net/showthread.php/149687-Mastermind-s-in-Game-Builder-idea-(with-LOADS-of-pictures!), 21 pages with Affidavit of Christopher Butler.

"Starcraft II: Wings of Liberty, Beginner's Guide" captured by Wayback Machine on Sept. 2, 2010, 1 page.

"Age of Empires II: The Age of Kings; Manual" Microsoft, 1999, 130 pages.

"GalaxyScript From GalaxyWiki" captured by Wayback Machine on Nov. 22, 2011, 1 page.

"GalaxyEdit From GalaxyWiki" captured by Wayback Machine on Nov. 23, 2011, 1 page, https://web.archive.org/web/20111123182852/http://www.galaxywiki.net/GalaxyEdit.

"StarCraft II From GalaxyWiki" captured by Wayback Machine on Nov. 23, 2011, 1 page.

"BYM Update Jun. 29, 2012 Yard Planner 21, +1 Yardage and Some bugs" The Backyard Monsters Blog, http://thebymblog.blogspot.com/2012/06/bym-update-2012-06-29-yard-planner-2-1.html, Jun. 29, 2012, 4 pages.

"Collision Detection From GalaxyWiki" captured by Wayback Machine on Dec. 21, 2011, https://web.archive.org/web/20111221103729/http://www.galaxywiki.net/Collision_Detection, 1 page.

(56) References Cited

OTHER PUBLICATIONS

"Civony Tips Help and Video Walkthrough" Jake Ludington's Digital Lifestyle, www.jakeludington.com/game_on/2009041_civony_tips_help_and_video_walkthrough.html, Apr. 17, 2009,4 pages.
"Inventory From GalaxyWiki" captured by Wayback Machine on Nov. 24, 2011, https://web.archive.org/web/20111124054909/http://www.galaxywiki.net/Inventory, 1 page.
"Publish From GalaxyWiki" captured by Wayback Machine on Nov. 24, 2011, https://web.archive.org/web/20111124054918/http://www.galaxywiki.net/Publish, 1 page.
"Text Message From GalaxyWiki" captured by Wayback Machine on Nov. 24. 2011, https://web.archive.org/web/20111124054928/http://www.galaxywiki.net/Text_Message, 1 page.
"Variables From GalaxyWiki" captured by WaybackMachine on Nov. 24, 2011, https://web.archive.org/web/20111124054951/http://www.galaxywiki.net/Variables, 1 page.
"Artificial Intelligence (AI) From GalaxyWiki" captured by Wayback Machine on Nov. 25, 2011, https://web.archive.org/web/20111125153045/http://www.galaxywiki.net/AI, 1 page.
"Kill to Cash From GalaxyWiki" captured by Wayback Machine on Dec. 11, 2011, https://web.archive.org/web/20111211070402/http://www.galaxywiki.net/Kill_to_Cash, 1 page.
"Items From GalaxyWiki" captured by Wayback Machine on Dec. 11, 2011, https://web.archive.org/web/20111211170414/http://www.galaxywiki.net/Items, 1 page.
"Build time From GalaxyWiki" captured by Wayback Machine on Dec. 21, 2011, https://web.archive.org/web/20111221103141/http://www.galaxywiki.net/Build_time, 1 page.
"Cameras From GalaxyWiki" captured by Wayback Machine on Dec. 21, 2011, https://web.archive.org/web/20111221103146/http://www.galaxywiki.net/Cameras, 1 page.
"Data Editor Theory From GalaxyWik" captured by Wayback Machine on Dec. 21, 2011, https://web.archive.org/web/20111221103151/http://www.galaxywiki.net/Data_Editor_Theory, 1 page.
"Dungeon Editor Feature List" Legend of Grimrock, www.grimtock.net/2012/09/05/dungeon-editor-feature-list/, Sep. 5, 2012, 12 pages.
"Follage From GalaxyWiki" captured by Wayback Machine on Dec. 21, 2011, http://web.archive.org/web/20111221103511/http://www.galaxywiki.net/Follage, 1 page.
"Dungeon Editor Released + Special Sale" Legend of Grimrock, www.grimrock.net/2012/10/4/dungeon-editor-released/, 4, 2012, 12 pages.
"Regions and Points From GalaxyWiki" captured by Wayback Machine on Dec. 21, 2011, http://web.archive.org/web/20111221103623/http://galaxywiki.net/Regions_and_Points, 1 page.
"Terrain Types (Textures) From GalaxyWiki" captured by Wayback Machine on Dec. 31, 2011, http://web.archiv.org/web/20111221103633/http://www.galaxywiki.net/Terrain_Types_(Textures), 1 page.
"Creating a custom button From GalaxyWiki" captured by Wayback Machine on Dec. 21, 2011, http://web.archive.org/web/20111221103741/http://www.galaxywiki.net/Creating_a_custom_button, 1 page.
"Designing an Ability From GalaxyWiki" captured by Wayback Machine on Dec. 21, 2011, http://web.archive.org/web/20111221103748/http//www.galaxywiki.net/Designing_an_Ability, 1 page.
"Trigger Functions From GalaxyWiki" captured by Wayback Machine on Dec. 21, 2011, http://web.archive.org/web/20111221103826/http://www.galaxywiki.net/Trigger_Functions, 1 page.
"Actors From GalaxyWiki" captured by Wayback Machine on Dec. 21, 2011, http://web.archive.org/web/20111221103919/http://www.galaxywiki.net/Actors, 1 page.
"FIFA 13 Gama Manual (PS3)" EA Sports, Sep. 25, 2012, 16 pages.
"Doodads From GalaxyWiki" captured by Wayback Machine on Dec. 21, 2011, http://web.archive.org/web/20111221103926/http://www.galaxywiki.net/Doodads, 1 page.
"FIFA 13 Game Manual (Xbox 360)" EA Sports, Sep. 25, 2012, 17 pages .i.
"Trigger Libraries From GalaxyWiki" captured by Wayback Machine on Dec. 21, 2011, http://web.archive.org/web/20111221104056/http://galaxywiki.net/Trigger_Libraries, 1 page.
"Banks From GalaxyWiki" captured by Wayback Machine on Dec. 21, 2011, http://web.archive.org/web/20111221104108/http://www.galaxywiki.net/Banks, 1 page.
"Leaderboards From GalaxyWiki" captured by Wayback Machine on Dec. 21, 2011, http://web.archive.org/web/20111221104128/http://www.galaxywiki.net/Leaderboards, 1 page.
"Gratuitous Space Battles: Manual for Gratuilous Space Battles, Version 1.1" Positech Games, Nov. 17, 2009, 12 pages.
"Random Integer From GalaxyWiki" captured by Wayback Machine an Dec. 30, 2011, http://web.archive.org/web/20111230140738/http://www.galaxywiki.net/Random_integer, 1 page.
"Gratuitous Tank Battles: King George's Army Warfare Manual" Positech Games, May 17, 2012, 24 pages.
"Data Editor From GalaxyWiki" captured by Wayback Machine on Mar. 14, 2012, http://web.archive.Org/web/20120314131506/http://www.galaxywikl.net/Data_Editor, 1 page.
"GalaxyWiki From GalaxyWiki" captured by Wayback Machine on Apr. 27, 2012, http://web.archive.org/web/20120427103024/http://www.galaxywiki.net/GalaxyWiki, 1 page.
"StarCraft II: Wings of Liberty, Game Guide" captured by Wayback Machine on May 9, 2012, 1 page.
"Madden 25 Game Manual (PS3)" EA Sports, Aug. 27, 2013, 29 pages.
"Madden 25 Game Manual (Xbox 360)" EA Sports, Aug. 27, 2013, 32 pages.
"SID Meier's Civilization IV Game Manual" Firaxis Games. Oct. 25, 2005, 116 pages.
"Sword of the Stars: Complete Collection Game Manual" Kerberos Productions, May 6.2010, 87 pages.
"StarDrive Game Manual" Zero Sum Games, Apr. 26, 2013, 16 pages.
"StarCratt II: Wings of Liberty, Game Guide, Units, Medivac" captured by Wayback Machine on Oct. 23, 2012, 1 page.
"StarCraft II: Wings of Liberty, Game Guide, Units, Raven" captured by WaybackMachine on Oct. 23, 2012, 1 page.
"StarCraft II: Wings of Liberty, Game Guide, Units, High Templar" captured by Wayback Machine on Oct. 23, 2012, 1 page.
"StarCraft II: Wings of Liberty, Game Guide, Units. Zealot" captured by Wayback Machine on Oct. 23, 2012,1 page.
"StarCraft II: Wings of Liberty, Game Guide, Units, Mothership" captured by Wayback Machine on Oct. 23, 2012,1 page.
"Starcraft II: Wings of Liberty, Game Guide, Units, Immortal" captured by Wayback Machine on Oct. 24, 2012, 1 page.
"StarCraft II: Wings of Liberty, Game Guide, Units, Infestor" captured by Wayback Machine on Oct. 24, 2012, 1 page.
"StarCraft II: Wings of Liberty, Game Guide, Units, Baneling" captured by Wayback Machine on Oct. 24, 2012, 1 page.
"StarCraft II: Wings of Liberty, Game Guide, Units, Nydus Worm" captured by Wayback Machine on Oct. 24, 2012, 1 page.
"Terrain From GalaxyWiki" captured by Wayback Machine on Sep. 9, 2013, 1 page.
"Editing Overview Manager From GalaxyWiki" captured by wayback Machine on Sep. 14, 2013, 1 page.
"Water From GalaxyWiki" captured by Wayback Machine on Jun. 19, 2014, 1 page.
"Missle Turret"captured by Wayback Machine an Nov. 9, 2011, https://web.archive.org/web/20111109035441/http://www.starcraft2strategy.com:80/terran/building/missile-turret/, 2 pages.
"Stracraft II: Wings of Liberty, Qulckstait Guide" Blizzard Entertainment, Jul. 27, 2010, 15 pages.
"Backyard Monsters Facebook Page" Facebook, https://www.facebook.com/BackyardMonsters/#, Dec. 6, 2019, 3 pages.
"Supreme Commander Forged Alliance; Building templates, how do I use it? From GameFAQs" captured by Wayback Machine on Jun. 5, 2010, https://web.archive.org/web/20100605103949/http://www.gamefaqs.com/boards/941687-supreme-commander-forged-alliance/49992970, 2 pages.
"Backyard Monsters From Backyard Monsters Wild" captured by Wayback Machine on Sep. 5, 2012, http://web.archive.org/web/20120905215624/http:/backyardmonsters.wikia.com/wiki/Backyard_Monsters, 2 pages.
"Backyard Monsters Wiki Navigation From Backyard Monsters Wikia" captured by Wayback Machine on Sep. 5, 2012, http://web.

(56) References Cited

OTHER PUBLICATIONS archive.org/web/20120905202600/http://backyardmonsters.wikia.com/wiki/Backyard_Mdonsters_Wiki, 7 pages.
"Block (Overworld) From Backyard Monsters Wikia" captured by Wayback Machine on Apr. 22, 2012, https://web.archive.org/web/20120422032740/http://backyardmonsters.wikia.com/wiki/Block, 8 pages.
"Build Orders From Supreme Commander Wikia" captured by Wayback Machine on Feb. 20, 2012, http://web.archive.org/web/20120220022754/http://supcom.wikia.com/wiki/Build_Orders, 2 pages.
"Thread: BYM Update 6:29 12 ~ New, More Awsome Yard Planner From Kixeye" captured by Wayback Machine on Jul. 3, 2012, https://web.archive.org/web/20120703000426/http://forums.kixeye.com/threads/231332-BYM-Update-8-29-12-New-More-Awesome-Yard-Planner, 8 pages.
"Clash of Clans From Pocket Gamer" captured by Wayback Machine on May 2, 2013, https:/web.archive.org/web/20130502020345/http://www.pocketgamer.co.uk/r/iPhone/Clash+of+Clans/review.asp?c=47309, 3 pages.
"Clash of Clans Review From GameZebo" captured by Wayback Machine on May 1, 2013, https://web.archive.org/web/20130501012448/http://www.gamezebo.com/games/clash-clans/review, 3 pages.
"Clash of Clans Review From 148Apps" captured by Wayback Machine on May 20, 2013, https://web.archive.org/web/20130520190542/http://www.148apps.com/reviews/clashclans-review, 14 pages.
"Defensive Buildings From Backyard Monsters Wikia" captured by Wayback Machine on Jun. 26, 2012, https://web.archive.org/web/20120628161253/http://backyardmonsters.wiki.com/wiki/Category.Defensive_Buidings, 12 pages.
"Legends of Grimrock: Dungeon Editor Feature List from Grimrock" captured by Wayback Machine on Sep. 8, 2012, https://web.archive.org/web/20120906011512/http://www.grimrock.net/2012/09/05/dungeon-editor-feature-list/, 11 pages.
"Legends of Grimrock: Dungeon Editor Released + Special Sale from Grimrock" captured by Wayback Machine on Oct. 6, 2012, https:/web.archive.org/web/20121006235403/http://www.grimrock.net/2012/10/04/dungeon-editor-released/, 6 pages.
"Multiplayer From Supreme Commander Wilia" captured by Wayback Machine on Feb. 20, 2012, http://web.archive.org/web/20120220032712/http://supcom.wikia.com/wiki/Multiplayer, 2 pages.
"Portal: Buildings From Backyard Monsters Wikia" captured by Wayback Machine on Jul. 2, 2012, https://web.archive.org/web/20120702080830/http://backyardmonsters.wikia.com:80/wiki/Portal:Buildings, 3 pages.
"Range From Backyard Monsters Wikia" captured by Wayback Machine on Apr. 20, 2012, https://web.archive.org/web/20120420021215/http://backyardmonsters.wikia.com/wiki/Range, 9 pages.
"Range From Supreme Commander Wikia" captured by Wayback Machine on Jun. 30, 2013, https://web.archive.org/web/20130630055935/http://supcom.wikia.com/wiki/Range, 1 pages.
"Single Player From Supreme Commander Wikia" captured by Wayback Machine on Feb. 12, 2012, https://web.archive.org/web/20120212122018/http://supcom.wikia.com/wiki/Single_player, 2 pages.
"Static Defense From Supreme Commander Wikia" captured by Wayback Machine on Jun. 10, 2012, https://web.archive.org/web/20120610180922/http://supcom.wikia.com/wiki/Static_Defence, 2 pages.
"Supreme Commander From Supreme Commander Wikia" captured by Wayback Machine on Mar. 2, 2012, https://web.archive.org/web/20120302233451/http://supcom.wikia.com/wiki/Game_Information, 3 pages.
"Town Hall From Backyard Monsters Wikia" captured by Wayback Machine on Jun. 22, 2012, https://web.archive.org/web/20120622234907/http:/backyardmonsters.wikia.com/wiki/Town_Hall, 11 pages.
"Unit From Supreme Commander Wikia" captured by Wayback Machine on Feb. 20, 2012, https://web.archive.org/web/20120220092539/http://supcom.wikia.com/wiki/Unit, 2 pages.
"Yard Planner From Backyard Monsters Wikia" captured by Wayback Machine on Jul. 1, 2012, https://web.archive.org/web/20120701184538/http://backyardmonsters.wikia.com:80/wiki/Yard_Planner, 4 pages.
Office Action dated Jan. 30, 2020 in Australian Patent Application No. 2014325117, 5 pages.
"AOE Formations" YouTube, https://www.youtube.com/watch7v=OisgwwcyiyA, Jun. 15, 2011, 5 pages.
"Empire Total War; Formation Guide (Commentary Walkthrough)" YouTube, https://www.youtube.com/watch?v=TWxWx56V_64, May 21, 2009, 4 pages.
Office Action dated Feb. 6, 2020 in Chinese Patent Application No. 201480052507.X, 6 pages (with English Translation 10 pages).
Expert Report of Mark Claypool, PH.D., United States District Court for the Eastern District of Texas Marshall Division (and Appendix A & B), May 4. 2020, 152 pages.
Petition for Post Grant Review of U.S. Pat. No. 10,300,385, Supercell Oy, dated Feb. 27, 2020, 86 pages.
Exhibit 1005: Declaration of Mark L. Claypool, Ph.D, Supercell, Feb. 21, 2020, 118 pages.
Exhibit 1010: Gratuitous Space Battles Manual, Version 1.1, and related links, Supercell, 19 pages.
Exhibit 1013: Declaration of Christopher Butler and associated Internet Archive materials, Supercell, 25 pages.
Exhibit 1007: The History of Chess, From the Time of the Early Inventions of the Game in India, till the Period of its Establishment in Western and Central Europe, Duncan Forbes, LL.D. (Wm. H. Allen & Co. 1860), Supercell, 48 pages.
Exhibit 1012: Curriculum Vitae of Mark L. Claypool, Ph.D., Supercell, Jul. 26, 2019, 50 pages.
Exhibit 1019: Review of Clash of Clans by PocketGamer, Supercell, Feb. 7, 2020, 3 pages.
Exhibit 1014: Declaration of Antti Takala Regarding Clash of Clans Version 4.120 ("Clash"), Supercell, Feb. 28, 2020, 39 pages.
Declaration 1015: Declaration of Sean Olesiuk [Mastermind's In-Game Builder Idea (with LOADS of pictures!) ("Mastermind"), Supercell, Feb. 27, 2020, 70 pages.
Exhibit 1017: Gratuitous Space Battles Manual, Version 1.1, and related links ("GSB"), Feb. 21, 2020, Supercell, 19 pages.
Petition for Post-Grant Review of U.S. Pat. No. 10,307,675, Mar. 3, 2020, Supercell, 95 pages.
Petition for Post Grant Review of U.S. Pat. 10,307,676, Mar. 4, 2020, Supercell, 91 pages.
Petition for Post Grant Review of U.S. Pat. No. 10,307,677, Mar. 3, 2020, Supercell, 89 pages.
Petition for Post Grant Review of U.S. Pat. No. 10,307,678, Mar. 3, 2020, Supercell, 81 pages.
Petition for Post Grant Review of U.S. Pat. No. 10,328,347, Mar. 24, 2020, Supercell, 93 pages.
Response and Reply Brief of Gree, Inc., United States Court of Appeals for the Federal Circuit, Mar. 27, 2020, 35 pages.
Petition for Post Grant Review of U.S. Pat. No. 10,335,682, Apr. 2, 2020, Supercell, 96 pages.
Petitioner Supecell Oy's Power of Attorney of U.S. Pat. No. 10,398,978 B2, Supercell OY, dated May 28, 2020, 3 gages.
Petition for Post Grant Review of U.S. Pat. No. 10,398,978 B2, Supercell OY, dated May 28, 2020, 87 pages.
Reply Brief on Cross-Appeal of Supercell OY, United States Court of Appeals for the Federal Circuit, May 8, 2020, 23 pages.
Patent Owner's Preliminary Response dated Jun. 17, 2020 in Case No. PGR-2020-00034 of U.S. Pat. No. 10,300,385; 56 pages.
Patent Owner's Preliminary Response dated Jun. 17, 2020 in Case No. PGR-2020-00038 of U.S. Pat. No. 10,307,675; 72 pages.
Patent Owner's Preliminary Response dated Jun. 17, 2020 in Case No. PGR-2020-00039 of U.S. Pat. No. 10,307,676; 72 pages.
Patent Owner's Preliminary Response dated Jun. 17, 2020 in Case No. PGR-2020-00042 of U.S. Pat. No. 10,307,676; 56 pages.
Patent Owner's Preliminary Response dated Jun. 17, 2020 in Case No. PGR-2020-00041 of U.S. Pat. No. 10,307,677; 66 pages.
Exhibit 1001: U.S. Pat. No. 10,398,978 to Eda, Supercell, 35 pages.
Exhibit 1002: File History of U.S. Pat. No. 10,398,978 to Eda, Supercell, 1159 pages.
Exhibit 1003: U.S. Pat. No. 9,597,594 to Eda, Supercell, 31 pages.

(56) References Cited

OTHER PUBLICATIONS

Exhibit 1004: File History of U.S. Pat. No. 9,597,594 to Eda, Supercell, 354 pages.
Exhibit 1005: The History of Chess, From the Time of the Early Inventions of the Game in India, till the Period of its Establishment in Western and Central Europe, Duncan Forbes, LL.D. (Wm. H. Allen & Co. 1860)(selected pages), Supercell 48 pages.
Exhibit 1006: Correspondence Chess in America, Bryce C. Avery (2000), (selected pages), Supercell 11 pages.
Exhibit 1007: Microsoft Computer Dictionary, 4th Ed. (1999), Supercell, 3 pages.
Exhibit 1010: Declaration of Antti Takata Regarding Clash of Clans Version 4.120 ("Clash"), Supercell, 39 pages.
Exhibit 1011: Declaration of Sean Olesiuk [Mastermind's In-Game Builder Idea (with LOADS of pictures!)("Mastermind")], Supercell, 70 pages.
Exhibit 1012: U.S. Pat. No. 9,079,105 to Jeong Hun Kim et al. ("Kim"), Supercell, 29 pages.
Exhibit 1013: Gratuitous Space Battles Manual, Version 1.1. and related links ("GSB"), Supercell, 19 pages.
Exhibit 1014: U.S. Patent Pub. No. 2007/0105626 to Cho et al. ("Cho"), Supercell, 16 pages.
Exhibit 1015: Review of Clash of Clans by PocketGamer, Supercell, 3 pages.
Exhibit 1016: Declaration of Christopher Butler and associated Internet Archive materials, Supercell, 25 pages.
Exhibit 1017: Eastern District of Texas Standing Order Regarding the Novel Coronavirus (COVID-19), Supercell, 4 pages.
Exhibit 1018: Eastern District of Texas General Order 20-03, Supercell, 3 pages.
Exhibit 1019: Claim Construction Memorandum and Order entered on May 14, 2020, in E.D. Texas Case Nos. 19-cv-00071; 19-cv-00161; 19-cv-00200; and 19-cv-00237, Supercell, 68 pages.
Petitioner's Reply to Patent Owner's Preliminary Response, PGR2020-00034 dated Jul. 6, 2020, by Counsel for Patent Owner.
Petitioner's Reply to Patent Owner's Preliminary Response, PGR2020-00039 dated Jul. 6, 2020, by Counsel for Patent Owner.
Petitioner's Reply to Patent Owner's Preliminary Response, PGR2020-00038 dated Jul. 6, 2020, by Counsel for Patent Owner.
Petitioner's Reply to Patent Owner's Preliminary Response, PGR2020-00042 dated Jul. 6, 2020, by Counsel for Patent Owner.
Petitioner's Reply to Patent Owner's Preliminary Response, PGR2020-00041 dated Jul. 6, 2020, by Counsel for Patent Owner.
Great Britain Office Action dated Jun. 12, 2020 in Great Britain Patent Application No. 1604478.6, 5 pages.
Office Action dated Aug. 6, 2020 in corresponding Indian Patent Application No. 201617010133 (with English Translation), 9 pages.
Patents Act 1977: Examination Report under Section 18(3) dated Aug. 26, 2020 in corresponding United Kingdom Patent Application No. GB1604478.6, 6 pages
Petitioner's Reply to Patent Owner's Preliminary Response, PGR2020-00052, Aug. 3, 2020, by Counsel for Patent Owner, 14 pages.
Petitioner's Reply to Patent Owner's Preliminary Response, PGR2020-00053, Aug. 3, 2020, by Counsel for Patent Owner, 14 pages.
Petitioner's Reply to Patent Owner's Preliminary Response, PGR2020-00045, Aug. 3, 2020, by Counsel for Patent Owner, 15 pages.
Patent Owner's Preliminary Response dated Jul. 16, 2020 in Case No. PGR2020-00053 of U.S. Pat. No. 10,335,683, 61 pages.
Patent Owner's Preliminary Response dated Jul. 16, 2020 in Case No. PGR2020-00052 of U.S. Pat. No. 10,335,682, 61 pages.
Patent Owner's Sur-Reply to Petitioner's Reply to Patent Owner's Preliminary Response dated Aug. 13, 2020 in Case No. PGR2020-00046 of U.S. Pat. No. 10,328,347, 16 pages.
Patent Owner's Sur-Reply to Petitioner's Reply to Patent Owner's Preliminary Response dated Aug. 13, 2020 in Case No. PGR2020-00052 of U.S. Pat. No. 10,335,682, 14 pages.
Patent Owner's Sur-Reply to Petitioner's Reply to Patent Owner's Preliminary Response dated Aug. 13, 2020 in Case No. PGR2020-00053 of U.S. Pat. No. 10,335,683, 13 pages.

Appel Dectaration-Mastermind-Supercell, Supercell Oy, Sep. 14, 2017, 41 page.
Eric Gray, "Declaration", Supercell, Apple Inc., Nov. 8, 2017, 3 pages.
Rebuttal Expert Report of Dr. Robert Akl, D.SC. Regarding Validity of U.S. Pat. No. 9,597,594, May 26, 2020, 89 pages.
Gree Letter, GTB Buy Now, Supercell, Apr. 24, 2020, 1 page https://web.arch ive .org/web/20130521 034026/http:/www.gratuitoustankbattles.com/register. html
Gree Letter, GTB FAQ, Supercell, Apr. 24, 2020, 1 page https://web.arch ive .org/web/20130621 043257 /http:/www.gratuitoustankbattles.com/faq .html
Gree Letter, GTB Manual, Supercell, 24 pages.
Gree Letter, GTB Tactics, Supercell, Apr. 24, 2020, 2 pages.
Gree Letter, GTB Manual, 24 pages.
Gree Letter, Madden 25 (PS3), SUPERCELL_PA_00001277-1305, 29 pages.
Gree Letter, Madden 25 (Xbox360), SUPERCELL_PA_DO001306-1337, 32 pages.
Sean Olesiuk (aka "Mastermind"), "Declaration", Tokyo District Court, Dec. 14, 2017, 3 pages.
"Declaration of Sean Olesiuk", SUPERCELL_GR_00267315-1384, 2020, 70 pages.
Patent Owner's Sur-Reply To Petitioner's Reply To Patent Owner's Preliminary Response dated Jul. 20, 2020 in Case PGR2020-00034 of U.S. Pat. No. 10,300,385; 14 pages.
Patent Owner's Sur-Reply To Petitioner's Reply To Patent Owner's Preliminary Response dated Jul. 20, 2020 in Case PGR2020-00038 of U.S. Pat. No. 10,307,675; 15 pages.
Patent Owner's Sur-Reply To Petitioner's Reply To Patent Owner's Preliminary Response dated Jul. 20, 2020 in Case PGR2020-00039 of U.S. Pat. No. 10,307,676; 15 pages.
Patent Owner's Sur-Reply To Petitioner's Reply To Patent Owner's Preliminary Response dated Jul. 20, 2020 in PGR2020-00041 of U.S. Patent No. 10,307.677; 15 pages.
Patent Owner's Sur-Reply To Petitioner's Reply To Patent Owner's Preliminary Response dated Jul. 20, 2020 in PGR2020-00042 of U.S. Patent No. 10,307.678; 14 pages.
Patent Owner's Preliminary Response dated Jul. 15, 2020 in Case PGR2020-00046 of U.S. Pat. No. 10,328,347; 70 pages.
Gree Letter, SUPERCELL_PA_00010504-00010506, May 4, 2020, 3 pages https://web.arch ive .org/web/20130925083827 /https:/www.gamespot.com/fifa-14/.
Gree Letter, SUPERCELL_PA_00010502-00010503, May 4, 2020, 2 pages https: //web. archive .org/web/201 30901 031945/http :/www. easports.com/mad de n-nfl/buy /U S?utm _cam pa ig n = m ad25-socia l-n a-eas-yt-socia l-n a-eas-yt-la u n ch-trliile r&utrr.
Gree Letter, SUPERCELL_PA_00010486-00010486, "Gratuitous Tank Battles Trailer ", YouTube, May 17, 2012; 2 pages.
Gree Letter, SUPERCELL_PA_00009301-00009314, Deconstructing "Clash of Clans 2: The Builder Base", Mar. 23, 2020, 14 pages https://www.deconstructoroffun.com/blog/2017 /6/18/the-good-bad-ugly-of-clash-of-clans-bu i Ider-base.
Gree Letter, SUPERCELL_PA_00010507, May 4, 2020, 1 page https:/ /web.archive .org/web/20130622063738/http:/www.gratuitoustankbattles.com/su pport. html.
Gree Letter, SUPERCELL_PA_00010712-00010717, "One Guy, Too Many Games", May 4, 2020, 6 pages https://web.archive.org/web/20121102044331 /http:/www.oneguytoomanygames.com/2012/03/gratuitous-tank-battles-preview.html.
Gree Letter, SUPERCELL_PA_00010508-00010509, "Madden 25 | List of Changes | Madden 25 New Features | Madden 25 Audible System", YouTube, May 4, 2020, 2 pages https://www.youtube.com/watch?v=wuKtJ2shqCM.
Gree Letter, SUPERCELL_PA_00010638-00010642, [Tenmega], YouTube, Mar. 24, 2020, 5 pages https://www.youtube.com/watch?v=Qx—6hRHjdM.
Gree Letter, SUPERCELL_PA_00010478-00010485, "Clash of Clans—the Winning Formula", May 4, 2020, 8 pages https://www.deconstructoroffun.eom/blog//2012/09/clash-of-clans-winning-formula.html.

(56) References Cited

OTHER PUBLICATIONS

The extended European search report dated Nov. 30, 2021 in corresponding European Patent Application No. 21179312.0 (9 pages).

Hearing decision of counterpart GB Application No. 1604478.6 dated Feb. 19, 2021; 13 pgs.

Report and Recoomendation, in the U.S. District Court for the Eastern District of Texas Marshall Division; Case 2;19-cv-0031-JRG-RSP; Document 230, filed Apr. 16, 2021; 36 pgs.

On Petition for Panel Rehearing and Rehearing en Banc, Appeals from the USPTO, Patent Trial and Appeal Board in No. PGR2018-00008, U.S. Court of Appeals for the Federal Circuit; Nos. 2018-1864, 2019-1960; Case: 19-1864; Document 73; 2 pgs., Filed Apr. 2, 2021.

Unopposed Motion far Leave to File Reply to Superell Oy's Response to Petition for Rehearing or Rehearing en Banc, Certificate of Interest, Appeal from the USPTO, Patent Trial and Appeal Board in No. PGR2018-00008, U.S. court of Appeals for the Federal Circuit Nos. 2019-1864; 2019-1960; Case: 19-1864; Document 70-1; 18 pgs., Filed Mar. 8, 2021.

Response of Supercell Oy to Petition for Rehearing or Rehearing en Banc; Certificate of Interest; On Appeal from the USPTO, Patent Trial and Appeal Board in No. PGR2018-00008.U.S. Court of Appeals far the Federal Circuit Nos. 19-1864, 19-1968; Case 19-1864; Document: 69; 25 pgs.; Filed Mar. 2, 2021.

Petition for Rehearing or Rehearing an Banc of Gree, Inc.; Certificate of Interest; Appeal from the USPTO. Patent Trial and Appeal Board in No. PGR2018-00008; U.S. Court of Appeals for the Federal Circuit; Nos. 2019-1864; 2019-1969; Case: 19-1864; Document: 63: 44 pgs.; Filed Jan. 21, 2021.

Order; DI234; *Gree, Inc.* v *Supercell OY*; Civil Action 2:19-cv-00071 (Entered: Jun. 26, 2020).

Supercell's Reply in Support of Motion for Partial Summary Judgment of No Direct Infringement of Claim 2 of U.S. Pat. No. 9,597,54; DI236; *Gree, Inc.* v *Supercell OY*; Civil Action 2:19-cv-00071 (Entered: Jun. 30, 2020).

Gree's Reply in Support of Motion to Strike Untimely Disclosed Facts and Opinions Regarding Non-Infringing Alternatives and Good-Faith Belief Defense, with Exhibits; DI238; *Gree, Inc.* v *Supercell OY*; Civil Action 2:19-cv-00071 (Entered: Jul. 2, 2020).

Gree's Reply to Supercell's Opposition to Motion to Strike Portions of the Expert Reports of Mark Claypool Regarding Invalidity and Claim Construction Opinions, with Exhibits; DI239; *Gree, Inc.* v *Supercell OY*; Civil Action 2:19-cv-00071 (Entered: Jul. 2, 2020).

Gree's Reply in Support of Motion for Partial Summary Judgment as to Supercell's Affirmative Defense of Invalidity, with Exhibits; DI240; *Gree, Inc.* v *Supercell OY*; Civil Action 2:19-cv-00071 (Entered: Jul. 2, 2020).

Supercell's Sur-Reply in Opposition to Gree's Motion to Strike Portions of the Expert Reports of Mark Claypool Regarding Invalidity and Claim Construction Opinions; DI256; *Gree, Inc.* v *Supercell OY*; Civil Action 2:19-cv-00071 (Entered: Jul. 7, 2020).

Supercell's Sur-Reply to Motion to Strike Untimely Disclosed Facts and Opinions Regarding Non-Infringing Alternatives and Lack of Intent Defense; DI258; *Gree, Inc.* v *Supercell OY*; Civil Action 2:19-cv-00071 (Entered: Jul. 8, 2020).

Report and Recommendation [Granting Plaintiff's Motion for Partial Summary Judgment as to Supercell's Affirmative Defense of Invalidity]; DI263; *Gree, Inc.* v *Supercell OY*; Civil Action 2:19-cv-00071 (Entered: Jul. 9, 2020).

Supercell's Sur-Reply in Opposition to Motion for Partial Summary Judgment as to Supercell's Affirmative Defense of Invalidity, with Exhibits; DI264; *Gree, Inc.* v *Supercell OY*; Civil Action 2:19-cv-00071 (Entered: Jul. 9, 2020).

Memorandum Order; DI267; *Gree, Inc.* v *Supercell OY*; Civil Action 2:19-cv-00071 (Entered: Jul. 9, 2020).

Gree's Sur-Reply in Opposition to Motion for Partial Summary Judgment of No Direct Infringement of Claim 2 of U.S. Pat. No. 9,597,54; DI271; *Gree, Inc.* v *Supercell OY*; Civil Action 2:19-cv-00071 (Entered: Jul. 10, 2020).

Supercell's Objection to Report and Recommendation Granting Plaintiff's Motion for Partial Summary Judgment as to Supercell's Affirmative Defense of Invalidity; DI281; *Gree, Inc.* v *Supercell OY*; Civil Action 2:19-cv-00071 (Entered: Jul. 24, 2020).

Memorandum Order [re. Motion to Strike Untimely Disclosed Facts and Opinions Regarding Non-Infringing Alternatives and Good Faith Belief Defense]; DI282; *Gree, Inc.* v *Supercell OY*; Civil Action 2:19-cv-00071 (Entered: Jul. 26, 2020).

Report and Recommendation [re. Motion for Partial Summary Judgment of No Direct Infringement of Claim 2 of U.S. Pat. No. 9,597,54]; DI283; *Gree, Inc.* v *Supercell OY*; Civil Action 2:19-cv-00071 (Entered: Jul. 26, 2020).

Gree's Response to Supercell's Objection to Report and Recommendation Granting Plaintiff's Motion for Partial Summary Judgment as to Supercell's Affirmative Defense of Invalidity; DI286; *Gree, Inc.* v *Supercell OY*; Civil Action 2:19-cv-00071 (Entered: Aug. 7, 2020).

Gree's Objection to Order Denying in Part Gree's Motion to Strike as to Supercell's Good Faith Belief Defense]; DI290; *Gree, Inc.* v *Supercell OY*; Civil Action 2:19-cv-00071 (Entered: Aug. 10, 2020).

Defendant's Objection to Order on Motion to Strike Untimely Disclosed Facts and Opinions Regarding Non-Infringing Alternatives and Good Faith Belief; DI291; *Gree, Inc.* v *Supercell OY*; Civil Action 2:19-cv-00071 (Entered: Aug. 10, 2020).

Defendant's Objection to the Report and Recommendation re. Motion for Partial Summary Judgment of No Direct Infringement of Claim 2 of U.S. Pat. No. 9,597,54]; DI292; *Gree, Inc.* v *Supercell OY*; Civil Action 2:19-cv-00071 (Entered: Aug. 11, 2020).

Order [re. Report and Recommendation Granting Plaintiff's Motion for Partial Summary Judgment as to Supercell's Affirmative Defense of Invalidity]; DI302; *Gree, Inc.* v *Supercell OY*; Civil Action 2:19-cv-00071 (Entered: Aug. 24, 2020).

Order [re. Motion to Strike Untimely Disclosed Facts and Opinions Regarding Non- lnfringing Alternatives and Good Faith Belief]; DI314; *Gree, Inc.* v *Supercell OY*; Civil Action 2:19-cv-00071 (Entered: Sep. 1, 2020).

Gree's Objection to Order Finding as Moot the Parties' Joint Motion to Sever Claims 1, 8, 10-12 and 16-19 and Stay Severed Claims; DI372; *Gree, Inc.* v *Supercell OY*; Civil Action 2:19-cv-00071 (Entered: Sep. 18, 2020).

Docket Sheet: *Gree, Inc.* v *Supercell OY*; Civil Action 2:19-cv-00071.

Examination Report of counterpart GB application No. 2015912.5, dated Nov. 4, 2020.

Final Judgment; *Gree, Inc.* v *Supercell OY*; Civil Action 2:19-cv-00070 (DI 494) and 2:19-cv-00071 (DI 373) (Entered: Oct. 28, 2020).

PGR2020-00046, Paper 13: Decision Denying Institution (U.S. Pat. No. 10,328,347).

PGR2020-00053, Paper 12: Decision Denying Institution (U.S. Pat. No. 10,335,683).

PGR2020-00034, Paper 14: Petitioner Request for Rehearing (U.S. Pat. No. 10,300,385).

PGR2020-00034, Paper 17: Decision Denying Petitioner Request for Rehearing (U.S. Pat. No. 10,300,385).

PGR2020-00038, Paper 16: Petitioner Request for Rehearing (U.S. Pat. No. 10,307,675).

PGR2020-00038, Paper 18: Decision Denying Petitioner Request for Rehearing (U.S. Pat. No. 10,307,675).

PGR2020-00039, Paper 16: Petitioner Request for Rehearing (U.S. Pat. No. 10,307,676).

PGR2020-00039, Paper 17: Decision Denying Petitioner Request for Rehearing (U.S. Pat. No. 10,307,676).

PGR2020-00041, Paper 16: Petitioner Request for Rehearing (U.S. Pat. No. 10,307,677).

PGR2020-00041, Paper 17: Decision Denying Petitioner Request for Rehearing (U.S. Pat. No. 10,307,677).

PGR2020-00046, Paper 15: Petitioner Request for Rehearing (U.S. Pat. No. 10,328,347).

PGR2020-00053, Paper 14: Petitioner Request for Rehearing (U.S. Pat. No. 10,335,683).

CAFC Decision; CAFC 2019-01864; 2019-01960 (filed Nov. 19, 2020) (re. PGR2018-00008).

(56) References Cited

OTHER PUBLICATIONS

Office Action dated Nov. 11, 2020 in United Kingdom Application Serial No. G32015873.9.
Office Action dated Nov. 11, 2020 in United Kingdom Application Serial No. G32015871.3.
Office Action dated Nov. 13, 2020 in United Kingdom Application Serial No. GB1604478.6.
Office Action dated Dec. 3, 2020 in United Kingdom Application Serial No. GB2012341.0.
Supercell's Answer to Complaint; DI018; *Gree, Inc. v Supercell OY*; Civil Action 2:19-cv-00071 (Entered: May 16, 2019).
Gree's Motion to Strike Supercell's Affirmative Defense of Invalidity, with Exhibits; DI020; *Gree, Inc. v Supercell OY*; Civil Action 2:19-cv-00071 (Entered: Jun. 6, 2019).
Supercell's Response to Gree's Motion to Strike Affirmative Defense of Invalidity, with Exhibits; DI027; *Gree, Inc. v Supercell OY*; Civil Action 2:19-cv-00071 (Entered: Jun. 28, 2019).
Gree's Reply in Support of Motion to Strike Supercell's Affirmative Defense of Invalidity; DI032; *Gree, Inc. v Supercell OY*; Civil Action 2:19-cv-00071 (Entered: Jul. 8, 2019).
Defendant's Sur-Reply to Motion to Strike Supercell's Affirmative Defense of Invalidity; DI039; *Gree, Inc. v Supercell OY*; Civil Action 2:19-cv-00071 (Entered: Jul. 6, 2019).
Gree's Sur-Reply in Support of Motion to Strike Supercell's Affirmative Defense of Invalidity; DI043; *Gree, Inc. v Supercell OY*; Civil Action 2:19-cv-00071 (Entered: Jul. 23, 2019).
Joint Motion to Sever Claims 1,8, 10-12 and 16-19 and Stay Severed Claims; DI078; *Gree, Inc. v Supercell OY*; Civil Action 2:19-cv-00071 (Entered: Oct. 10, 2019).
Memorandum Order; DI081; *Gree, Inc. v Supercell OY*; Civil Action 2:19-cv-00071 (Entered: Oct. 30, 2019).
First Amended Complaint; DI095; *Gree, Inc. v Supercell OY*; Civil Action 2:19-cv-00071 (Entered: Dec. 10, 2019).
Joint Claim Construction and Prehearing Statement; DI096; *Gree, Inc. v Supercell OY*; Civil Action 2:19-cv-00071 (Entered: Dec. 10, 2019).
Supercell's Answer to First Amended Complaint; DI098; *Gree, Inc. v Supercell OY*; Civil Action 2:19-cv-00071 (Entered: Dec. 24, 2019).
Joint Motion for Leave to Amend the Joint Claim Construction and Prehearing Statement; DI108; *Gree, Inc. v Supercell OY*; Civil Action 2:19-cv-00071 (Entered: Feb. 19, 2020).
Plaintiff's Opening Claim Construction Brief; DI110; *Gree, Inc. v Supercell OY*; Civil Action 2:19-cv-00071 (Entered: Feb. 25, 2020).
Order; DI114; *Gree, Inc. v Supercell OY*; Civil Action 2:19-cv-00071 (Entered: Feb. 25, 2020).
Supercell's Responsive Claim Construction Brief, with Exhibits DI120; *Gree, Inc. v Supercell OY*; Civil Action 2:19-cv-00071 (Entered: Mar. 10, 2020).
Plaintiff's Reply Claim Construction Brief; DI122, with Exhibits; *Gree, Inc. v Supercell OY*; Civil Action 2:19-cv-00071 (Entered: Mar. 17, 2020).
Joint Claim Construction Chart; DI123; *Gree, Inc. v Supercell OY*; Civil Action 2:19-cv-00071 (Entered: Mar. 24, 2020).
Supercell's Motion for Partial Summary Judgment of No Direct Infringement of Claim 2 of U.S. Pat. No. 9,597,54, with Exhibits; DI179; *Gree, Inc. v Supercell OY*; Civil Action 2:19-cv- 00071 (Entered: Jun. 8, 2020).
Gree's Motion to Strike Portions of the Expert Reports of Mark Claypool Regarding Invalidity and Claim Construction Opinions, with Exhibits; DI191; *Gree, Inc. v Supercell OY*; Civil Action 2:19-cv-00071 (Entered: Jun. 10, 2020).
Gree's Motion to Strike Untimely Disclosed Facts and Opinions Regarding Non-Infringing Alternatives and Good-Faith Belief Defense, with Exhibits; DI193; *Gree, Inc. v Supercell OY*; Civil Action 2:19-cv-00071 (Entered: Jun. 10, 2020).
Gree's Motion for Partial Summary Judgment as to Supercell's Affirmative Defense of Invalidity, with Exhibits; DI195; *Gree, Inc. v Supercell OY*; Civil Action 2:19-cv-00071 (Entered: Jun. 10, 2020).
Supercell's Opposition to Gree's Motion to Strike Portions of the Expert Reports of Mark Claypool Regarding Invalidity and Claim Construction Opinions, with Exhibits; DI216; *Gree, Inc. v Supercell OY*; Civil Action 2:19-cv-00071 (Entered: Jun. 24, 2020).
Gree's Opposition to Supercell's Motion for Partial Summary Judgment of No Direct Infringement of Claim 2 of U.S. Pat. No. 9,597,54, with Exhibits; DI218; *Gree, Inc. v Supercell OY*; Civil Action 2:19-cv-00071 (Entered: Jun. 24, 2020).
Supercell's Opposition to Gree's Motion to Strike Facts and Opinions Regarding Non-Infringing Alternatives and Lack of Intent, with Exhibits; DI219; *Gree, Inc. v Supercell OY*; Civil Action 2:19-cv-00071 (Entered: Jun. 24, 2020).
Supercell's Opposition to Gree's Motion for Partial Summary Judgment as to Supercell's Affirmative Defense of Invalidity, with Exhibits; DI221; *Gree, Inc. v Supercell OY*; Civil Action 2:19-cv-00071 (Entered: Jun. 24, 2020).
PGR2020-00034 Paper No. 8: Petitioner's Reply to Patent Owner's Preliminary Response Pursuant to 37 C.F.R. Section 42.208(c).
PGR2020-00034 Exhibit 1006: Correspondence Chess in America, Bryce C. Avery (2000)(selected pages).
PGR2020-00034 Exhibit 1008: Microsoft Computer Dictionary, 4th Ed. (1999).
PGR2020-00034 Exhibit 1015: May 8, 2020 Telephonic Hearing Transcript, Case Nos. 19-cv-00070, and 19-cv-00071 (E.D. Texas).
PGR2020-00034 Exhibit 1016: Declaration of Cliff Harris.
PGR2020-00034 Exhibit 2003: Supercell OY's Preliminary ineligibility Contentions, *Gree v. Supercell*, C.A. No. 2:19-cv-00200 (EDTX, Nov. 13, 2019).
PGR2020-00038 Exhibit 2008: Merriam-Webster's Collegiate Dictionary, Eleventh Edition (2007).
PGR2020-00038 Exhibit 2010: Supercell's First Supplemental Objections and Responses to Plaintiff's third Set of Interrogatories, *Gree v. Supercell*, C.A. No. 2:19-cv-OO071 (EDTX Feb. 7, 2020).
PGR2020-00039 Paper No. 9: Petitioner's Reply to Patent Owner's Preliminary Response Pursuant to 37 C.F.R. Section 42.208(c).
PGR2020-00039 Paper No. 10: Patent Owner's Sur-Reply to Petitioner's Reply to Patent Owner's Preliminary Response.
PGR2020-00039 Exhibit 2010: Supercell's First Supplemental Objections and Responses to Plaintiff's Third Set of Interrogatories, *Gree v. Supercell*, C.A. No. 2:19-cv-00071 (EDTX Feb. 7, 2020).
PGR2020-00042 Paper No. 9: Petitioner's Reply to Patent Owner's Preliminary Response Pursuant to 37 C.F.R. Section 42.208(c).
PGR2020-00042 Exhibit 1005: Declaration of Mark L. Claypool, Ph.D. ('678).
PGR2020-00046 Exhibit 1008: Declaration of Mark L. Claypool, Ph.D. ('347).
PGR2020-00046 Exhibit 1022: Declaration of Tomoki Umeya.
PGR2020-00046 Exhibit 1025: Supplemental Declaration of Dr. Mark Claypool Regarding Mastermind Exhibit.
PGR2020-00046 Exhibit 1027: Evidence Corroborating Clash.
PGR2020-00052 Exhibit 1005: Declaration of Mark L. Claypool, Ph.D. ('682).
PGR2020-00053 Exhibit 1005: Declaration of Mark L. Claypool, Ph.D. (U.S. Pat. No. 10,335,683).
PGR2020-00034, Paper 13: Decision Denying Institution Decision (U.S. Pat. No. 10,300,385).
PGR2020-00038, Paper 14: Decision Denying Institution (U.S. Pat. No. 10,307,675).
PGR2020-00039, Paper 14: Decision Denying Institution (U.S. Pat. No. 10,307,676).
PGR2020-00041, Paper 14: Decision Denying Institution (U.S. Pat. No. 10,307,677).
PGR2020-00067 Paper No. 2: Petition for Post-Grant Review of U.S. Pat. No. 10,398,978.
PGR2020-000067 Paper No. 7: Patent Owner Preliminary Response.
PGR2020-000067 Exhibit 1008: Declaration of Mark L. Claypool.
PGR2018-00008 Petitioner Reply to Patent Owner Preliminary Response, dated Mar. 21, 2018.
PGR2018-00008 Patent Owner Preliminary Response, dated Feb. 20, 2018.
PGR2018-00008 Patent Owner SurReply to Petitioner Reply to Patent Owner Preliminary Response, dated Mar. 28, 2018.
PGR2018-00008 Institution Decision, dated May 1, 2018.

(56) References Cited

OTHER PUBLICATIONS

PGR2018-00008 Transcript from Oral Hearing of Nov. 28, 2018.
Brief of Appellant Gree, Inc., CAFC 2019-01864; 2019-01960 (filed Oct. 7, 2019) (re. PGR2018-00008).
Joint Appendix, CAFC 2019-01864; 2019-01960 (filed May 15, 2020) (re. PGR2018-00008).
Supercell Citation of Supplemental Authority, CAFC 2019-01864; 2019-01960 (filed May 16, 2020) (re. PGR2018-00008).
Gree Citation of Supplemental Authority, CAFC 2019-01864; 2019-01960 (filed May 16, 2020) (re. PGR2018-00008).
Complaint; DI 001: *Gree, Inc. v Supercell OY*; Civil Action 2-19-cv-00200 (Entered May 27, 2019).
First Amended Complaint; DI 010: *Gree, Inc. v Supercell OY*; Civil Action 2-19-cv-00200 (Entered: Jun. 3, 2019).
Second Amended Complaint; DI 013: *Gree, Inc. v Supercell OY*; Civil Action 2-19-cv-00200 (Entered: Jun. 24, 2019).
Third Amended Complaint; DI 018: *Gree, Inc. v Supercell OY*; Civil Action 2-19-cv-00200 (Entered: Jul. 1, 2019).
Fourth Amended Complaint; DI 041: *Gree, Inc. v Supercell OY*; Civil Action 2-19-cv-00200 (Entered: Sep. 3, 2019).
Supercell's Answer to Fourth Amended Complaint and Counterclaims; DI 047: *Gree, Inc. v Supercell OY*; Civil Action 2-19-cv-00200) (Entered: Sep. 17, 2019).
Gree Answer to Supercell Counterclaims; DI 049: *Gree, Inc. v Supercell OY*; Civil Action 2-19-CV-00200 (Entered: Oct. 9, 2019).
In the U.S. District Court for the Eastern District of Texas/Marshall Division; *Gree, Inc., v Supercell OY*; Report and Recommendation; Civil Action No. 2:19-CV-00200-JRG; Document 220; Filed Feb. 9, 2021; 5 pgs.
U.S. District Court for the Eastern District of Texas/Marshall Division; *Gree, Inc., v Supercell OY*Defendant's Objection to Report and Recommendation Denying Summary Judgment Under Doctrine of Collateral Estoppel [DKT 232]; Civil Action No. 2:19-CV-00200-RSP; Document 232; Filed Feb. 23, 2021; 7 pgs.
In the U.S. District Court for the Eastern District of Texas/Marshall Division; *Gree, Inc., v Supercell OY*: Case No. 2:19-cv-00200-JRG-RSP; Document 242; Filed Mar. 10, 2021; Jury Trial Demanded Gree, Inc's Opposition to Supercell OY's Objection to the Report and Recommendation Denying Summary Judgment Under Doctrine of Collateral Estoppel [DKT 232]; 9 pgs.
In the U.S. District Court for the Eastern District of Texas/Marshall Division; *Gree, Inc., v Supercell OY*: Case No. 2:19-cv-00200-JRG-RSP; Document 259; Filed Apr. 8, 2021; Jury Trial Demanded Gree, Inc's Supplemental Brief Opposing to Supercell OY's Motion for Summary Judgment of Invalidigy for Failure to Claims Patent-Elegible Subject Matter Under 35 U.S.C. 101; 11 pgs.
U.S. District Court for the Eastern District of Texas/Marshall Division; Case No. 2:19-cv-00200-JRG-RSP; *Gree, Inc., v Supercell OY*; Jury Trial Demanded; Document 260; Filed Apr. 8, 2021 ; Defendant Supercell OY's Respones per Court Order in Support of its Motion for Summary Judgment of Invalidity for Failure to Claim Patent-Eligible Subject Matter Under 35 U.S.C 101 [DKT 257]; 131 pgs.
In the U.S. District Court for the Easternf District of Texas/Marshall Division; Case 2:19-cv-00200-JRG-RSP; Document 262, Filed Apr. 16, 2021; *Gree, Inc. v. Supercell OY*; Report and Recommendation; 36 pgs.
In the U.S. District Court for the Eastern District of Texas/Marshall Division; Case No. 2:19-cv-00200-JRG-RSP; Document 268, filed Apr. 26, 2021; *Gree, Inc., v Supercell OY*; Jury Trial Demanded; Gree Inc's Objection to the Report and Recommendation Granting Summary Judgment of Invalidity Under 35 U.S.C. 101: 10 pgs.
Office Action dated Sep. 1, 2020 in Japanese Patent Application No. 2019-166832 (with English translation); 12 pgs.
Corrected Expert Report of Stacy Friedman (Redacted): *Gree, Inc. v Supercell OY*; Civil Action 2-19-cv-00200 (Dated: Nov. 18, 2020).
Rebuttal Expert Report of Dr. Robert Aki, D.SC. Regarding Validity of U.S. Pat. Nos. 10,300,385; 10,307,675; 10,307,676; 10,307,677; 10,328,347; and 10,335,683 (Redacted): *Gree, Inc. v Supercell OY*; Civil Action 2-19-cv-00200 (Dated: Nov. 24, 2020).
Gree, Inc.'s Sur-Reply in Opposition To Supercell Oy's Motion for Summary Judgment of Invalidity for Failure To Claim Patent-Eligible Subject Matter Under 35 U.S.C. § 101 [DKT. 159], Case No. 2:19-cv-00200-JRG-RSP. Document 198, filed Jan. 13, 2021, 11 pages.
Gree, Inc.'s Sur-Reply in Opposition To Supercell Oy's Motion for Summary Judgment Under the Doctrine of Collateral Estoppel [DKT. 158], Case No. 2:19-cv-00200-JRG-RSP, Document 197 filed Jan. 13, 2021, 17 pages.
Gree, Inc.'S Sur-Reply To Defendant's Motion To Strike Portions of Expert Report of Dr. Robert Akl [DKT. 156], Case No. 2:19-cv-00200-JRG-RSP, Document 193, filed Jan. 13, 2021, 7 pages.
Defendant Supercell Oy's Reply in Support of Its Motion for Summary Judgment of Invalidity for Failure To Claim Patent-Eligible Subject Matter Under 35 U.S.C. § 101, Civil Action No. 2:19-cv-00200-JRG-RSP, Document 183, filed Jan. 7, 2021, 23 pages.
Defendant Supercell Oy's Reply in Support of Its Motion for Summary Judgment Under the Doctrine of Collateral Estoppel, Civil Action No. 2;19-cv-00200-JRG-RSP, Document 180, filed Jan. 7, 2021, 108 pages.
Defendant Supercell Oy's Reply in Support of Its Motion To Strike Portions of Expert Report of Gree, Inc.'s Technical Expert, Dr. Robert Akl, for Improper Claim Construction, Civil Action No. 2:19-cv-00200-JRG-RSP, Document 179, Jan. 6, 2021, 9 pages.
Plaintiff Gree, Inc.'s Reply in Support of Its Motion To Strike Opinions of Supercell's Expert Mr. Friedman Regarding Undisclosed Invalidity Opinions and Improper Claim Constructions [DKT 155], Case No. 2:19-cv-00200-JRG-RSP, Document 177, filed Jan. 6. 2021, 8 pages.
Gree, Inc.'s Opposition To Supercell Oy's Motion for Summary Judgment of Invalidity for Failure To Claim Patent-Eligible Subject Matter Under 35 U.S.C. § 101 [DKT. 159], Case No. 2:19-cv-00200-JRG-RSP, Document 174, filed Jan. 4, 2021, 113 pages.
Gree, Inc.'s Opposition To Supercell Oy's Motion for Summary Judgment Under the Doctrine of Collateral Estoppel [DKT. 158], Case No. 2:19-cv-00200-JRG-RSP, Document 170, filed Dec. 30, 2020, 131 pages.
Gree, Inc.'S Opposition To Defendant'S Motion To Strike Portions of Expert Report of Dr. Robert Akl, Case No. 2:19-cv-00200-JRG-RSP, Document 167, filed Dec. 30, 2020, 126 pages.
Defendant Supercell Oy's Motion To Strike Portions of Expert Report of Gree, Inc.'s Technical Expert, Dr. Robert Akl, for Improper Claim Construction, Civil Action No. 2:19-cv-00200-JRG-RSP, Document 166, filed Dec. 17, 2020, 24 pages.
Defendant Supercell Oy's Motion for Summary Judgment Under the Doctrine of Collateral Estoppel, Civil Action No. 2:19-cv-00200-JRG-RSP, Document 163, filed Dec. 16, 2020, 431 pages.
Plaintiff Gree, Inc.'s Motion To Strike Opinions of Supercell's Expert Mr. Friedman Regarding Undisclosed Invalidity Opinions and Improper Claim Constructions, Case No. 2:19-cv-00200-JRG-RSP, Document 160, filed Dec. 15, 2020, 90 pages.
Defendant Supercell Oy's Motion for Summary Judgment of Invalidity for Failure To Claim Patent-Eligible Subject Matter Under 35 U.S.C. § 101, Civil Action No. 2:19-cv-00200-JRG-RSP, Document 159, filed Dec. 15, 2020, 25 pages.
Fifth Amended Complaint; DI 067: *Gree Inc. v Supercell OY*; Civil Action 2-19-cv-00200 (Entered: Jan. 21, 2020).
Joint Claim Construction and Prehearing Statement, with Exhibits; DI 069: *Gree Inc. v Supercell OY*; Civil Action 2-19-cv-00200 (Entered: Jan. 28, 2020).
Supercell Answer to Fifth Amended Complaint and Counterclaims, DI 070: *Gree Inc. v Supercell OY*; Civil Action 2-19-cv-00200 (Entered: Feb. 4, 2020).
Gree Motion to Amended Infringement Contentions, with Exhibits; DI 073: *Gree Inc. v Supercell OY*; Civil Action 2-19-cv-00200 (Entered: Feb. 18, 2020).
Plaintiff Opening Claim Construction Brief; DI 075: *Gree Inc. v Supercell OY*; Civil Action 2-19-cv-00200 (Entered: Feb. 25, 2020).
Plaintiff's Answer to Supercell's Countercaims; DI 076: *Gree Inc. v Supercell OY*; Civil Action 2-19-cv-00200 (Entered: Feb. 26, 2020).

(56) References Cited

OTHER PUBLICATIONS

Defendant's Response in Opposition to Plaintiff's Motion for Leave to Amend Infringement Contentions, with Exhibits; DI 078: *Gree Inc.* v *Supercell OY*; Civil Action 2-19-cv-00200 (Entered: Mar. 3, 2020).
Defendant Supercell's Responsive Claim Construction Breif, with Exhibits; DI 082: *Gree Inc.* v *Supercell OY*; Civil Action 2-19-cv-00200 (Entered: Mar. 10, 2020).
Plaintiff's Reply In Support of its Motion to Amend Infringement Contentions; DI 083: *Gree Inc.* v *Supercell OY*; Civil Action 2-19-cv-00200 (Entered: Mar. 11, 2020).
Plaintiff's Reply Claim Construction Brief, with Exhibits; DI 084: *Gree Inc.* v *Supercell OY*; Civil Action 2-19-cv-00200 (Entered: Mar. 17, 2020).
Joint Claim Construction Chart, with Exhibits; DI 086: *Gree Inc.* v *Supercell OY*; Civil Action 2-19-cv-00200 (Entered: Mar. 24, 2020).
Gree Notice of Supplemental Authority Regarding Claim Construction, with Exhibits; DI 088: *Gree Inc.* v *Supercell OY*; Civil Action 2-19-cv-00200 (Entered: Apr. 7, 2020).
Gree Notice of Filing Hearing Presentation (with Markman Presentation attached); DI 091: *Gree Inc.* v *Supercell OY*; Civil Action 2-19-cv-00200 (Entered: Apr. 15, 2020) [Presentation identically filed across additional cases 2:19-cv-00070; 2:19-cv-00161; 2:19-cv000171 and 2:19-cv-00237].
Supercell Notice of Filing Hearing Presentation (with Markman Presentation attached); DI094: *Gree Inc.* v *Supercell OY*; Civil Action 2-19-cv-00200 (Entered: Apr. 16, 2020) [Presentation identically filed across additional cases 2:19-cv-00070; 2:19-cv-00071; 2:19-cv-000161; 2:19-cv000172 and 2:19-cv-00237].
Claim Construction Memorandum Opinion and Order; DI 114: *Gree Inc.* v *Supercell OY*; Civil Action 2-19-cv-00200 (Entered: May 14, 2020) [also of record in copending related civil action Nos. 2:19-cv000171; 2:19-cv-00071; 2:19-cv-00237].
Supercell Objection to the Claim Construction Memorandum Opinion and Order; DI 117: *Gree Inc.* v *Supercell OY*; Civil Action 2-19-cv-00200 (Entered: May 26, 2020) [also of record in copending related civil action Nos. 2:19-cv-000071; 2:19-cv-00161; 2:19-cv-00237].
Plaintiff's Response to Defendant's Objection to the Claim Construction Memorandum Opinion and Order; DI 119: *Gree, Inc.* v *Supercell OY*; Civil Action 2-19-cv-00200 (Entered Jun. 10, 2020) [also of record in copending related civil action Nos. 2:19-cv-00071; 2:19-cv-00161; 2:19-00237].
Order [on Claim Construction Memorandum Opinion and Order]; DI121: *Gree, Inc.* v *Supercell OY*; Civil Action 2-19-cv-00200 (Entered Jun. 29, 2020) [also of record in copending related civil action Nos. 2:19-cv-00071; 2:19-cv-00161; 2:19-00237].
Stipulation of Partial Dismissal as to Counts V, VIII and IX of the Fifth Amended Complaint With Prejudice; DI128: *Gree, Inc.* v *Supercell OY*; Civil Action 2-19-cv-00200 (Entered Sep. 4, 2020).
Order [Granting Stipulation of Partial Dismissal as to Counts V, VIII and IX of the Fifth Amended Complaint With Prejudice]; DI129: *Gree, Inc.* v *Supercell OY*; Civil Action 2-19-cv-00200 (Entered Sep. 23, 2020).
Docket Sheet: *Gree, Inc.* v *Supercell OY*; Civil Action 2-19-cv-00200.
Complaint for Declaratory Judgment Regarding Patent Non-Infringement; DI001: *Supercell OY* v *Gree, Inc.*; Civil Action 2-19-cv-04207 (Entered Jul. 22, 2019).
Plaintiff Supercell's Notice of Voluntary Dismissal; DI009; *Supercell OY* v *Gree, Inc*; Civil Action 3-19-cv-04207 (Entered: Jul. 30, 2019) (Entered: Jul. 30, 2019).
Docket Sheet: *Supercell OY* v *Gree, Inc*; Civil Action 3-19-cv-04207.
Complaint for Declaratory Judgment Regarding Patent Non-Infringement and Invalidity; Breach of Contract (with Exhibits); DI001; *Supercell OY* v *Gree, Inc*; Civil Action 3-19-cv-01106 (Entered: Feb. 28, 2019).

First Complaint for Declaratory Judgment Regarding Patent Non-Infringement and Invalidity; Breach of Contract (with Exhibits); DI007; *Supercell OY* v *Gree, Inc*; Civil Action 3-19-cv-01106 (Entered: Mar. 1, 2019).
Docket Sheet; *Supercell OY* v *Gree, Inc*; Civil Action 3-19-cv-01106 (Entered: Feb. 28, 2019).
Complaint for Declaratory Judgment Regarding Patent Non-Infringement and Invalidity; Breach of Contract (with Exhibits); DI001; *Supercell OY* v *Gree, Inc*; Civil Action 2:20-cv-00084 (Entered: Feb. 28, 2019).
First Amended Complaint for Declaratory Judgment Regarding Patent Non-Infringement and Invalidity; Breach of Contract (with Exhibits); DI007; *Supercell OY* v *Gree, Inc*; Civil Action 2:20-cv-00084 (Entered: Mar. 1, 2019).
Supercell's Notice of Voluntary Dismissal; DI083; *Supercell OY* v *Gree, Inc*; Civil Action 2:20-cv-00084 (Entered: Jun. 19, 2019).
Docket Sheet: *Supercell OY* v *Gree, Inc*; Civil Action 2:20-cv-00084.
Complaint; DI001; *Gree, Inc* v *Supercell OY*; Civil Action 2:19-cv-00070.
First Amended Complaint; DI094; *Gree, Inc.* v *Supercell OY*; Civil Action 2:19-cv-00070 (Entered: Dec. 10, 2019)
Joint Claim Constructicn and Prehearing Statement; DI095; *Gree, Inc.* v *Supercell OY*; Civil Action 2:9-cv-00070 (Entered: Dec. 10, 2019).
Joint Motion for Leave to Amend the Claim Construction and Prehearing Statement; DI113; *Gree, Inc.* v *Supercell OY*; Civil Action 2:19-cv-00070 (Entered: Feb. 21, 2020).
Plaintiff's Opening Claim Construction Brief; DI115; *Gree, Inc.* v *Supercell OY*; Civil Action 2:19-cv-00070 (Entered: Feb. 25, 2020).
Supercell's Answer to First Amended Complaint and Counterclaims; DI125; *Gree, Inc.* v *Supercell OY*; Civil Action 2:19-cv-00070 (Entered: Mar. 9, 2020).
Supercell's Responsive Claim Construction Brief; DI128; *Gree, Inc.* v *Supercell OY*; Civil Action 2:19-cv-00070 (Entered: Mar. 12, 2020).
Plaintiff's Reply Claim Construction Brief; DI130; *Gree, Inc.* v *Supercell OY*; Civil Action 2:19-cv-00070 (Entered: Mar. 17, 2020).
Joint Claim Construction Chart; DI131; *Gree, Inc.* v *Supercell OY*; Civil Action 2:19-cv-00070 (Entered: Mar. 24, 2020).
Supercell's First Amended Answer to First Amended Complaint and Counterclaims; DI132; *Gree, Inc.* v *Supercell OY*; Civil Action 2:19-cv-00070 (Entered: Mar. 30, 2020).
Plaintiff's Answer to Supercell's First Amended Answer to First Amended Complaint and Counterclaims; DI139; *Gree, Inc.* v *Supercell OY*; Civil Action 2:19-cv-00070 (Entered: Apr. 13, 2020).
Supercell's Opposed Motion for Leave to Amend PR 3-3 Invalidity Contentions; DI142; *Gree, Inc.* v *Supercell OY*; Civil Action 2:19-cv-00070 (Entered: Apr. 15, 2020).
UK Patent Office Examination Report of counterpart GB application No. 2012341.0, dated Sep. 21, 2020.
Battle.net-Welcome to the Battle.net Web Site! https://web.archive.orgiweb/20121121110859/http://classic.battle.netlintro.shtml; Nov. 6, 2017 (2 pgs).
Gree's Opposition to Supercell's Motion for Leave to Amend Invalidity Contentions; DI159; *Gree, Inc.* v *Supercell OY*; Civil Action 2:19-cv-00070 (Entered: Apr. 29, 2020).
Supercell's Reply In Support of Opposed Motion for Leave to Amend Invalidity Contentions; DI167; *Gree, Inc.* v *Supercell OY*; Civil Action 2:19-cv-00070 (Entered: May 6, 2020).
Claim Construction Memorandum Opinion and Order; DI175; *Gree, Inc.* v *Supercell OY*; Civil Action 2:19-cv-00070 (Entered: May 11, 2020) [identically filed in 2:19-cv-00172].
Gree's Sur-Reply in Opposition to Supercell's Motion for Leave to Amend Invalidity; DI180; *Gree, Inc.* v *Supercell OY*; Civil Action 2:19-cv-00070 (Entered: May 14, 2020).
Supercell's Objection to the Claim Construction Memorandum Opinion and Order; DI185; *Gree, Inc.* v *Supercell OY*; Civil Action 2:19-cv-00070 (Entered: May 26, 2020) [identically filed in 2:19-cv-00172].

(56) References Cited

OTHER PUBLICATIONS

Supercell's Motion for Partial Summary Judgment of No Direct Infringement of Certain Method, System and Appartus Claims; DI194; *Gree, Inc. v Supercell OY*; Civil Action 2:19-cv-00070 (Entered: Jun. 8, 2020).
Supercell's Motion for Summary Judgment of No Infringement of U.S. Pat. No. 9,604,137 and U.S. Pat. No. 9,956,481; DI200; *Gree, Inc. v Supercell OY*; Civil Action 2:19-cv-00070 (Entered: Jun. 8, 2020).
Supercell's Motion for Summary Judgment of Invalidity for Failure to Claim Patent Eligible Subject Matter; DI219; *Gree, Inc. v Supercell OY*; Civil Action 2:19-cv-00070 (Entered: Jun. 10, 2020).
Gree's Response to Defendant's Objection to the Claim Construction Memorandum Opinion and Order; DI220; *Gree, Inc. v Supercell OY*; Civil Action 2:19-cv-00070 (Entered: Jun. 10, 2020) [identically filed in 2:19-cv-00172].
Supercell's Motion for Summary Judgment of No Infringement of U.S. Pat. No. 9,774,655: DI221; *Gree, Inc. v Supercell OY*; Civil Action 2:19-cv-00070 (Entered: Jun. 11, 2020).
Supercell's Motion for Summary Judgment of Invalidity of U.S. Pat. No. 9,795,873: DI222; *Gree, Inc. v Supercell OY*; Civil Action 2:19-cv-00070 (Entered: Jun. 12, 2020).
Gree's Opposition to Motion for Summary Judgment of Invalidity of U.S. Pat. No. 9,795,873; DI230; *Gree, Inc. v Supercell OY*; Civil Action 2:19-cv-00070 (Entered: Jun. 22, 2020).
Gree's Opposition to Motion for Summary Judgment of Invalidity for Failure to Claim Patent-Eligible Subject Matter; DI244; *Gree, Inc. v Supercell OY*; Civil Action 2:19-cv-00070 (Entered: Jun. 22, 2020).
Supplemental Claim Construction Order; DI252; *Gree, Inc. v Supercell OY*; Civil Action 2:19-cv-00070 (Entered: Jun. 23, 2020).
Gree's Opposition to Motion for Partial Summary Judgment of No Direct Infringement of Certain Method, System and Apparatus Claims; DI259; *Gree, Inc. v Supercell OY*; Civil Action 2:19-cv-00070 (Entered: Jun. 24, 2020).
Supercell's Reply in Support of Motion for Summary Judgment of No Infringement of U.S. Pat. No. 9,774,655; DI283; *Gree, Inc. v Supercell OY*; Civil Action 2:19-cv-00070 (Entered: Jun. 30, 2020).
Supercell's Reply in Support of Motion for Summary Judgment of No Direct Infringement of Certain Method, System and Appartus Claims; DI287; *Gree, Inc. v Supercell OY*; Civil Action 2:19-cv-00070 (Entered: Jun. 30, 2020).
Memorandum Order; DI288; *Gree, Inc. v Supercell OY*; Civil Action 2:19-cv-00070 (Entered: Jul. 2, 2020).
Supercell's Reply in Support of Motion for Summary Judgment of Invalidity for Failure to Claim Patent-Eligible Subject Matter; DI291; *Gree, Inc. v Supercell OY*; Civil Action 2:19-cv-00070 (Entered: Jul. 2, 2020).
Supercell's Reply in Support of Motion for Summary Judgment of No Infringement of U.S. Pat. No. 9,604,137 and U.S. Pat. No. 9,956,481; DI294; *Gree, Inc. v Supercell OY*; Civil Action 2:19-cv-00070 (Entered: Jul. 2, 2020).
Gree's Sur-Reply in Opposition to Motion for Summary Judgment of Invalidity of U.S. Pat. No. 9,795,873; DI306; *Gree, Inc. v Supercell OY*; Civil Action 2:19-cv-00070 (Entered: Jul. 7, 2020).
Gree's Sur-Reply in Opposition to Motion for Summary Judgment of Invalidity for Failure to Claim Patent-Eligible Subject Matter; DI317; *Gree, Inc. v Supercell OY*; Civil Action 2:19-cv-00070 (Entered: Jul. 8, 2020).
Gree's Sur-Reply to Motion for Partial Summary Judgment of No Direct Infringemnet of Certain Method, System and Apparatus Claims; DI321; *Gree, Inc. v Supercell OY*; Civil Action 2:19-cv-00070 (Entered: Jul. 8, 2020).
Gree's Sur-Reply in Opposition to Motion for Summary Judgment of No Infringement of U.S. Pat. No. 9,774,655; DI322; *Gree, Inc. v Supercell OY*; Civil Action 2:19-cv-00070 (Entered: Jul. 8, 2020).
Report and Recommendation; DI325; *Gree, Inc. v Supercell OY*; Civil Action 2:19-cv-00070 (Entered: Jul. 9, 2020).
Report and Recommendation; DI326; *Gree, Inc. v Supercell OY*; Civil Action 2:19-cv-00070 (Entered: Jul. 9, 2020).
Report and Recommendation; DI335; *Gree, Inc. v Supercell OY*; Civil Action 2:19-cv-00070 (Entered: Jul. 10, 2020).
Report and Recommendation; DI342; *Gree, Inc. v Supercell OY*; Civil Action 2:19-cv-00070 (Entered: Jul. 18, 2020).
Defendant's Objection to the Report and Recommendation Regarding Motion for Summary Judgment of Invalidity of U.S. Pat. No. 9,795,873; DI349; *Gree, Inc. v Supercell OY*; Civil Action 2:19-cv-00070 (Entered: Jul. 23, 2020).
Defendant's Objection to the Report and Recommendation Regarding Motion for Summary Judgment of Invalidity of U.S. Pat. No. 9,774,655; DI353; *Gree, Inc. v Supercell OY*; Civil Action 2:19-cv-00070 (Entered: Jul. 24, 2020).
Report and Recommendation; DI355; *Gree, Inc. v Supercell OY*; Civil Action 2:19-cv-00070 (Entered: Jul. 27, 2020).
Order; DI358; *Gree, Inc. v Supercell OY*; Civil Action 2:19-cv-00070 (Entered: Jul. 29, 2020).
Gree's Response to Supercell's Objection to Memorandum Order Denying Supercell's Motion for Leave to Amend P.R. 3-3 Invalidity Contentions; DI349; *Gree, Inc. v Supercell OY*; Civil Action 2:19-cv-00070 (Entered: Jul. 31, 2020).
Defendant's Objection to the Report and Recommendation Regarding Motion for Summary Judgment of Infringement of Certain Method, System and Apparatus Claims; DI364; *Gree, Inc. v Supercell OY*; Civil Action 2:19-cv-00070 (Entered: Aug. 3, 2020).
Report and Recommendation; DI366; *Gree, Inc. v Supercell OY*; Civil Action 2:19-cv-00070 (Entered: Aug. 6, 2020).
Order; DI367; *Gree, Inc. v Supercell OY*; Civil Action 2:19-cv-00070 (Entered: Aug. 6, 2020).
Gree Response to Supercell's Objection to the Report and Recommendation Denying Motion for Summary Judgement of Invalidity U.S. Pat. No. 9,795,873; DI368; *Gree, Inc. v Supercell OY*; Civil Action 2:19-cv-00070 (Entered: Aug. 7, 2020).
Gree's Response to Supercell's Objection to the Report and Recommendation Regarding Motion for Summary Judgment of Invalidity of U.S. Pat. No. 9,774,655; DI370; *Gree, Inc. v Supercell OY*; Civil Action 2:19-cv-00070 (Entered: Aug. 7, 2020).
Gree's Partial Objection to Report and Recommendation Denying Supercell's Motion for Summary Judgment of No Infringement of of U.S. Pat. Nos 9,604,137 and 9,956,481; DI375; *Gree, Inc. v Supercell OY*; Civil Action 2:19-cv-00070 (Entered: Aug. 10, 2020).
Defedant's Objection to the Report and Recommendation Regarding Motion for Summary Judgment of No Infringement of U.S. Pat. Nos. 9,604,137 and 9,956,481; DI379; *Gree, Inc. v Supercell OY*; Civil Action 2:19-cv-00070 (Entered: Aug. 10, 2020).
Defedant's Motion to Clarify or Reconsider Report and Recommendation Regarding Motion for Summary Judgment of Invalidity for Failure to Claim Patent-Eligible Subject Matter; DI379; *Gree, Inc. v Supercell OY*; Civil Action 2:19-cv-00070 (Entered: Aug. 14, 2020).
Gree's Resoponse to Defendant's Objection to the Report and Recommendation Regarding Motion for Summary Judgment of No Indirect Infringement of Certain Method, System and Apparatus Claims; DI387; *Gree, Inc. v Supercell OY*; Civil Action 2:19-cv-00070 (Entered: Aug. 17, 2020).
Gree's Sur-Reply in Opposition to Supercell's Motion for Leave to Amend Invalidity Contentions; DI180; *Gree, Inc. v Supercell OY*; Civil Action 2:19-cv-00070 (Entered: May 14, 2020).
Supercell's Motion for Partial Summary Judgment of No Direct Infringement of Certain Method, System and Apparatus Claims; DI194; *Gree, Inc. v Supercell OY*; Civil Action 2:19-cv-00070 (Entered: Jun. 8, 2020).
Supercell's Motion for Summary Judgment of No Infringement of U.S. Pat. No. 9,604,137 and 9,956,481; DI200; *Gree, Inc. v Supercell OY*; Civil Action 2:19-cv-00070 (Entered: Jun. 8, 2020).
Gree's Opposition to Motion for Partial Summary Judgment of No Direct Infringement of Cetain Method, System and Apparatus Claims; DI259; *Gree, Inc. v Supercell OY*; Civil Action 2:19-cv-00070 (Entered: Jun. 24, 2020).
Supercell's Reply in Support of Motion for Partial Summary Judgment of No Direct Infringement of Certain Method, System and Apparatus Claims; DI287; *Gree, Inc. v Supercell OY*; Civil Action 2:19-cv-00070 (Entered: Jun. 30, 2020).

(56) References Cited

OTHER PUBLICATIONS

Supercell's Reply in Support of Motion for Summary Judgment of No Infringment of U.S. Pat. No. 9,604,137 and 9,956,481; DI294; *Gree, Inc. v Supercell OY*; Civil Action 2:19-cv-00070 (Entered: Jul. 2, 2020).
Gree's Sur-Reply in Opposition to Motion for Summary Judgment of Invalidity of U.S. Pat. No. 9,795,873; DI306; *Gree, Inc. v Supercell OY*; Civil Action 2:19-cv-00070 (Entered: Jul. 2, 2020).
Gree's Sur-Reply to Motion for Partial Summary Judgment of No Direct Infringement of Certain Method. System and Apparatus Claims; DI321; *Gree, Inc. v Supercell OY*; Civil Action 2:19-cv-00070 (Entered: Jul. 8, 2020).
Gree's Response to Supercell's Objection to Memorandum Order Denying Supercell's Motion for Leave Amend P.R. 3-3- Invalidity Contentions; DI361; *Gree, Inc. v Supercell OY*; Civil Action 2:19-cv-00070 (Entered: Jul. 31, 2020).
Defendant's Objection to the Report and Recommendation Regarding Motion for Summary Judgment of No Indirect Infringement of Certain Method, System and Apparatus Claims; DI364; *Gree, Inc. v Supercell OY*; Civil Action 2:19-cv-00070 (Entered: Aug. 3, 2020).
Gree's Response to Supercell's Objection to the Report and Recommendation Denying Motion for Summary Judgement of Invalidity of U.S. Pat. No. 9,795,873; DI368; *Gree, Inc. v Supercell OY*; Civil Action 2:19-cv-00070 (Entered: Aug. 7, 2020).
Gree's Partial Objection to Report and Recommendation Denying Supercell's Motion for Summary Judgment of No Infringment of U.S. Pat. Nos. 9,640,137 and 9,956,481; DI375; *Gree, Inc. v Supercell OY*; Civil Action 2:19-cv-00070 (Entered: Aug. 10, 2020).
Defendant's Objection to the Report and Recommendation Regarding Motion for Summary Judgment of No Infringement of U.S. Pat. Nos. 9,604,137 and 9,956,481; DI379; *Gree, Inc. v Supercell OY*; Civil Action 2:19-cv-00070 (Entered: Aug. 8, 2020).
Defendant's Motion to Clarify or Reconsider Report and Recommendation Regarding Motion for Summary Judgment of Invalidity for Failure to Claim Patent-Eligible Subject Matter; DI385; *Gree, Inc. v Supercell OY*; Civil Action 2:19-cv-00070 (Entered: Aug. 14, 2020).
Gree's Response to Defedent's Objection to the Report and Recommendation Regarding Motion for Summary Judgment of No Indirect Infringement of Certain Method, System and Apparatus Claims; DI387; *Gree, Inc. v Supercell OY*; Civil Action 2:19-cv-00070 (Entered: Aug. 17, 2020).
Order; DI399; *Gree, Inc. v Supercell OY*; Civil Action 2:19-cv-00070 (Entered: Aug. 21, 2020).
Order; DI400; *Gree, Inc. v Supercell OY*; Civil Action 2:19-cv-00070 (Entered: Aug. 21, 2020).
Order; DI403; *Gree, Inc. v Supercell OY*; Civil Action 2:19-cv-00070 (Entered: Aug. 24, 2020).
Order; DI404; *Gree, Inc. v Supercell OY*; Civil Action 2:19-cv-00070 (Entered: Aug. 24, 2020).
Defendant's Response to Plaintiff's Partial Objection to the Report and Recommendation Regarding Motion for Summary Judgment of No Infringement of U.S. Pat. Nos. 9,604,137 and 9,956,481; DI410; *Gree, Inc. v Supercell OY*; Civil Action 2:19-cv-00070 (Entered: Aug. 24, 2020).
Jury Verdict Form; *Gree, Inc. v Supercell OY*; Civil Action 2:19-cv-00070 (DI47) and 2:19-cv-00071 (DI350) (Entered: Sep. 18, 2020).
Defendant's Corrected Objection to the Report and Recommendation Regarding Motion for Summary Judgment of No Infringement of U.S. Pat. Nos. 9,604,137 and 9,956,481; DI395; *Gree, Inc. v Supercell OY*; Civil Action 2:19-cv-00070 (Entered: Aug. 20, 2020).
Complaint; DI001; *Gree, Inc. v Supercell OY*; Civil Action 2:19-cv-00070 (Entered: Feb. 18, 2020).
Notice of Reasons for Refusal dated May 10, 2022 in corresponding Japanese Patent Application No. 2021-069193 (with English machine translation)(8 page).
Introduction of Nobunaga Toshinuki Propagation Fighting System, gamecity [online],2002 , [Search date : Apr. 20, 2022], https://web.archive.org/web/20020808125919/http://www.gamecity.ne.jp/products/products/ee/new/retupu/retupu_03.htm, [Search date : Apr. 8, 2008] (2 pages).
The Nationals of Nobunaga, Day **, or Dec. 6, 2016 and Dec. 20, 2016, [online] http://yuzurihablog.blog79.fc2.com/blog-entry-136.html [Search date : Apr. 2022,] [online],2005 (23 pages).
Judicial judgment of Uwajima, Japan, National Agency of Academic, Technical Agency, vol. 90, No. 05, No. 20, [online],2013 , [Search date : Apr. 20, 2022], http://blog.livedoor.jp/imoq/archives/28186548.html, [Search date: Apr., 2016]Nobunaga (9 pages).
U.S. Non-Final Office Action dated Aug. 25, 2021 in copeiding U.S. Appl. No. 16/528,415, Taiki Eda (75 pages).
U.S. Final Office Action dated Mar. 9, 2022 in copeiding U.S. Appl. No. 16/528,415, Taiki Eda (21 pages)
U.S. Advisory Action dated Jun. 24, 2022 in copeiding U.S. Appl. No. 16/528,415, Taiki Eda (3 pages)
U.S. Non-Final office Action dated Sep. 8, 2022 in copeiding U.S. Appl. No. 16/528,415, Taiki Eda(17 pages).
Notice of Reasons for Refusal dated Oct. 25, 2022 in corresponding Japanese Patent Application No. 2021-069193, citing References 20-23 herein. (with English machine translation)(12 pages)
The System Software Alpha, "Large Strategy Online" provided by EZ applications, 4gamer.net [online], May 15, 2008, Search date: Oct. 19, 2022 (documents showing well-known arts; documents newly cited) htth://www.4gamer.net/games/045/G004585/20080515007.
Sale of Koei, Internet Fighting, "Nobunaga," in October, PC Watch [online], Jun. 29, 1998, https://pc.watch.impress.co.jp/docs/article/980629/koei.htm, date of search: Oct. 29, 2015 (Document showing well- known arts; document newly cited).
A method of battle! "Ambition of Nobunaga" A method of fighting with 10 times more fun on the Internet, MYCON BASIC Magazine, Radio Newsletter, Dec. 1, 1998, vol. 17, No. 12, pp. 172 to 174 (documents showing well-known arts; document newly cited documents).
Renovation World Stern From The Main Tan, Telecommunication PlayStation, MediaWorks, Oct. 31, 2003, vol. 9, pp. 27 and 142 (documents showing well-known arts; documents newly cited).
Office Action dated Jan. 16, 2023, issued in corresponding European patent application No. 21179312.0 citing document 1.

\* cited by examiner

| FACILITY | TYPE | POSITION | ... |
|---|---|---|---|
| F_001 | S_001 | (3, 2) | ... |
| F_002 | S_001 | (3, 3) | ... |
| F_003 | S_002 | (4, 2) | ... |
| ... | ... | ... | ... |

| TYPE | NAME | IMAGE | ... |
|---|---|---|---|
| S_001 | WALL | S_001.jpg | ... |
| S_002 | HOUSE | S_002.jpg | ... |
| S_003 | CASTLE | S_003.jpg | ... |
| ... | ... | ... | ... |

| TEMPLATE | IMAGE | TYPE | POSITION | ... |
|---|---|---|---|---|
| T_001 | T_001.jpg | S_001 | (1, 1) | ... |
|  |  | S_001 | (1, 2) | ... |
|  |  | S_002 | (2, 1) | ... |
| ... | ... | ... | ... | ... |

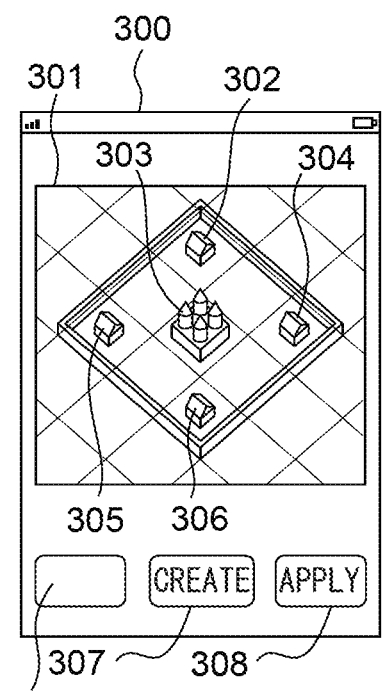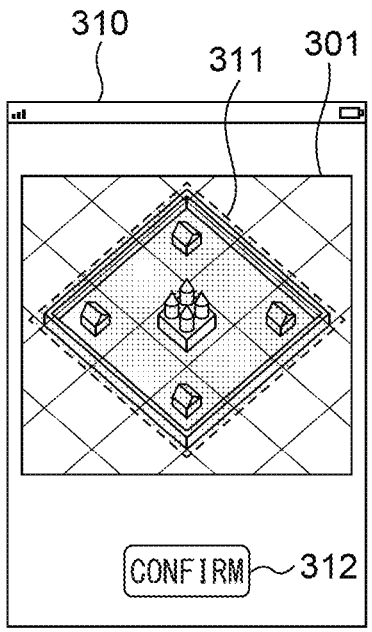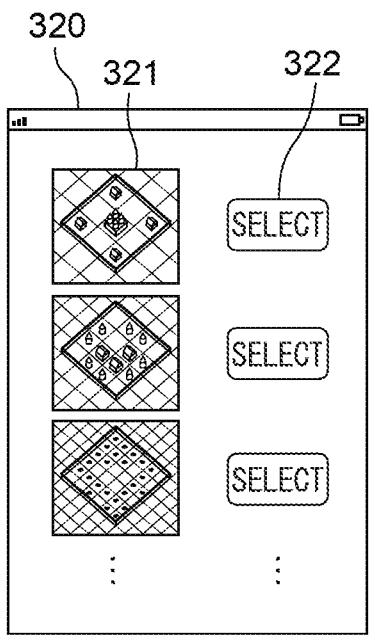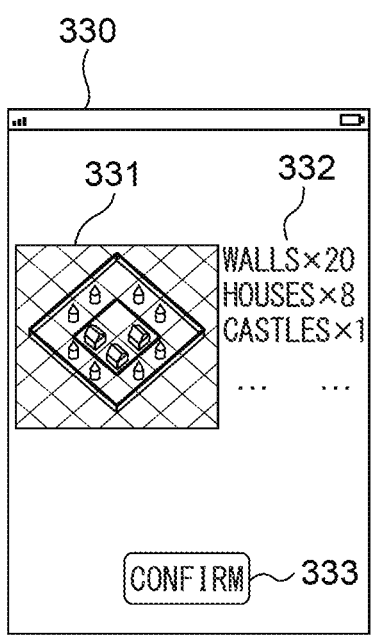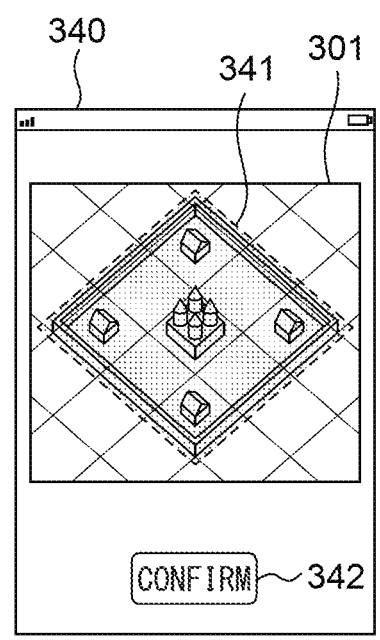

| PLAYER | NAME | IMAGE | TEMPLATE | ... |
|---|---|---|---|---|
| P_001 | PLAYER 1 | P_001.jpg | T_001,... | ... |
| P_002 | PLAYER 2 | P_002.jpg | T_003,... | ... |
| P_003 | PLAYER 3 | P_003.jpg | T_004,... | ... |
| ... | ... | ... | ... | ... |

| TEMPLATE | IMAGE | TYPE | POSITION | ... |
|---|---|---|---|---|
| T_001 | T_001.jpg | S_001 | (1, 1) | ... |
| | | S_001 | (1, 2) | ... |
| | | S_002 | (2, 1) | ... |
| ... | ... | ... | ... | ... |

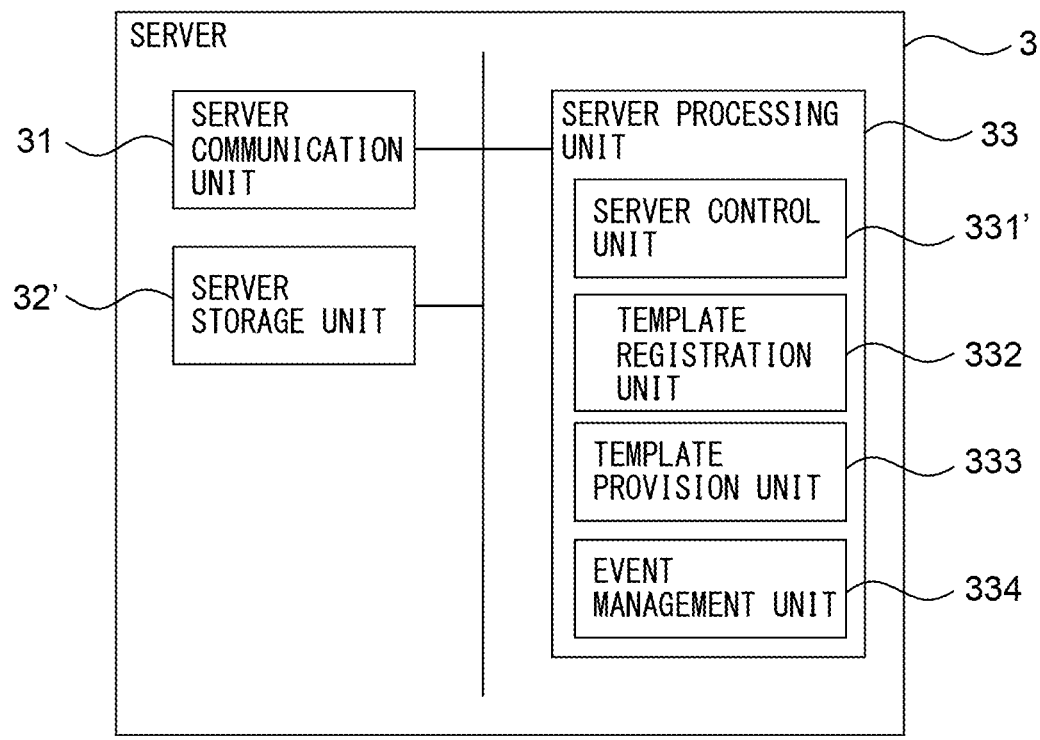

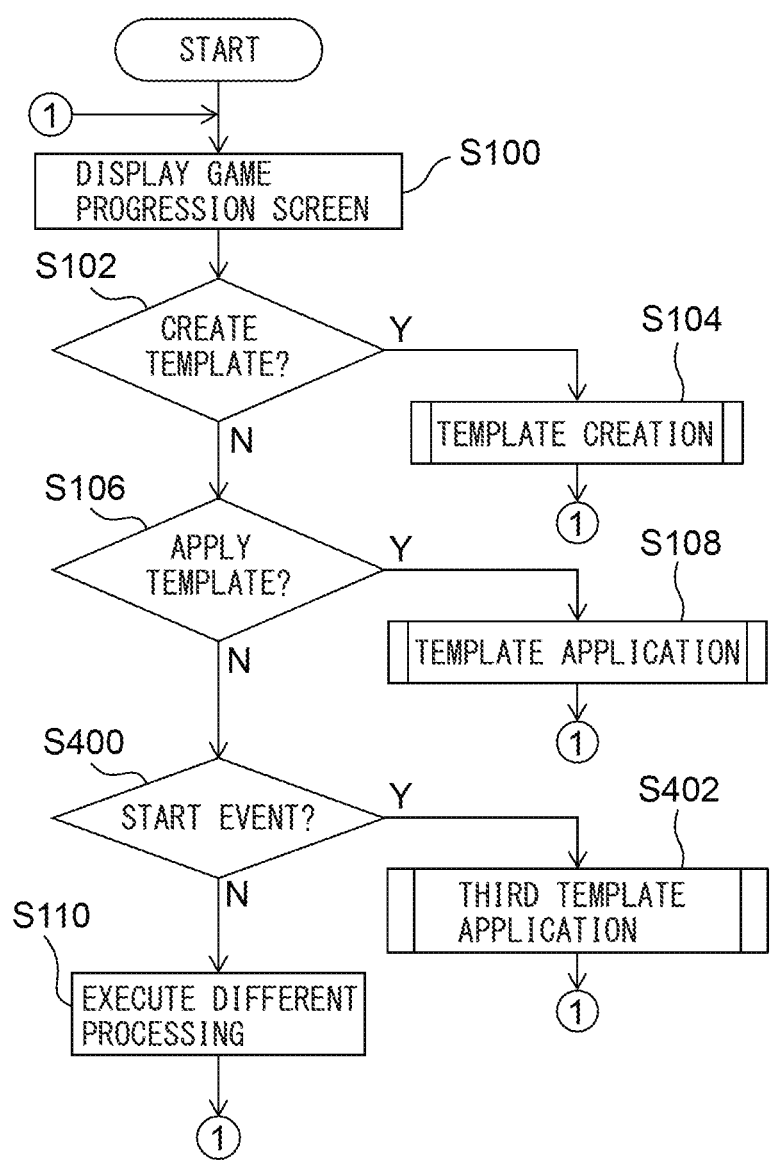
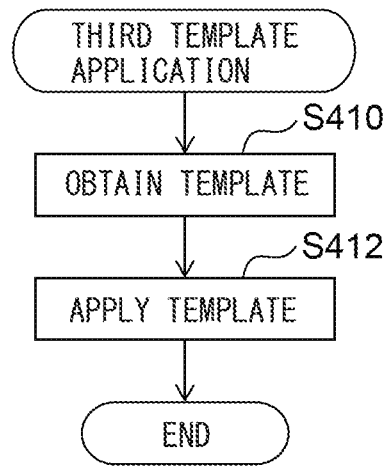
FIG. 14A
FIG. 14B

COMPUTER CONTROL METHOD, CONTROL PROGRAM AND COMPUTER

CROSS-REFERENCE TO RELATED APPLICATIONS

This application is a continuation application of, and claims the benefit of priority under 35 U.S.C. § 120 from U.S. application Ser. No. 15/393,646, filed Dec. 29, 2016, which is a continuation of U.S. Pat. No. 9,597,594, issued Mar. 21, 2017, which is a National Stage Application of International Application No. PCT/JP2014/075673, filed Sep. 26, 2014. The entire contents of each of the above applications are incorporated herein by reference. The present document also incorporates by reference the entire contents of Japanese priority documents, 2014-080554, filed Apr. 9, 2014 and 2013-202721, filed Sep. 27, 2013.

TECHNICAL FIELD

This invention related to a method for controlling a computer, a recording medium and a computer.

BACKGROUND

In recent years, games which are played by installing a game program on a portable device from a server via a communication network have become common. Such games include games in which multiple players can participate (so-called "social games"). There are games wherein players can not only fight against or help each other, but are also enabled to communicate with each other.

Such known games include, for example, games (so-called "city building games") wherein a player builds a city within a virtual space (hereinafter referred to as "game space") provided in the game program. In city building games, players can build various facilities (such as houses, streets, ports, train stations, airports, castles, training facilities, etc.) on desired positions and create a city after their liking.

SUMMARY

In conventional city building games, it is the object of the game to build a desired city, and it is unnecessary to completely rebuild a city after it has been built once. On the other hand, in recent city building games, a city built by one player is attacked by a different player, and the city (arrangement of items such as protective walls, buildings that are subject to an attack, protecting soldiers, weapons, etc.) is one of factors for deciding the winning and losing, or superiority and inferiority. However, since the items (game contents) of a city of a player increase as the city develops, it is very complicated for a player to change positions, types, levels, etc., of individual items. Further, it is hard to understand what kind of effect changing a city would have against an attack from a different player. Therefore, many players have limited themselves to change only certain kinds of items, such as soldiers and weapons, for which changing positions, types, levels, etc., is easy. As a result, as the game progresses, it becomes monotonous, and players might become bored with it.

The present invention has been devised to address the above problem, and an object of the invention is to provide a method for controlling a computer, a recording medium and a computer that improve the usability of city building games and continuously attract players to the game.

Provided is a method for controlling a computer that is provided with a storage unit configured to store game contents arranged within a game space, positions of the game contents, and a template defining positions of one or more of game contents, and that progresses a game by arranging the game contents within the game space based on a command by a player. The method includes when the template is applied to a predetermined area within the game space based on the command by the player, moving, by the computer, the game contents arranged within the game space to the positions of the game contents defined by the template.

The computer may be, for example, a portable device, a desktop device, a server, etc., as long as it can execute the above procedure.

In one embodiment, in the above method, the storage unit further stores a template related to a different player, and when the template related to the different player is applied to a predetermined area within the game space based on the command by the player, the computer moves the game contents arranged within the game space to the positions of the game contents defined by the template related to the different player.

In another embodiment, in the above method, the storage unit further stores game contents which are arranged within the game space and are related to the different player, and positions of the game contents, and when the template related to the different player is applied to a predetermined area within the game space based on a command by the different player, the computer moves, out of the game contents arranged within the game space, game contents related to the different player to the positions of the game contents defined by the template related to the different player.

In another embodiment, in the above method, when a start of an event is reported by a different computer, the computer obtains a template for the event from the different computer and moves the game contents arranged within the game space to the positions of the game contents defined by the template obtained from the different computer.

Yet in another embodiment, in the above method, when the number of game contents arranged within the game space is smaller than the number of game contents for which positions are defined by the template, the computer moves the game contents arranged within the game space to the positions of the game contents defined by the template to which the moving distance is the smallest.

Still in another embodiment, in the above method, out of the positions of the game contents defined by the template, the computer displays positions on which no game contents are arranged and the game contents, in a discernible condition.

In another embodiment, in the above method, when the number of game contents arranged within the game space is larger than the number of game contents for which position are defined by the template, the computer moves the game contents arranged within the game space for which the moving distance to the positions of the game contents defined by the template is the smallest, to the positions.

In another embodiment, in the above method, when a template is created for a predetermined area within the game space based on a command from the player, the computer stores positions of game contents arranged within the predetermined area, as the template, in the storage unit.

Yet in another embodiment, in the above method, when a template is created by combining a plurality of templates based on a command from the player or a different player, or commands from the player and the different player, the computer stores the positions of the game contents defined by the plurality of templates, as the template, in the storage unit.

Provided is a non-transitory computer-readable recording medium having recorded thereon a program for a computer that is provided with a storage unit configured to store game contents arranged within a game space, positions of the game contents, and a template defining positions of one or more of game contents, and that progresses a game by arranging the game contents within the game space based on a command by a player. The program causes the computer to execute a process. The process includes when the template is applied to a predetermined area within the game space based on the command by the player, moving, by the computer, the game contents arranged within the game space to the positions of the game contents defined by the template.

Provided is a computer that progresses a game by arranging game contents within a game space based on a command by a player. The computer includes a storage unit configured to store game contents arranged within a game space, positions of the game contents, and a template defining positions of one or more of game contents, and a processing unit configured to apply the template to a predetermined area within the game space based on the command by the player. When the template is applied, the processing unit moves the game contents arranged within the game space to the positions of the game contents defined by the template.

The above method, recording medium and computer make it possible to improve the usability of city building games and continuously attract players to the game by making game contents and the arrangement of the game contents changeable by using templates.

BRIEF DESCRIPTION OF THE DRAWINGS

Other features and advantages of the present invention will be apparent from the ensuing description, taken in conjunction with the accompanying drawings, in which:

FIGS. 3A to 3E illustrate examples of a display screen of the portable device;

FIG. 13A illustrates one possible schematic configuration of the server;

FIG. 13B illustrates an example of a data structure of the event table;

FIGS. 14A and 14B illustrate examples of the operational flow of the portable device.

DESCRIPTION

Hereinafter, with reference to the drawings, a method for controlling a computer, a recording medium, and a computer will be described. It should be noted that the technical scope of the present invention is not limited to the described embodiments, but covers the invention described in the claims and its equivalent.

First Embodiment

In the present embodiment, a player builds a city within a game space. The player can arrange various facilities which are one example of game contents, within the game space. Further, for a predetermined area within the game space, the player can also create a template stipulating types and positions of facilities based on the types and positions of facilities arranged within the area. Moreover, the player can also apply the created template to a given area within the game space. When a template is applied, facilities arranged within the game space are automatically changed to the facilities defined in the template, and they are automatically moved to the defined positions.

Game contents refer to digital contents used in a game, and include, besides facilities, characters, soldiers, weapons, cards, figures, avatars, items, etc.

Figure 1:
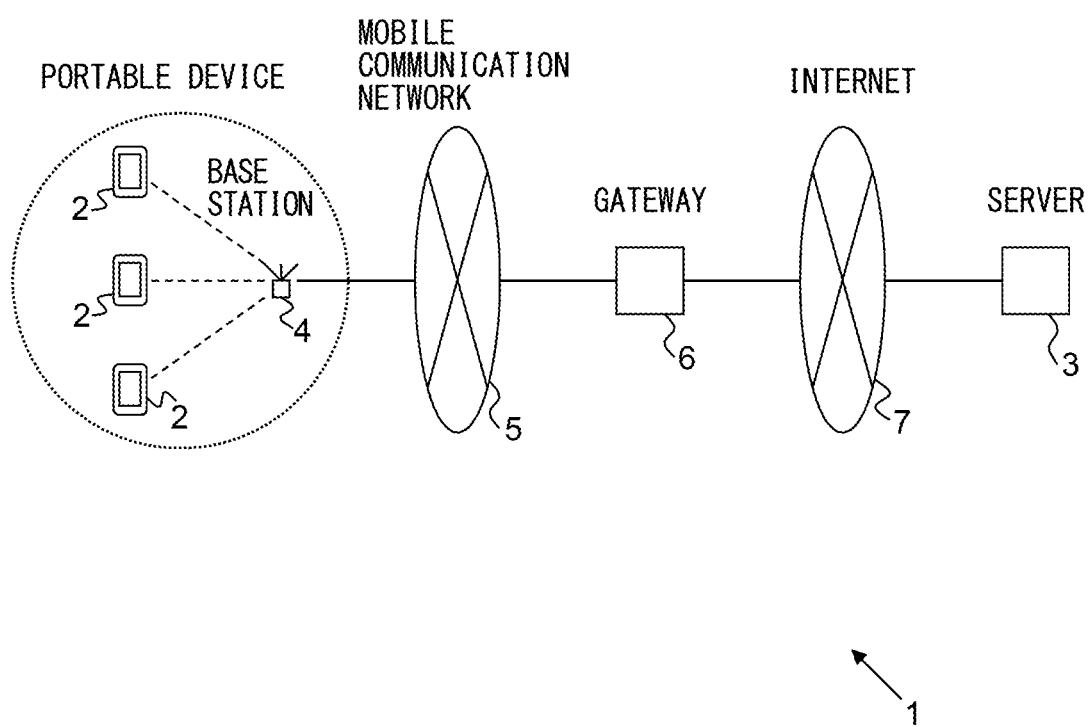
FIG. 1 illustrates an example of a schematic configuration of a game system.

FIG. 1 illustrates an example of a schematic configuration of a game system 1.

The game system 1 includes at least one portable device 2 and a server 3. The portable device 2 and the server 3 are connected to each other via a communication network, and are connected to each other, for example, via a base station 4, a mobile communication network 5, a gateway 6, and the Internet 7. A program to be executed by the portable device 2 (e.g., a game program) and a program to be executed by the server 3 (e.g., a game control program) communicate with each other by using a communication protocol such as a Hypertext Transfer Protocol (HTTP).

Figures 2A, 2B, 2C, 2D:
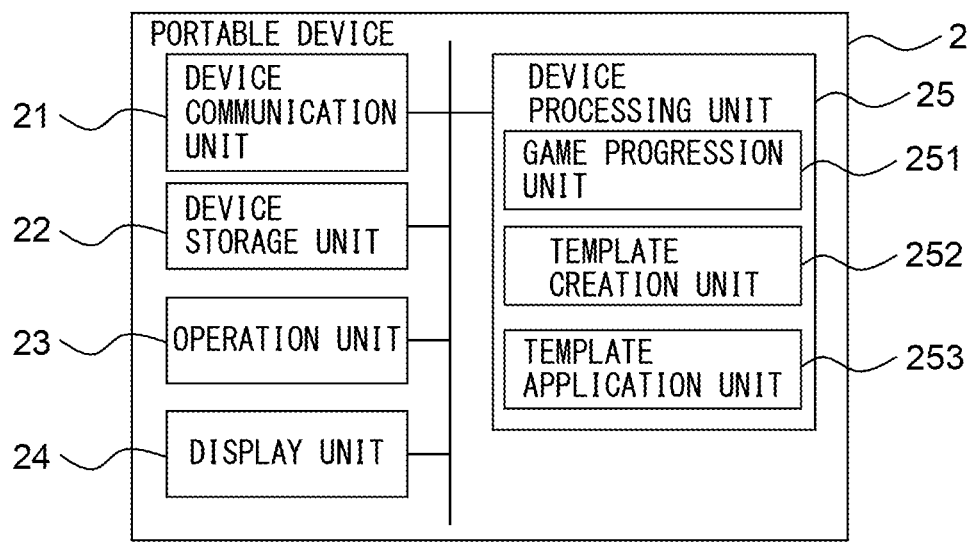
FIG. 2A illustrates an example of a schematic configuration of the portable device.
FIGS. 2B to 2D illustrate examples of data structures of the various types of tables.

FIG. 2A illustrates an example of a schematic configuration of the portable device 2.

The portable device 2 progresses the game in response to an operation of an operation unit 23 by a player. When necessary, the portable device 2 is connected to the server 3 via the base station 4, the mobile communication network 5, the gateway 6, and the Internet 7, to communicate with the server 3. In order to implement the foregoing functions, the portable device 2 includes a device communication unit 21, a device storage unit 22, the operation unit 23, a display unit 24, and a device processing unit 25.

While a multifunctional mobile phone (a so-called "smartphone") may be assumed as the portable device 2, the present invention is not limited to this. The portable device 2 may be, for example, a mobile phone (a so-called "feature phone"), a personal digital assistant (PDA), a portable game machine, a portable music player, a tablet device, a tablet personal computer (PC), a notebook PC, etc., as long as the present invention is applicable thereto.

The device communication unit 21 includes a communication interface circuit including an antenna having a sensitivity band in a predetermined frequency band, and connects the portable device 2 to a wireless communication network. The device communication unit 21 establishes a wireless signal link with the base station 4 by a Code Division Multiple Access (CDMA) system or the like via a channel to be assigned by the base station 4, and communicates with the base station 4. The device communication unit 21 sends data supplied from the device processing unit 25 to the server 3 or the like. The device communication unit 21 supplies the data received from the server 3 or the like to the device processing unit 25.

The device storage unit 22 includes a semiconductor memory, for example. The device storage unit 22 stores an operating system program, a driver program, an application program, data, etc., used for processing in the device processing unit 25. For example, the device storage unit 22 stores an input device driver program for controlling the operation unit 23 and an output device driver program for controlling the display unit 24, as the driver program. The device storage unit 22 stores a game program, etc., for progressing the game and displaying the result thereof, as the application program. The device storage unit 22 stores identification numbers (IDs) of the players, a facility table (FIG. 2B) for managing facilities arranged within the game space, a facility-type table (FIG. 2C) for managing types of the facilities, a template table (FIG. 2D) for managing templates, and image data, video data, etc., relating to the facilities, templates, etc., as the data. Further, the device storage unit 22 may store temporary data relating to predetermined processing.

FIG. 2B depicts a facility table. In the facility table, a facility ID, a type ID, a position within the game space, etc., are recorded for each facility.

In the present embodiment, the game space is configured in grid form, wherein one facility is arranged on one grid, and the position of the facility is represented with the help of grid coordinates that have their origin in a predetermined grid (e.g., upper left of the game space). However, the present invention is not limited to this configuration. Any configuration of the game space, etc., is possible as long as the present invention can be applied to the configuration.

FIG. 2C depicts a facility-type table. In the facility-type table, a type ID, name, file name of image data, etc., are recorded for each type of facility.

FIG. 2D depicts a template table. In the template table, for each template, a template ID, a file name of thumbnail image data, a type ID and a position within the template of each facility, etc., are recorded.

Similarly to FIG. 2B, a position of a facility is represented with the help of the grid coordinates that have their origin in a predetermined grid (e.g., upper left of the template). However, the present invention is not limited to this configuration. Any representation of a position is possible as long as the present invention can be applied with the representation.

The operation unit 23 may be any device capable of operating the portable device 2, for example, a touch panel, a key button or the like. The player can input letters, numbers, symbols, etc., by using the operation unit 23. When operated by the player, the operation unit 23 generates a signal corresponding to the operation. The generated signal is supplied to the device processing unit 25 as a command from the player.

The display unit 24 may be any device capable of displaying a video, an image, etc., for example, a liquid crystal display, an organic electro-luminescence (EL) display, etc. The display unit 24 displays a video, an image, etc., corresponding to video data and image data supplied from the device processing unit 25.

The device processing unit 25 includes one or more processors and their peripheral circuits. The device processing unit 25 is, for example, a central processing unit (CPU), and integrally controls an overall operation of the portable device 2. The device processing unit 25 controls operations of the device communication unit 21, the display unit 24, etc., so that various types of processing of the portable device 2 are executed in an appropriate order in accordance with the programs stored in the device storage unit 22, the operation of the operation unit 23, etc. The device processing unit 25 executes processing based on the programs (the operating system program, the driver program, the application program, etc.) stored in the device storage unit 22. The device processing unit 25 can execute multiple programs (application programs, etc.) in parallel.

FIGS. 3A to 3E illustrate examples of a display screen of the portable device 2.

FIG. 3A depicts a game progression screen 300 that is displayed when a command has been given to start the game.

The game progression screen 300 displays a game space 301 and various facilities 302 to 306 arranged within the game space.

Further, multiple buttons are displayed in the lower portion of the game progression screen 300. By pushing buttons, commands are given: pushing a "Create" button 307 creates a template, pushing an "Apply" button 308 applies a template.

FIG. 3B depicts an area selection screen 310 that is displayed when a command to create a template has been given on the game progression screen 300 depicted in FIG. 3A.

The area selection screen 310 displays the game space 301, in which, for example, by tapping on two arbitrary points, an area 311 with the two points as opposite apexes is selected.

Further, a "Confirm" button 312 is displayed in the lower portion of the area selection screen 310, and by pushing this button, a command is given to create a template for the selected area 311.

FIG. 3C depicts a template selection screen 320 that is displayed when a command to apply a template has been given on the game progression screen 300 depicted in FIG. 3A.

On the template selection screen 320, a thumbnail image 321 and a "Select" button 322 are displayed for each template. By pushing the "Select" button 322, the corresponding template is selected.

FIG. 3D depicts a template display screen 330 that is displayed when a template has been selected on the template selection screen 320 depicted in FIG. 3C.

A preview image 3310 for when the template is applied to a predetermined area (e.g., around the center) within the game space is displayed in the left portion of the template display screen 330.

Further, names and quantities 3320 of facilities for which positions are defined by the template, are listed in the right portion of the template display screen 330.

Further, a "Confirm" button 333 is displayed in the lower portion of the template display screen 330, and by pushing this button, a template is confirmed.

FIG. 3E depicts an area selection screen 340 that is displayed when a template has been confirmed on the template display screen 330 depicted in FIG. 3D.

The area selection screen 340 displays the game space 301, in which, for example, by tapping on two arbitrary points, an area 341 with the two points as opposite apexes is selected.

Further, a "Confirm" button 342 is displayed in the lower portion of the area selection screen 340, and by pushing this button, a command is given to apply the template to the selected area 341.

Figure 4:
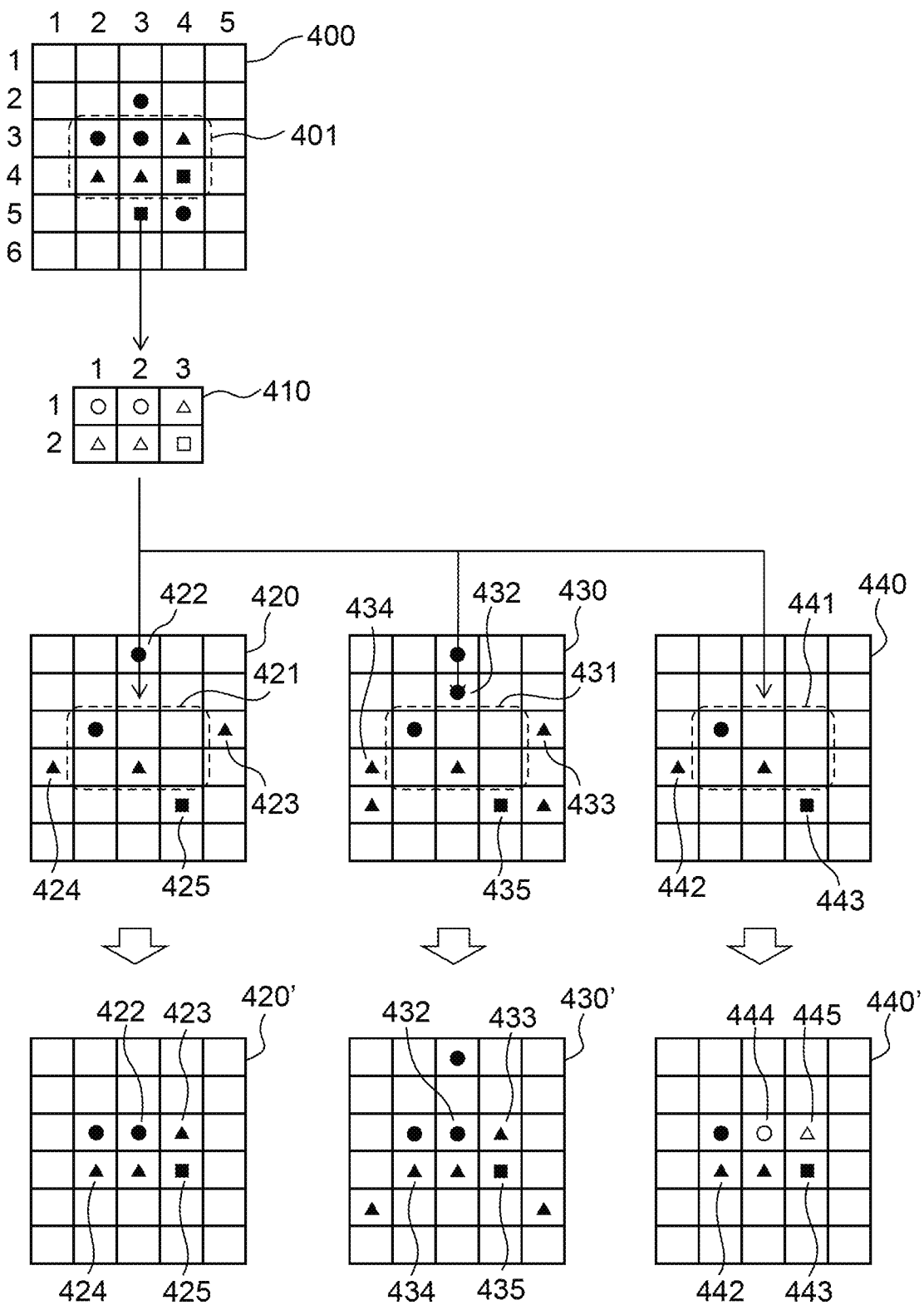
FIG. 4 illustrates a concept of creating and applying a template.

FIG. 4 illustrates a concept of creating and applying a template.

400 illustrates a game space. Nine facilities are arranged within the game space 400. Specifically, four facilities illustrated as "black circle", three facilities illustrated as "black triangle", and two facilities illustrated as "black square" are arranged therein.

Assume that a template has been created for an area 401 within the game space 400. 410 illustrates the created template. The template 410 defines that facilities illustrated as "black circle" of a type illustrated as "white circle" are arranged at (1,1) and (1,2), facilities illustrated as "black triangle" of a type illustrated as "white triangle" are arranged at (1,3), (2,1) and (2,2), and a facility illustrated as "black square" of a type illustrated as "white square" is arranged at (2,3).

420 illustrates another game space. Six facilities are arranged within the game space 420. Specifically, two facilities illustrated as "black circle", three facilities illustrated as "black triangle", and one facility illustrated as "black square" are arranged therein.

Assume that the template 410 has been applied to an area 421 within the game space 420. The number of types of facilities and the number of facilities in each type arranged within the game space 420 are equal to the number of types of facilities and the number of facilities in each type, respectively, positions of the facilities being defined by the template 410. Thus, all facilities arranged within the game space 420 are moved to positions of facilities as defined by the template 410. Actually, facilities 422 to 425 arranged outside of the area 421 are moved to positions of these facilities within the area 421. 420' illustrates the game space 420 after the facilities 422 to 425 have been moved.

430 illustrates yet another game space. Nine facilities are arranged within the game space 430. Specifically, three facilities illustrated as "black circle", five facilities illustrated as "black triangle", and one facility illustrated as "black square" are arranged therein.

Assume that the template 410 has been applied to an area 431 within the game space 430. The number of types of facilities and the number of facilities in each type arranged within the game space 430 is equal to or larger than the number of types of facilities and the number of facilities in each type, respectively, positions of the facilities being defined by the template 410. Thus, of the facilities arranged within the game space 420, those facilities with the smallest moving distance (e.g., Manhattan distance) to positions of facilities defined by the template 410, are moved to the positions of facilities. Actually, facilities 432 to 435 arranged outside of the area 431 are moved to positions of these facilities within the area 431. 430' illustrates the game space 430 after the facilities 432 to 435 have been moved.

The facilities to be moved are not limited to those with the smallest moving distance. The player may also designate facilities which are to be moved, or an area containing facilities which are to be moved. Further, the player may also in advance designate facilities which are not to be moved, or an area containing facilities which are not to be moved.

440 illustrates still another game space. Four facilities are arranged within the game space 440. Specifically, one facility illustrated as "black circle", two facilities illustrated as "black triangle", and one facility illustrated as "black square" are arranged therein.

Assume that the template 410 has been applied to an area 441 within the game space 440. The number of types of facilities and the number of facilities in each type arranged within the game space 440 is equal to or smaller than the number of types of facilities and the number of facilities in each type, respectively, positions of the facilities being defined by the template 410. Thus, all facilities arranged within the game space 440 are moved to positions of facilities defined by the template 410, to which the moving distance is the smallest. Actually, facilities 442 and 443 arranged outside the area 441 are moved to positions of these facilities within the area 441. 440' illustrates the game space 440 after the facilities 442 and 443 have been moved.

In the game space 440', positions on which no facilities are arranged among the positions of facilities defined by the template 410, are illustrated in a condition where the facility type is discernible (e.g., "white circle" 444 and "white triangle" 445).

Further, when no facility has been arranged, it is also possible to present the player with facilities of the same type or with facilities of a similar type as proposals.

Moreover, it is also possible for the player to purchase facilities for positions where no facility has been arranged, or to acquire the facilities, for example, by trading with a different player in a multi-player environment as described below. Moreover, when the player has not arranged a facility defined by a template within the game space but has stored the facility in storage, the player may arrange this facility based on the template, or conversely, the player may store a facility that is not defined by the template, in the storage. Although in the above description, a player creates templates himself/herself, templates may also be distributed from a service-side server 3, or may be acquired from other players. In such cases, a player may not possess a facility defined by a template in some cases. However, whether the player possesses a facility defined by a template may be judged on a portable device 2 side or on a server 3 side, and a screen for purchasing the facility which has been judged not to be in the player's possession may be displayed on the portable device 2, so that the player is automatically guided to a purchase screen.

Further, templates may also be automatically created based on an operation by the player. For example, the server 3 may automatically create templates based on facilities the player possesses, facilities selected by the player, an area and/or an objective of a template. The objective of a template is, for instance, to realize a city that offers strong protection against soldiers with bows and arrows, to realize a city that work effectively for protection against attacks by giants, to strengthen the protection against air attacks, etc. In doing so, it becomes easy for the player to create templates consistent with objectives.

In order to achieve the above-described functions, the device processing unit 25 includes a game progression unit 251, a template creation unit 252, and a template application unit 253. All of these units are functional modules implemented by a program executed on a processor provided in the device processing unit 25. Alternatively, these units may also be provided as firmware on the portable device 2.

In the following, processing by the game progression unit 251 will be described.

The game progression unit 251 controls the start and progression of the game, and appropriately gives commands to execute processing to the template creation unit 252, template application unit 253, etc.

Specifically, when a command to start the game is given by the player via the operation unit 23, the game progression unit 251 displays the game progression screen 300.

In other words, the game progression unit 251 refers to the facility table stored in the device storage unit 22, and extracts a type ID and a position of each facility. Further, the game progression unit 251 refers to the facility-type table stored in the device storage unit 22 by using the extracted type IDs as key, and extracts file names of image data for corresponding types. Further, the game progression unit 251 obtains image data corresponding to the extracted file names, from the device storage unit 22. Then, the game progression unit 251 configures a game progression screen 300 that displays images arising from the obtained image data according to the extracted positions, and that simultaneously displays buttons for receiving commands such as template creation, template application, etc., in a predetermined layout; and outputs the game progression screen 300 to the display unit 24.

When a command to create a template is given by the player via the operation unit 23, the game progression unit 251 gives a command to execute processing to the template creation unit 252.

When a command to apply a template is given by the player via the operation unit 23, the game progression unit 251 gives a command to execute processing to the template application unit 253.

When a command to execute different processing is given by the player via the operation unit 23, the game progression unit 251 executes the different processing.

In the following, processing by the template creation unit 252 will be described.

The template creation unit 252 creates templates, stores the templates in the device storage unit 22, and registers the created templates on the server 3.

Specifically, the template creation unit 252 displays the area selection screen 310.

When an area has been selected and a command to create a template is given by the player via the operation unit 23, the template creation unit 252 creates a template.

In other words, the template creation unit 252 refers to the facility table stored in the device storage unit 22 by using the coordinates of the selected area as key, and extracts a type ID and a position within the game space of each facility arranged within the selected area. The template creation unit 252 further converts the extracted positions within the game space to positions within the template. Moreover, the template creation unit 252 creates thumbnail image data for the selected area, and stores the data in the device storage unit 22. The template creation unit 252 then stores the file name of the stored thumbnail image data, the extracted type ID and position within the template of each facility, etc., in the template table stored in the device storage unit 22 under a newly assigned template ID.

Further, the template creation unit 252 registers the created template on the server 3.

In other words, the template creation unit 252 sends a template registration request via the device communication unit 21 to the server 3 by using the player ID, the assigned template ID, the created thumbnail image data, and the extracted type ID and position within the template of each facility, as parameters.

Then, the template creation unit 252 terminates the processing.

In the following, processing by the template application unit 253 will be described.

The template application unit 253 obtains a template from the device storage unit 22 or the server 3, and applies the obtained template.

Specifically, the template application unit 253 displays the template selection screen 320.

In other words, the template application unit 253 refers to the template table stored in the device storage unit 22, and extracts an ID and a file name of thumbnail image data of each template. Further, the template application unit 253 obtains thumbnail image data corresponding to the extracted file name, from the device storage unit 22.

When necessary, the template application unit 253 sends a request for providing a template list via the device communication unit 21 to the server 3 by using the player ID as a parameter. Further, the template application unit 253 receives an ID and thumbnail image data of each template from the server 3 via the device communication unit 21.

Then, the template application unit 253 configures the template selection screen 320 that displays thumbnail images arising from the obtained thumbnail image data, buttons for receiving commands such as template selection, etc., in a predetermined layout; and outputs the template selection screen 320 to the display unit 24.

When a template is selected by the player via the operation unit 23, the template application unit 253 displays the template display screen 330.

In other words, when the selected template is a template provided by the server 3, the template application unit 253 sends a request for providing the template via the device communication unit 21 to the server 3 by using the ID of the selected template as a parameter. Further, the template application unit 253 receives thumbnail image data of a corresponding template and the type ID and position of each facility from the server 3 via the device communication unit 21. The template application unit 253 then stores the received thumbnail image data in the device storage unit 22. Further, the template application unit 253 stores the ID of the selected template, the file name of the stored thumbnail image data, the received type ID and position of each facility, etc., in the template table stored in the device storage unit 22.

The template application unit 253 refers to the template table stored in the device storage unit 22 by using the ID of the selected template as key, and extracts a type ID of each facility in the corresponding template. The template application unit 253 counts the number of extracted types of facilities. Further, the template application unit 253 refers to the facility-type table stored in the device storage unit 22 by using the extracted type IDs as key, and extracts corresponding names of the types. Moreover, the template application unit 253 creates a preview image for when the selected template is applied to a predetermined area within the game space. Then, the template application unit 253 configures the template display screen 330 that displays the extracted names and the number of facilities, the created preview image, buttons for receiving commands such as template confirmation, etc., in a predetermined layout; and outputs the template display screen 330 to the display unit 24.

In the following, a process of applying a template will be described.

When a template is confirmed by the player via the operation unit 23, the template application unit 253 displays the area selection screen 340.

When an area has been selected and a command to apply a template has been given by the player via the operation unit 23, the template application unit 253 applies the template.

In other words, the template application unit 253 refers to the facility table stored in the device storage unit 22, and extracts an ID, a type ID and a position within the game space of each facility. The template application unit 253 counts the number of extracted types of facilities and the number of facilities in each type. The template application unit 253 further refers to the template table stored in the device storage unit 22 by using the ID of the selected template as key, and extracts a type ID and a position within the template of each facility in the corresponding template. The template application unit 253 counts the number of extracted types of facilities and the number of facilities in each type. Moreover, the template application unit 253 converts the extracted positions within the template to positions within the game space based on coordinates of the selected area. For each type of facility, the template application unit 253 compares the number of facilities of this type within the game space and the number of facilities of this type within the template.

When the former and the latter are equal, the template application unit 253 moves the facilities of this type within the game space to the positions of the facilities of this type within the template. In other words, the template application unit 253 refers to the facility table stored in the device storage unit 22 by using the IDs of the facilities of each type within the game space as key, and stores the positions of the facilities of this type within the template as positions of the corresponding facilities within the game space.

On the other hand, when the former is larger than the latter, the template application unit 253 moves the facilities of this type within the game space for which the moving distance to the positions of the facilities of this type within the template is the smallest, to the positions of these facilities. In other words, for each position of a facility of a type within the template, the template application unit 253 specifies a facility of this type within the game space for which the moving distance to the position is the smallest. The template application unit 253 then refers to the facility table stored in the device storage unit 22 by using the ID of the specified facility as key, and stores the position of the specified facility as position of the corresponding facility within the game space.

On the other hand, when the former is smaller than the latter, the template application unit 253 moves the facilities of a type within the game space to positions of the facilities of this type within the template to which the moving distance is the smallest. In other words, for each facility of a type within the game space, the template application unit 253 specifies a position of a facility of this type within the template to which the moving distance is the smallest. The template application unit 253 then refers to the facility table stored in the device storage unit 22 by using the ID of the facility as key, and stores the specified position as position of the corresponding facility within the game space.

Other than facilities for which the moving distance is the smallest, the player may also designate facilities which are to be moved, or an area containing facilities which are to be moved. Further, the player may also in advance designate facilities which are not to be moved, or an area containing facilities which are not to be moved.

Then, the template application unit 253 terminates the processing.

Figures 5A, 5B, 5C:
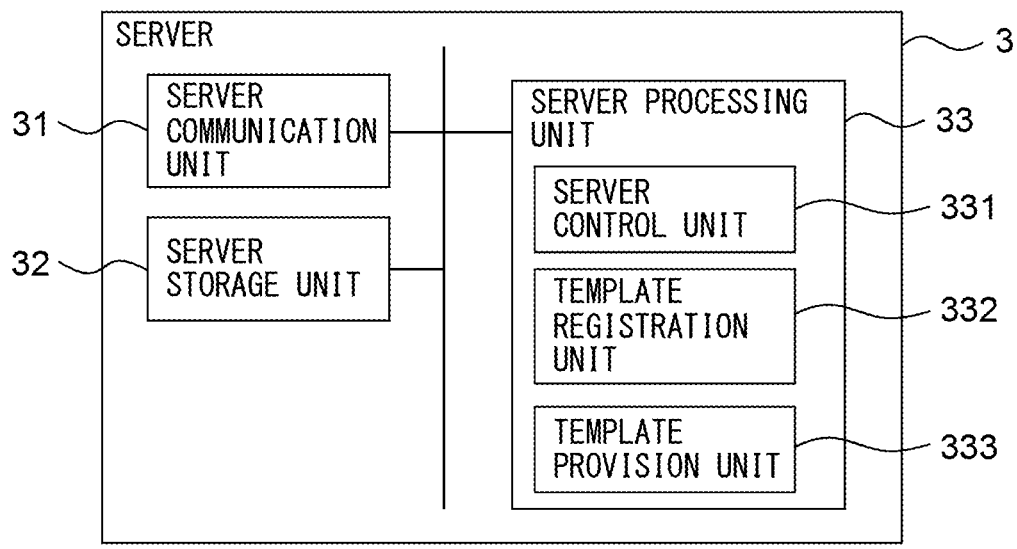
FIG. 5A illustrates one possible schematic configuration of the server.
FIGS. 5B and 5C illustrate examples of data structures of the various types of tables.

FIG. 5A illustrates one possible schematic configuration of the server 3.

In response to requests from the portable device 2, the server 3 registers and provides templates. In order to achieve such functions, the server 3 is provided with a server communication unit 31, a server storage unit 32, and a server processing unit 33.

The server communication unit 31 includes a communication interface circuit for connecting the server 3 to the Internet 7, and communicates with the Internet 7. The server communication unit 31 supplies the data received from the portable device 2 or the like to the server processing unit 33. The server communication unit 31 sends the data supplied from the server processing unit 33 to the portable device 2 or the like.

The server storage unit 32 includes at least one of a magnetic tape device, a magnetic disk device and an optical disk device, for example. The server storage unit 32 stores an operating system program, a driver program, an application program, data, etc., used for processing in the server processing unit 33. The server storage unit 32 stores, for example, a game control program, etc., for registering and providing templates, as the application program. The server storage unit 32 stores a player table (FIG. 5B) for managing players, a template table (FIG. 5C) for managing templates, and image data, video data, etc., relating to the players, templates, etc., as the data. Further, the server storage unit 32 may store temporary data relating to certain processing.

FIG. 5B depicts a player table. In the player table, a player ID, a name, a file name of image data, an ID of a created template, etc., are recorded for each player.

FIG. 5C depicts a template table. Similarly to FIG. 2D, in the template table, for each template, a template ID, a file name of thumbnail image data, a type ID and a position within the template of each facility, etc., are recorded.

The server processing unit 33 includes one or more processors and their peripheral circuits. The server processing unit 33 is, for example, a CPU, and integrally controls an overall operation of the server 3. The server processing unit 33 controls an operation of the server communication unit 31 or the like so that various types of processing of the server 3 are executed in an appropriate order in accordance with the programs stored in the server storage unit 32. The server processing unit 33 executes processing based on the programs stored in the server storage unit 32 (the operating system program, the driver program, the application program, etc.). The server processing unit 33 can execute the multiple programs (the application program, etc.) in parallel.

The server processing unit 33 includes a server control unit 331, a template registration unit 332, and a template provision unit 333. Each of the units is a functional module implemented by a program to be executed by the processor included in the server processing unit 33. Alternatively, each of the units may be provided as a firmware on the server 3.

In the following, processing by the server control unit 331 will be described.

The server control unit 331 controls the performance of the server and appropriately gives commands to execute processing to the template registration unit 332, template provision unit 333, etc.

Specifically, when a template registration request is received from the portable device 2 via the server communication unit 31, the server control unit 331 gives the template registration unit 332 a command to execute processing, by using the received template registration request as a parameter.

When a request for providing a template list or a template provision request is received from the portable device 2 via the server communication unit 31, the server control unit 331 gives the template provision unit 333 a command to execute processing, by using the received request for providing a template list or the like as a parameter.

When a different request is received from the portable device 2 via the server communication unit 31, the server control unit 331 executes different processing corresponding to the request.

In the following, processing by the template registration unit 332 will be described.

The template registration unit 332 stores templates in the server storage unit 32.

In other words, the template registration unit 332 interprets the received template registration request, and specifies the ID of the player, the ID of the template, thumbnail image data, as well as the type ID and position of each facility. Then, the template registration unit 332 stores the specified thumbnail image data in the server storage unit 32. The template registration unit 332 further refers to the player table stored in the server storage unit 32 by using the specified player ID as key, and stores the specified template ID as an ID of a template created by the corresponding player. Moreover, the template registration unit 332 stores the specified template ID, the file name of the stored thumbnail image data, the type ID and position of each specified facility, etc., in the template table stored in the server storage unit 32.

Then, the template registration unit 332 terminates the processing.

In the following, processing by the template provision unit 333 will be described.

The template provision unit 333 obtains a template list or a template from the server storage unit 32, and sends the obtained template list or the like to the portable device 2.

Specifically, when a request for providing a template list has been received, the template provision unit 333 obtains a template list from the server storage unit 32.

In other words, the template provision unit 333 interprets the received request for providing a template list, and specifies the ID of the player. The template provision unit 333 then refers to the player table stored in the server storage unit 32 by using the specified player ID as key, and extracts an ID of a template created by a player different from the corresponding player. Further, the template provision unit 333 refers to the template table stored in the server storage unit 32 by using the extracted template ID as key, and extracts a file name of thumbnail image data for the corresponding template. Moreover, the template provision unit 333 obtains the thumbnail image data corresponding to the extracted file name, from the server storage unit 32.

On the other hand, when a template provision request is received, the template provision unit 333 obtains a template from the server storage unit 32.

In other words, the template provision unit 333 interprets the received template provision request, and specifies the ID of the template. Then, the template provision unit 333 refers to the template table stored in the server storage unit 32 by using the specified template ID as key, and extracts a file name of thumbnail image data for the corresponding template, as well as the type ID and position of each facility.

Further, the template provision unit 333 obtains thumbnail image data corresponding to the extracted file name, from the server storage unit 32.

The template provision unit 333 sends the obtained template list or the like to the portable device 2.

In other words, the template provision unit 333 sends the extracted ID of each template and the thumbnail image data, or the thumbnail image data of the template as well as the type ID and position of each facility that are obtained or the like, to the portable device 2 via the server communication unit 31.

Then, the template provision unit 333 terminates the processing.

Figure 6C:
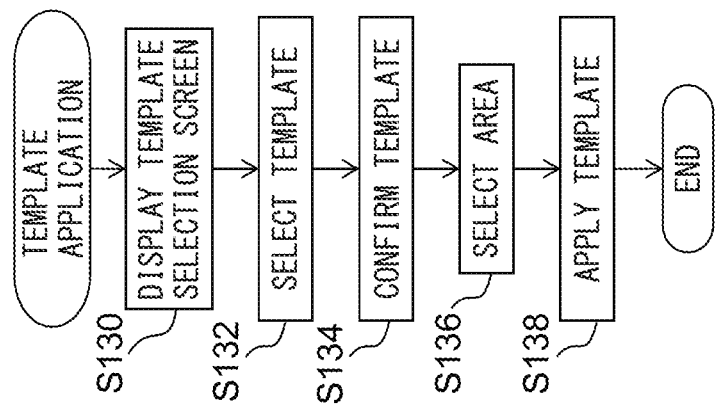
FIGS. 6A to 6C illustrate examples of the operational flow of the portable device.
Figure 6B:
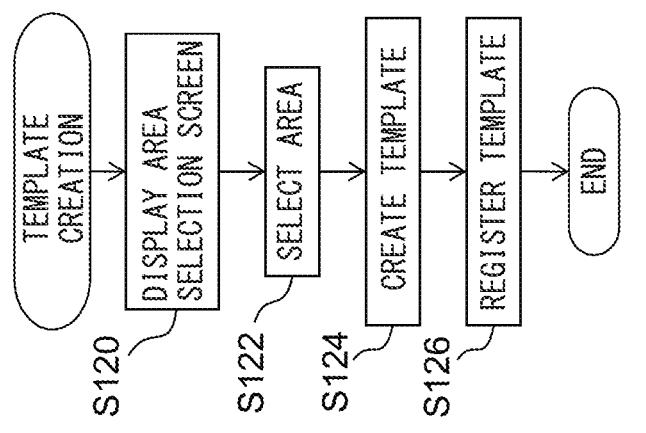
Figure 6A:
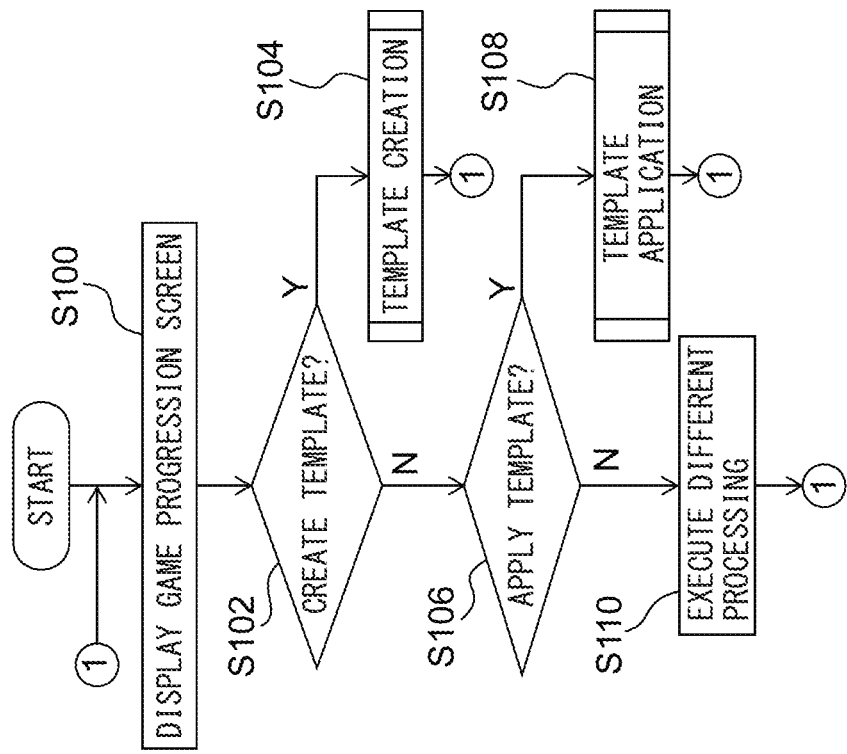

FIGS. 6A to 6C illustrate examples of the operational flow of the portable device 2.

The below-described operational flow is executed, based on a program that is stored in advance in the device storage unit 22, mostly by the device processing unit 25 by working together with each component of the portable device 2.

FIG. 6A illustrates an example of the operational flow of the game progression unit 251.

The player gives the device processing unit 25 a command to start a game via the operation unit 23. The device processing unit 25 starts processing based on the game program. In other words, the game progression unit 251 implemented by the game program displays the game progression screen 300 (Step S100).

When a command to create a template is given by the player via the operation unit 23 (Step S102—Yes), the game progression unit 251 gives the template creation unit 252 a command to execute processing (Step S104).

FIG. 6B illustrates an example of the operational flow of the template creation unit 252.

The template creation unit 252 displays the area selection screen 310 (Step S120).

When an area is selected by the player via the operation unit 23 (Step S122) and a command to create a template is given, the template creation unit 252 creates a template (Step S124).

The template creation unit 252 registers the created template on the server 3 (Step S126). Then, the template creation unit 252 terminates processing.

On the other hand, when a command to apply a template is given by the player via the operation unit 23 (Step S106—Yes), the game progression unit 251 gives the template application unit 253 a command to execute processing (Step S108).

FIG. 6C illustrates an example of the operational flow of the template application unit 253.

The template application unit 253 displays the template selection screen 320 (Step S130).

When a template is selected by the player via the operation unit 23 (Step S132), the template application unit 253 displays the template display screen 330.

When the template is confirmed by the player via the operation unit 23 (Step S134), the template application unit 253 displays the area selection screen 340.

When an area is selected by the player via the operation unit 23 (Step S136) and a command to apply a template is given, the template application unit 253 applies the template (Step S138). Then, the template application unit 253 terminates processing.

On the other hand, when a command for different processing is given by the player via the operation unit 23 (Step S106—No), the game progression unit 251 executes the different processing (Step S110).

Figure 7C:
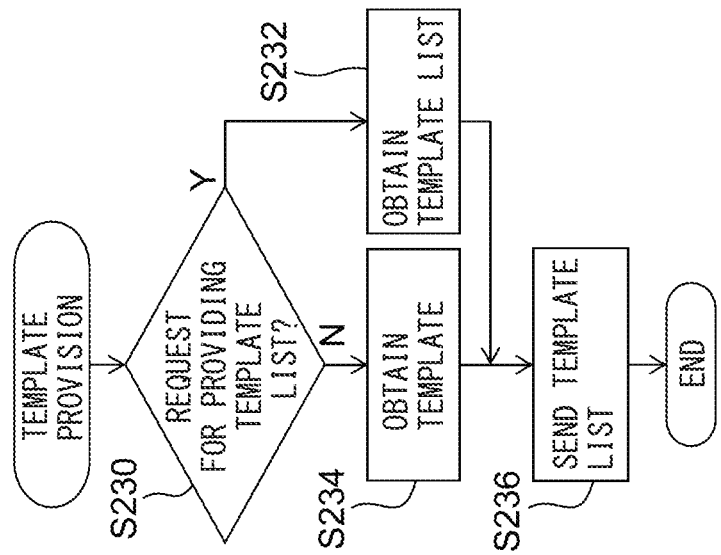
FIGS. 7A to 7C illustrate examples of the operational flow of the server.
Figure 7B:
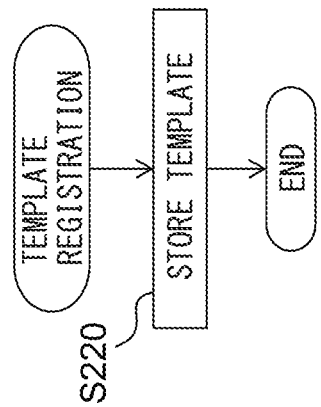
Figure 7A:
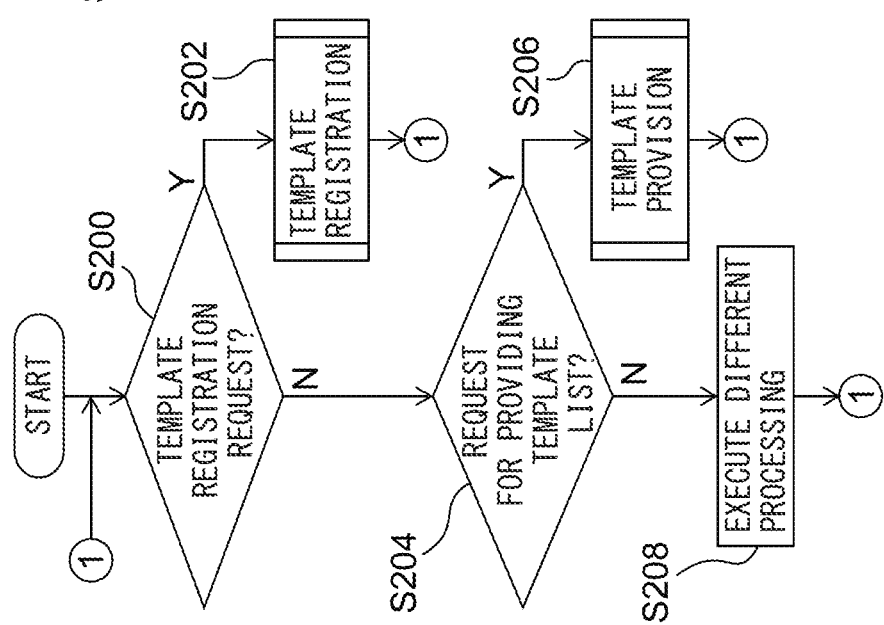

FIGS. 7A to 7C illustrate examples of the operational flow of the server 3.

The below-described operational flow is executed, based on a program that is stored in advance in the server storage unit 32, mostly by the server processing unit 33 by working together with each component of the server 3.

FIG. 7A illustrates an example of the operational flow of the server control unit 331.

When a template registration request is received from the portable device 2 via the server communication unit 31 (Step S200—Yes), the server control unit 331 gives the template registration unit 332 a command to execute processing (Step S202), by using the received template registration request as a parameter.

FIG. 7B illustrates an example of the operational flow of the template registration unit 332.

The template registration unit 332 stores the template included in the received template registration request in the server storage unit 32 (Step S220). Then, the template registration unit 332 terminates processing.

On the other hand, when a request for providing a template list or a template provision request is received from the portable device 2 via the server communication unit 31 (Step S204—Yes), the server control unit 331 gives the template provision unit 333 a command to execute processing (Step S206), by using the received request for providing a template list or the like as a parameter.

FIG. 7C illustrates an example of the operational flow of the template provision unit 333.

When the request for providing a template list is received (Step S230—Yes), the template provision unit 333 obtains a list of templates of players other than the player corresponding to the player ID included in the received request for providing a template list, from the server storage unit 32 (Step S232).

On the other hand, when the template provision request is received (Step S230—No), the template provision unit 333 obtains a template corresponding to the template ID included in the received template provision request, from the server storage unit 32 (Step S234).

The template provision unit 333 sends the obtained template list or the like to the portable device 2 (Step S236). Then, the template provision unit 333 terminates processing.

On the other hand, when a different request is received from the portable device 2 via the server communication unit 31 (Step S204—No), the server control unit 331 executes different processing corresponding to the request (Step S208).

As have been described above, by making the arrangement of facilities changeable by using templates, the usability of city building games is improved, and it becomes possible to continuously attract players to the game.

In the above-described embodiment, the case is described where upon application of a template, facilities are automatically arranged within the game space based on definition in the template. However, it is also possible that when a template is being applied, a mark is displayed on the game space, so that the player can use this mark as approximation and change the types and positions of facilities himself/herself.

Further, besides buildings, walls, fences and so forth, facilities may also include information on types and quantities of soldiers and weapons to fight back against an attack by a different player.

Further, multiple templates may be prepared corresponding to objectives, and the player may be able to select a template depending on the objective. To give specific examples; there are multiple types of soldiers with which a different player attacks, and there may be a template realizing a city that offers strong protection against soldiers with bows and arrows, a template realizing a city that work effectively for protection against attacks by giants, a template that strengthens the protection against air attacks, etc.

Moreover, a characteristic value of each template may be calculated based on the facilities included in the template and the records of battles fought using the template in the game. Further, the characteristic value of the template and characteristics of the template based on the characteristic value may be displayed and presented to the player. Specifically, a defense power may be displayed based on parameters of protective facilities and the number of the protective facilities included in the template; a winning percentage when using the template may be displayed; and characteristic that the template has good defense power and a good winning percentage is displayed based on the defense power and winning percentage included in the templates. Thus, the player can easily understand the characteristics of respective templates and compare the characteristics.

Second Embodiment

In the first embodiment, a single player environment is assumed, wherein a player progresses the game by himself/herself. However, the present invention can also be applied to a multi-player environment wherein multiple players progress the game together. In the present embodiment, multiple players build a city within a single game space, and each player applies templates to a predetermined area within the game space. When a template is applied by a player, the facilities that belong to the player among the facilities arranged within the game space are moved to positions of these facilities defined by the template.

Since the schematic configuration of the game system 1 is the same as illustrated in FIG. 1, a description thereof is omitted.

Figures 8A, 8B:
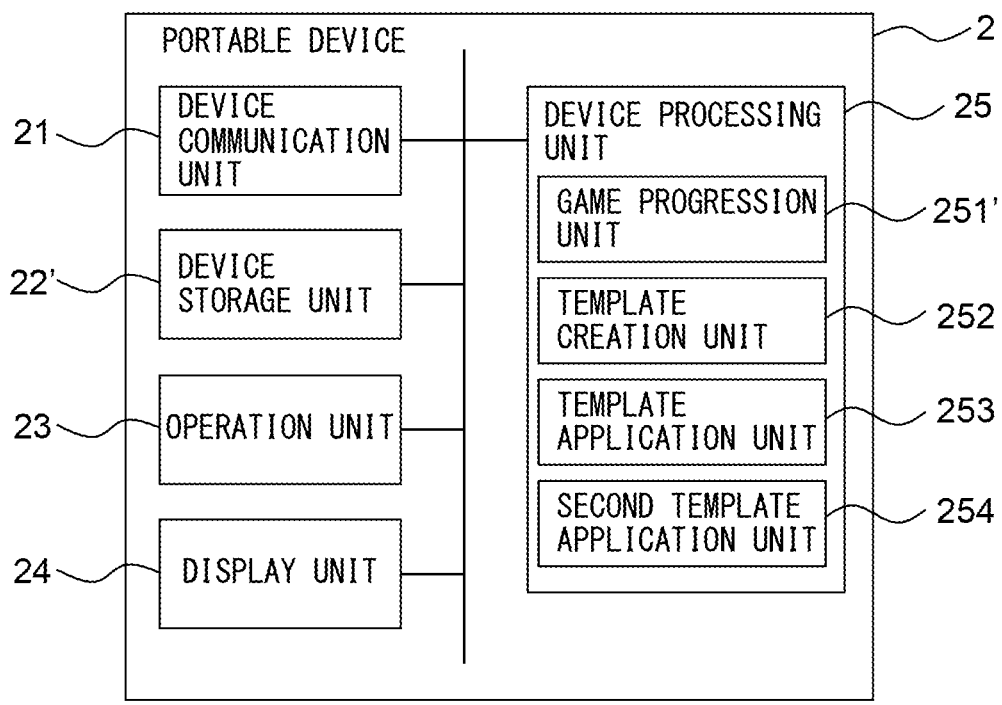
FIG. 8A illustrates an example of a schematic configuration of the portable device according to the second embodiment.
FIG. 8B illustrates an example of a data structure of the facility table.

FIG. 8A illustrates an example of a schematic configuration of the portable device 2.

The portable device 2 progresses the game in response to an operation of an operation unit 23 by a player or a command from a different portable device 2. When necessary, the portable device 2 is connected to the server 3 via the base station 4, the mobile communication network 5, the gateway 6, and the Internet 7, to communicate with the server 3. In order to implement the foregoing functions, the portable device 2 includes a device communication unit 21, a device storage unit 22', the operation unit 23, a display unit 24, and a device processing unit 25.

Since the device communication unit 21, the operation unit 23, and the display unit 24 are the same as illustrated in FIG. 2A, a description thereof is omitted.

The device storage unit 22' includes a semiconductor memory, for example. The device storage unit 22' stores an operating system program, a driver program, an application program, data, etc., used for processing in the device processing unit 25. For example, the device storage unit 22' stores an input device driver program for controlling the operation unit 23 and an output device driver program for controlling the display unit 24, as the driver program. The device storage unit 22' stores a game program, etc., for progressing the game and displaying the result thereof, as the application program. The device storage unit 22' stores player IDs, a facility table (FIG. 8B) for managing facilities arranged within the game space, a facility-type table (FIG. 2C) for managing types of the facilities, a template table (FIG. 2D) for managing templates, and image data, video data, etc., relating to the facilities, templates, etc., as the data. Further, the device storage unit 22' may store temporary data relating to predetermined processing.

FIG. 8B depicts a facility table. In the facility table, for each player, an ID of each facility arranged within the game space by the player, a type ID, a position within the game space, etc., are recorded.

The device processing unit 25 includes one or more processors and their peripheral circuits. The device processing unit 25 is, for example, a CPU, and integrally controls an overall operation of the portable device 2. The device processing unit 25 controls operations of the device communication unit 21, the display unit 24, etc., so that various types of processing of the portable device 2 are executed in an appropriate order in accordance with the programs stored in the device storage unit 22', the operation of the operation unit 23, etc. The device processing unit 25 executes processing based on the programs (the operating system program, the driver program, the application program, etc.) stored in the device storage unit 22'. The device processing unit 25 can execute multiple programs (application programs, etc.) in parallel.

Figure 9:
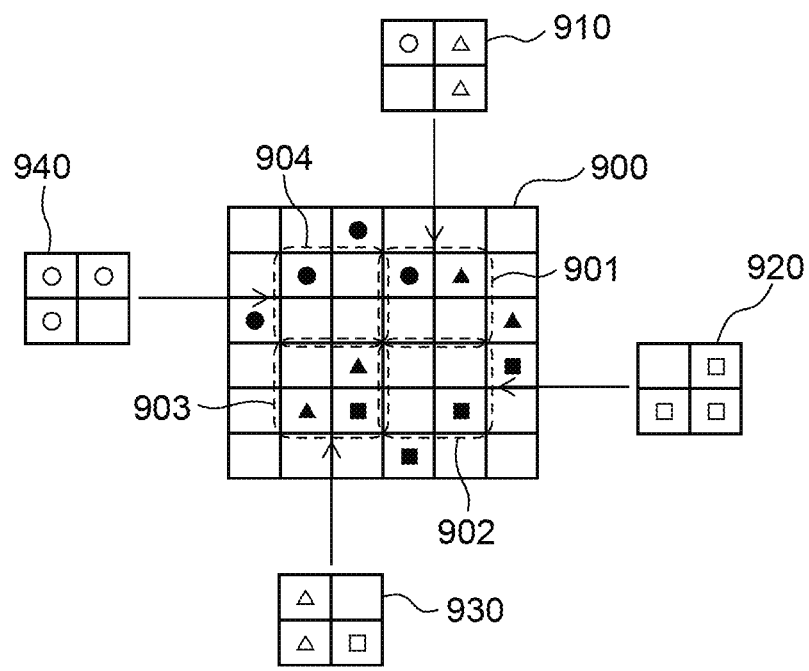
FIG. 9 illustrates a concept of applying a template in a multi-player environment.

FIG. 9 illustrates a concept of applying a template in a multi-player environment.

900 illustrates a game space. Twelve facilities are arranged within the game space 900. Specifically, four facilities illustrated as "black circle", four facilities illustrated as "black triangle", and four facilities illustrated as "black square" are arranged therein. Among these facilities, assume that the one facility illustrated as "black circle" and the two facilities illustrated as "black triangle" arranged in the upper-right three by three squares are those of a $player_1$. Further, assume that the three facilities illustrated as "black square" arranged in the lower-right three by three squares are those of a $player_2$, the two facilities illustrated as "black triangle" and the one facility illustrated as "black square" arranged in the lower-left three by three squares are those of a $player_3$, and the three facilities illustrated as "black circle" arranged in the upper-left three by three squares are those of a $player_4$.

Assume that a template 910 has been applied to an area 901 within the game space 900 by the $player_1$. Similarly, assume that templates 920 to 940 have been applied to areas 902 to 904 by the $player_2$ to $player_4$, respectively. In relation to the $player_1$, the number of types of facilities and the number of facilities in each type arranged within the game space 900 are equal to the number of types of facilities and the number of facilities in each type, respectively, positions of the facilities being defined by the template 910. Thus, all facilities of the $player_1$ are moved to positions of facilities as defined by the template 910. Similarly, all facilities of the $player_2$ to $player_4$ are moved to positions of facilities as defined by the templates 920 to 940, respectively. 900' illustrates the game space 900 after all the facilities have been moved.

In order to achieve the above-described functions, the device processing unit 25 includes a game progression unit 251', a template creation unit 252, a template application unit 253, and a second template application unit 254. All of these units are functional modules implemented by a program executed on a processor provided in the device processing unit 25. Alternatively, these units may also be provided as firmware on the portable device 2.

Since the template creation unit 252 and the template application unit 253 are the same as illustrated in FIG. 2A, a description thereof is omitted.

In the following, processing by the game progression unit 251' will be described.

The game progression unit 251' controls the start and progression of the game, and appropriately gives commands to execute processing to the template creation unit 252, template application unit 253, second template application unit 254, etc.

Specifically, when a command to start the game is given by the player via the operation unit 23, the game progression unit 251' displays the game progression screen 300.

When a command to create a template is given by the player via the operation unit 23, the game progression unit 251' gives a command to execute processing to the template creation unit 252.

When a command to apply a template is given by the player via the operation unit 23, the game progression unit 251' gives a command to execute processing to the template application unit 253.

When a template application command is received from a different portable device 2 via the device communication unit 21, the game progression unit 251' gives the second template application unit 254 a command to execute processing, by using the received template application command as a parameter.

When a command to execute different processing is given by the player via the operation unit 23, the game progression unit 251' executes the different processing.

In the following, processing by the second template application unit 254 will be described.

The second template application unit 254 obtains a template from the server 3, and applies the obtained template.

Specifically, the second template application unit 254 obtains a template from the server 3.

In other words, the second template application unit 254 interprets the received template application command, and specifies the ID of the player, the ID of the template, and the coordinates of the area to which the template is to be applied. Further, the second template application unit 254 sends a template provision request via the device communication unit 21 to the server 3 by using the specified template ID as a parameter. Further, the second template application unit 254 receives thumbnail image data of a corresponding template, as well as the type ID and position of each facility from the server 3 via the device communication unit 21. The second template application unit 254 then stores the received thumbnail image data in the device storage unit 22'. Further, the second template application unit 254 stores the ID of the specified template, the file name of the stored thumbnail image data, the received type ID and position of each facility, etc., in the template table stored in the device storage unit 22'.

The second template application unit 254 applies the obtained template.

In other words, the second template application unit 254 refers to the facility table stored in the device storage unit 22' by using the ID of the specified player as key, and extracts an ID, a type ID and a position within the game space of each facility of the corresponding player. The second template application unit 254 counts the number of extracted types of facilities and the number of facilities in each type. The second template application unit 254 further refers to the template table stored in the device storage unit 22' by using the ID of the specified template as key, and extracts a type ID and a position within the template of each facility in the corresponding template. The second template application unit 254 counts the number of extracted types of facilities and the number of facilities in each type. Moreover, the second template application unit 254 converts the extracted positions within the template to positions within the game space based on coordinates of the specified area. For each type of facility, the second template application unit 254 compares the number of facilities of this type within the game space and the number of facilities of this type within the template, and, according to the result, moves the facilities of this type within the game space to the positions of the facilities of this type within the template.

Then, the second template application unit 254 terminates the processing.

Since the schematic configuration of the server 3 is the same as illustrated in FIG. 5A, a description thereof is omitted.

Figure 10A:
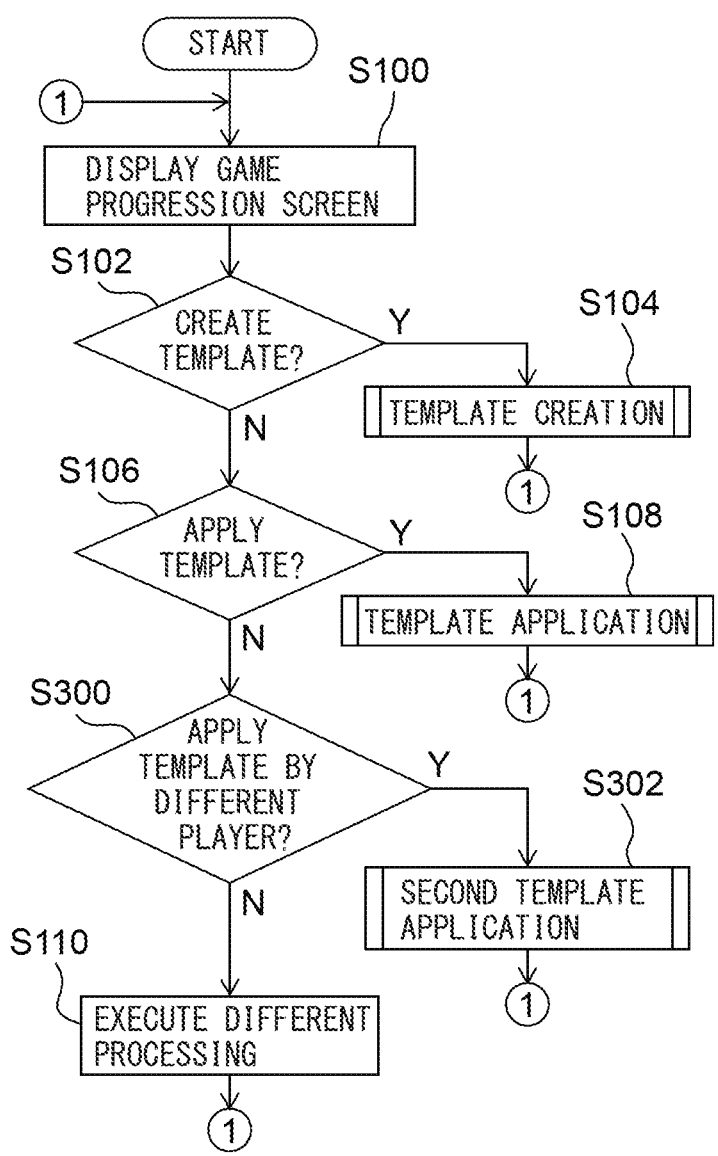
FIGS. 10A and 10B illustrate examples of the operational flow of the portable device.
Figure 10B:
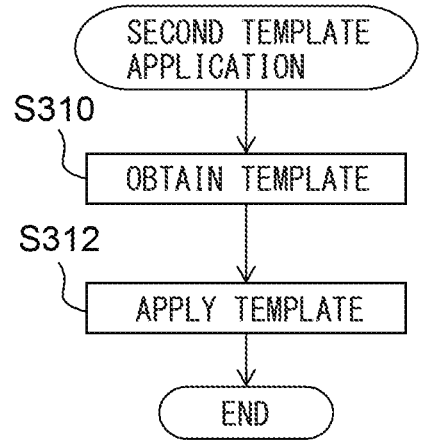

FIGS. 10A and 10B illustrate examples of the operational flow of the portable device 2.

The below-described operational flow is executed, based on a program that is stored in advance in the device storage unit 22', mostly by the device processing unit 25 by working together with each component of the portable device 2.

FIG. 10A illustrates an example of the operational flow of the game progression unit 251'.

Since Steps S100 to S108 are the same as illustrated in FIG. 6A, a description thereof is omitted.

When a template application command is received from a different portable device 2 via the device communication unit 21 (Step S300—Yes), the game progression unit 251' gives the second template application unit 254 a command to execute processing, by using the received template application command as a parameter (Step S302).

FIG. 10B illustrates an example of the operational flow of the second template application unit 254.

The second template application unit 254 obtains a template corresponding to the template ID included in the received template application command, from the server 3 (Step S310).

The second template application unit 254 applies the obtained template (Step S312). Then, the second template application unit 254 terminates the processing.

On the other hand, when a command for different processing is given by the player via the operation unit 23 (Step S300—No), the game progression unit 251' executes the different processing (Step S110).

As have been described above, by allowing each player to change the arrangement of facilities by using templates in a multi-player environment, the usability of city building games is improved, and it becomes possible to continuously attract players to the game.

It should be noted that the present invention is not limited to the above-described embodiment. For example, in the above-described embodiment, in order to combine multiple templates to create a single template, it is assumed that a player applies multiple templates to predetermined areas within the game space, or multiple players apply a template each to predetermined areas within the game space, and then a template for a predetermined area that encompasses all these areas is created. However, a player may designate multiple templates or multiple players may designate a template each, and then a template may be created by directly joining these templates.

Figure 11:
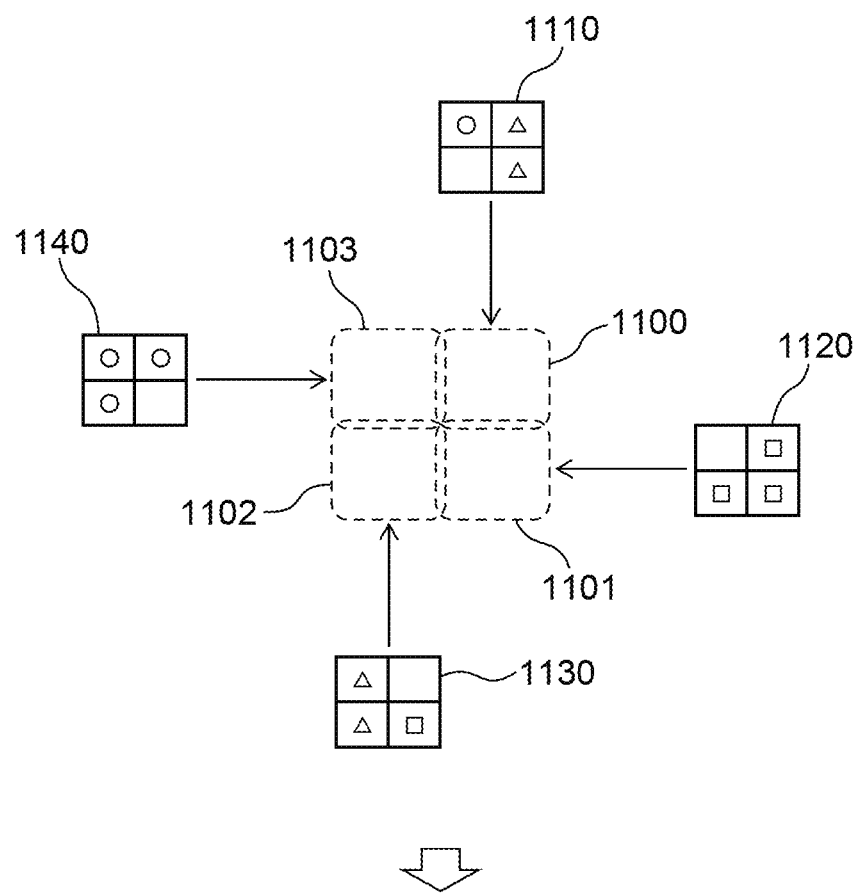
FIG. 11 illustrates a concept of combining templates in a multi-player environment.

FIG. 11 illustrates a concept of combining templates in a multi-player environment.

Assume that the player$_1$ has specified a template 1110 for an area 1100. Further, assume that the player$_2$ to player$_4$ have specified templates 1120 to 1140 for areas 1101 to 1103, respectively. 1150 illustrates a template obtained by combining the templates 1110 to 1140.

In order to achieve the above-described functions, the portable device 2 may perform processing as described below.

When a command to create a template is given by the player via the operation unit 23, the portable device 2 displays a predetermined screen and receives designations of template and area. In the same manner, the portable device 2 receives designations of template and area from a different portable device 2. Then, the portable device 2 obtains the designated templates from the device storage unit 22 or the server 3, and creates a new template by arranging the obtained templates on the designated areas.

In other words, the portable device 2 corrects the position of each facility defined by the obtained templates based on the coordinates specified by the designated areas. The portable device 2 then stores the type ID and corrected position, etc., of each facility defined by the obtained templates, in the template table stored in the device storage unit 22 under a newly assigned template ID.

Third Embodiment

In the above-described embodiment, it is assumed that templates are created by the player. However, preexisting templates may also be distributed by a server or the like. In the present embodiment, a preexisting template is distributed by a server depending on an event (e.g., protecting the city from an enemy character) happening in the city building game. The player applies the template distributed by the server, to a predetermined area within his/her own game space, moves and adds facilities as necessary, and thus prepares for the event. After a certain time has passed, the event happens, and the player is given various rewards (e.g., templates, facilities, etc.) depending on the outcome. Such a template can also be understood as a task given to the player in an event.

Since the schematic configuration of the game system 1 is the same as illustrated in FIG. 1, a description thereof is omitted.

Figure 12:
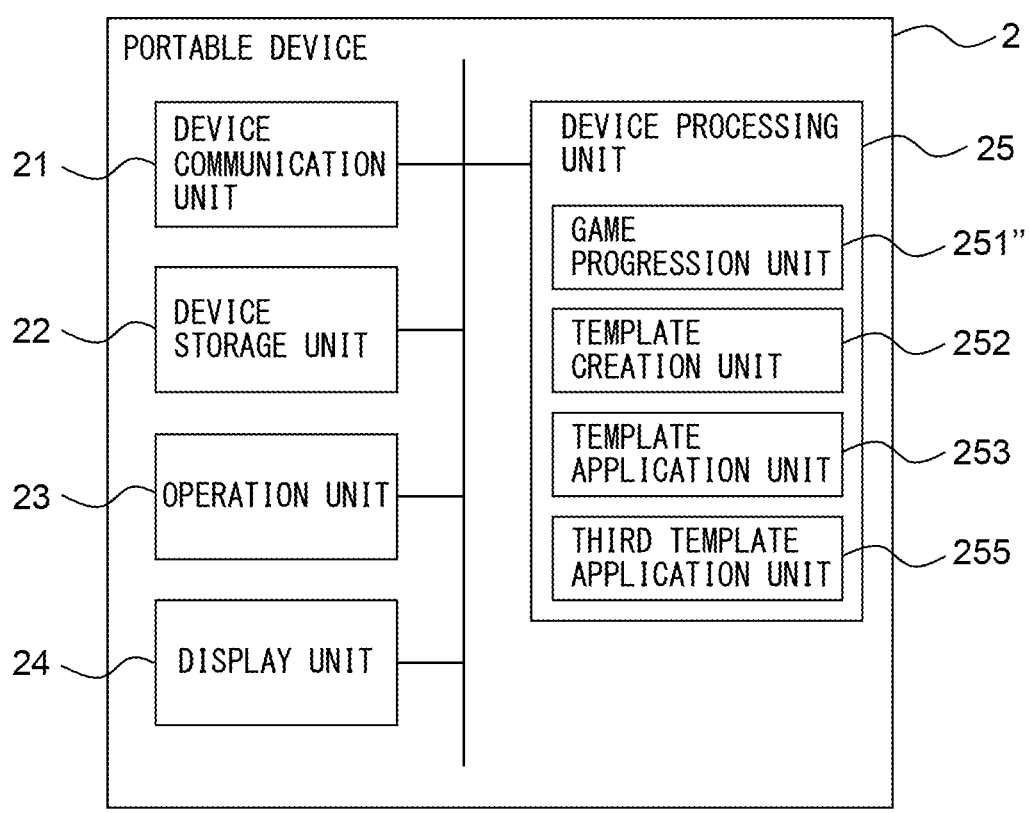
FIG. 12 illustrates an example of a schematic configuration of the portable device according to the third embodiment.

FIG. 12 illustrates an example of a schematic configuration of the portable device 2.

The portable device 2 progresses the game in response to an operation of an operation unit 23 by a player. When necessary, the portable device 2 is connected to the server 3 via the base station 4, the mobile communication network 5, the gateway 6, and the Internet 7, to communicate with the server 3. In order to implement the foregoing functions, the portable device 2 includes a device communication unit 21, a device storage unit 22, the operation unit 23, a display unit 24, and a device processing unit 25.

Since the device communication unit 21, the device storage unit 22, the operation unit 23, and the display unit 24 are the same as illustrated in FIG. 2A, a description thereof is omitted.

The device processing unit 25 includes one or more processors and their peripheral circuits. The device processing unit 25 is, for example, a CPU, and integrally controls an overall operation of the portable device 2. The device processing unit 25 controls operations of the device communication unit 21, the display unit 24, etc., so that various types of processing of the portable device 2 are executed in an appropriate order in accordance with the programs stored in the device storage unit 22, the operation of the operation unit 23, etc. The device processing unit 25 executes processing based on the programs (the operating system program, the driver program, the application program, etc.)

stored in the device storage unit 22. The device processing unit 25 can execute multiple programs (application programs, etc.) in parallel.

The device processing unit 25 includes a game progression unit 251", a template creation unit 252, a template application unit 253, and a third template application unit 255. All of these units are functional modules implemented by a program executed on a processor provided in the device processing unit 25. Alternatively, these units may also be provided as firmware on the portable device 2.

Since the template creation unit 252 and the template application unit 253 are the same as illustrated in FIG. 2A, a description thereof is omitted.

In the following, processing by the game progression unit 251" will be described.

The game progression unit 251" controls the start and progression of the game, and appropriately gives commands to execute processing to the template creation unit 252, template application unit 253, third template application unit 255, etc.

Specifically, when a command to start the game is given by the player via the operation unit 23, the game progression unit 251" displays the game progression screen 300.

When a command to create a template is given by the player via the operation unit 23, the game progression unit 251" gives a command to execute processing to the template creation unit 252.

When a command to apply a template is given by the player via the operation unit 23, the game progression unit 251" gives a command to execute processing to the template application unit 253.

When an event start report is received from the server 3 via the device communication unit 21, the game progression unit 251" gives the third template application unit 255 a command to execute processing, by using the received event start report as a parameter.

When a command to execute different processing is given by the player via the operation unit 23, the game progression unit 251" executes the different processing.

In the following, processing by the third template application unit 255 will be described.

The third template application unit 255 obtains a template for an event from the server 3, and applies the obtained template.

Specifically, the third template application unit 255 obtains a template for an event from the server 3.

In other words, the third template application unit 255 interprets the received event start report, and specifies the ID of the event. Further, when a command to participate in an event is given by the player via the operation unit 23, the third template application unit 255 sends an event participation request via the device communication unit 21 to the server 3 by using the player ID and the specified event ID as parameters. Further, the third template application unit 255 receives an ID and thumbnail image data of a template for the corresponding event, as well as the type ID and position of each facility from the server 3 via the device communication unit 21. The third template application unit 255 then stores the received thumbnail image data in the device storage unit 22. Further, the third template application unit 255 stores the ID of the received template, the file name of the stored thumbnail image data, the received type ID and position of each facility, etc., in the template table stored in the device storage unit 22.

The third template application unit 255 applies the obtained template.

In other words, the third template application unit 255 refers to the facility table stored in the device storage unit 22, and extracts an ID, a type ID and a position within the game space of each facility. The third template application unit 255 counts the number of extracted types of facilities and the number of facilities in each type. The third template application unit 255 further refers to the template table stored in the device storage unit 22 by using the ID of the received template as key, and extracts a type ID and a position within the template of each facility in the corresponding template. The third template application unit 255 counts the number of extracted types of facilities and the number of facilities in each type. Moreover, the third template application unit 255 converts the extracted positions within the template to positions within the game space based on coordinates of the area selected by the player via the operation unit 23. For each type of facility, the third template application unit 255 compares the number of facilities of this type within the game space and the number of facilities of this type within the template, and, according to the result, moves the facilities of this type within the game space to the positions of the facilities of this type within the template.

Then, the third template application unit 255 terminates the processing.

FIG. 13A illustrates one possible schematic configuration of the server 3.

In response to requests from the portable device 2, the server 3 registers and provides templates. Further, the server 3 manages events and provides templates. In order to achieve such functions, the server 3 is provided with a server communication unit 31, a server storage unit 32', and a server processing unit 33.

Since the server communication unit 31 is the same as illustrated in FIG. 5A, a description thereof is omitted.

The server storage unit 32' includes at least one of a magnetic tape device, a magnetic disk device and an optical disk device, for example. The server storage unit 32' stores an operating system program, a driver program, an application program, data, etc., used for processing in the server processing unit 33. The server storage unit 32' stores, for example, a game control program, etc., for registering and providing templates and managing events, as the application program. The server storage unit 32' stores a player table (FIG. 5B) for managing players, a template table (FIG. 5C) for managing templates, an event table for managing events (FIG. 13B), and image data, video data, etc., relating to the players, templates, etc., as the data. Further, the server storage unit 32' may store temporary data relating to certain processing.

FIG. 13B depicts an event table. In the event table, an event ID, starting date and time, an ID of a template to be used, an ID of a participating player, etc., are recorded for each event.

The server processing unit 33 includes one or more processors and their peripheral circuits. The server processing unit 33 is, for example, a CPU, and integrally controls an overall operation of the server 3. The server processing unit 33 controls an operation of the server communication unit 31 or the like so that various types of processing of the server 3 are executed in an appropriate order in accordance with the programs stored in the server storage unit 32'. The server processing unit 33 executes processing based on the programs stored in the server storage unit 32' (the operating system program, the driver program, the application program, etc.). The server processing unit 33 can execute the multiple programs (the application program, etc.) in parallel.

The server processing unit 33 includes a server control unit 331', a template registration unit 332, a template provision unit 333, and an event management unit 334. Each of the units is a functional module implemented by a program to be executed by the processor included in the server processing unit 33. Alternatively, each of the units may be provided as a firmware on the server 3.

Since the template registration unit 332 and the template provision unit 333 are the same as illustrated in FIG. 5A, a description thereof is omitted.

In the following, processing by server control unit 331' will be described.

The server control unit 331' controls the performance of the server and appropriately gives commands to execute processing to the template registration unit 332, template provision unit 333, event management unit 334, etc.

Specifically, when a template registration request is received from the portable device 2 via the server communication unit 31, the server control unit 331' gives the template registration unit 332 a command to execute processing, by using the received template registration request as a parameter.

When a request for providing a template list or a template provision request is received from the portable device 2 via the server communication unit 31, the server control unit 331' gives the template provision unit 333 a command to execute processing, by using the received request for providing a template list or the like as a parameter.

When there is an event whose starting date and time has passed, the server control unit 331' gives the event management unit 334 a command to execute processing, by using the event ID as a parameter.

In other words, the server control unit 331' refers to the event table stored in the server storage unit 32', and extracts an ID and starting date and time of each event. Further, the server control unit 331' obtains the current date and time from a clock (not illustrated). When there is an event whose starting date and time is before the obtained current date and time, the server control unit 331' gives the event management unit 334 a command to execute processing, by using the event ID as a parameter.

When an event participation request is received from the portable device 2 via the server communication unit 31, the server control unit 331' gives the event management unit 334 a command to execute processing, by using the received event participation request as a parameter.

When a different request is received from the portable device 2 via the server communication unit 31, the server control unit 331' executes different processing corresponding to the request.

In the following, processing by the event management unit 334 will be described.

The event management unit 334 sends an event start report to the portable device 2. Further, the event management unit 334 obtains a template for an event from the server storage unit 32', and sends the obtained template to the portable device 2.

Specifically, when an event ID has been received, the event management unit 334 sends an event start report to the portable device 2.

In other words, the event management unit 334 refers to the player table stored in the server storage unit 32', and specifies players. Then, the event management unit 334 sends an event start report via the server communication unit 31 to the portable device 2 of each of the specified players, by using the received event ID as a parameter.

Then, the event management unit 334 terminates the processing.

On the other hand, when an event participation request has been received, the event management unit 334 makes the player participate in the corresponding event.

Specifically, the event management unit 334 interprets the received event participation request, and specifies the ID of the event and the ID of the player. The event management unit 334 then refers to the event table stored in the server storage unit 32' by using the specified event ID as key, and stores the specified player ID as an ID of a player participating in the corresponding event.

The event management unit 334 obtains a template for the corresponding event from the server storage unit 32'.

Specifically, the event management unit 334 refers to the event table stored in the server storage unit 32' by using the specified event ID as key, and extracts an ID of a template for the corresponding event. Then, the event management unit 334 refers to the template table stored in the server storage unit 32' by using the extracted template ID as key, and extracts a file name of thumbnail image data for the corresponding template, as well as the type ID and position of each facility. Further, the event management unit 334 obtains thumbnail image data corresponding to the extracted file name, from the server storage unit 32'.

The event management unit 334 sends the obtained template to the portable device 2.

In other words, the event management unit 334 sends the thumbnail image data of the template as well as the type ID and position of each facility that are obtained or the like, to the portable device 2 via the server communication unit 31.

Then, the event management unit 334 terminates the processing.

FIGS. 14A and 14B illustrate examples of the operational flow of the portable device 2.

The below-described operational flow is executed, based on a program that is stored in advance in the device storage unit 22, mostly by the device processing unit 25 by working together with each component of the portable device 2.

FIG. 14A illustrates an example of the operational flow of the game progression unit 251".

Since Steps S100 to S108 are the same as illustrated in FIG. 6A, a description thereof is omitted.

When an event start report is received from the server 3 via the device communication unit 21 (Step S400—Yes), the game progression unit 251" gives the third template application unit 255 a command to execute processing, by using the received event start report as a parameter (Step S402).

FIG. 14B illustrates an example of the operational flow of the third template application unit 255.

The third template application unit 255 obtains a template for an event from the server 3, and applies the obtained template (Step S410).

The third template application unit 255 applies the obtained template (Step S412). Then, the third template application unit 255 terminates the processing.

On the other hand, when a command for different processing is given by the player via the operation unit 23 (Step S400—No), the game progression unit 251" executes the different processing (Step S110).

Figure 15C:
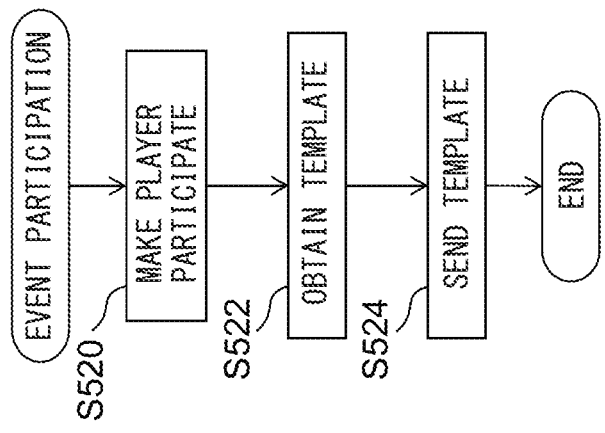
FIGS. 15A to 15C illustrate examples of the operational flow of the server.
Figure 15B:
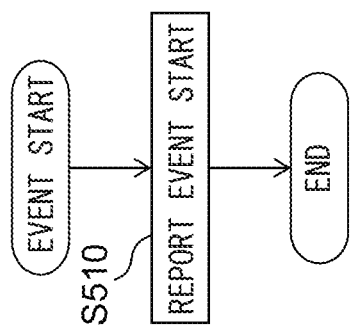
Figure 15A:
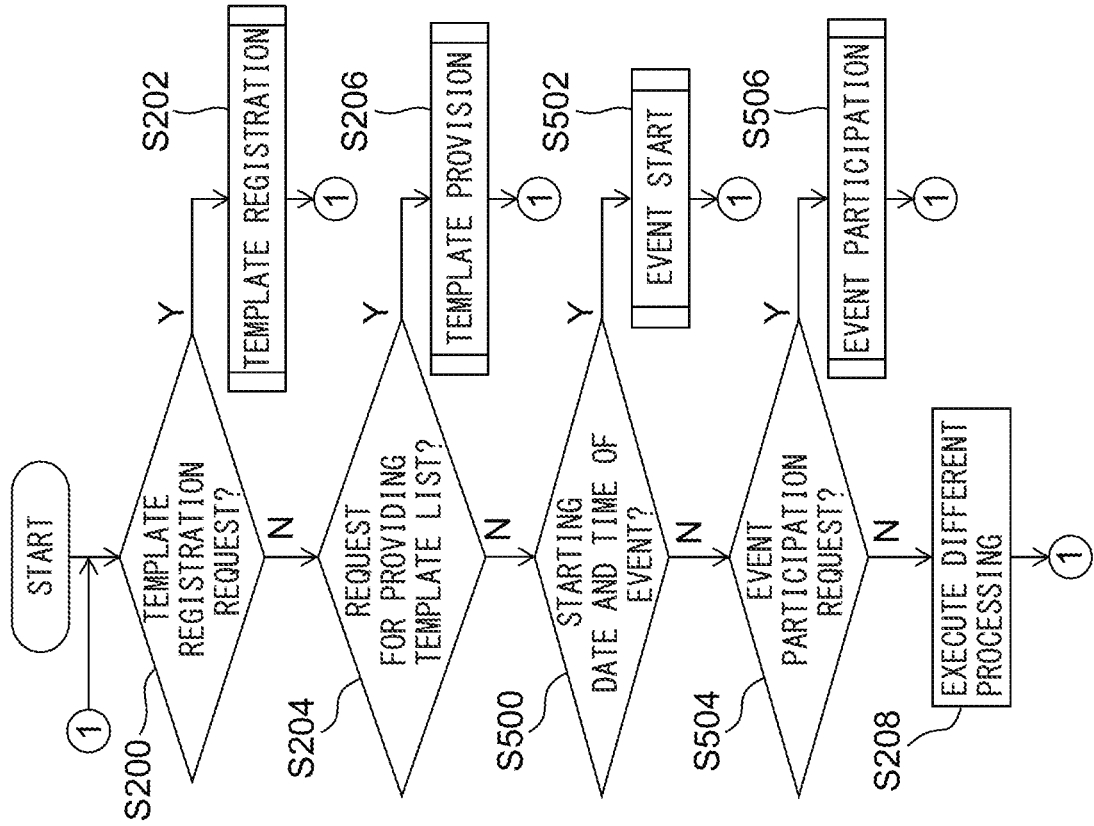

FIGS. 15A to 15C illustrate examples of the operational flow of the server 3.

The below-described operational flow is executed, based on a program that is stored in advance in the server storage unit 32', mostly by the server processing unit 33 by working together with each component of the server 3.

FIG. 15A illustrates an example of the operational flow of the server control unit 331'.

Since Steps S200 to S206 are the same as illustrated in FIG. 7A, a description thereof is omitted.

When there is an event whose starting date and time has passed (Step S500—Yes), the server control unit 331' gives the event management unit 334 a command to execute processing, by using the event ID as a parameter (Step S502).

FIG. 15B illustrates an example of the operational flow of the event management unit 334.

When an event ID has been received, the event management unit 334 sends an event start report to the portable device 2 (Step S510). Then, the event management unit 334 terminates the processing.

On the other hand, when an event participation request is received from the portable device 2 via the server communication unit 31 (Step S504—Yes), the server control unit 331' gives the event management unit 334 a command to execute processing, by using the received event participation request as a parameter (Step S506).

FIG. 15C illustrates another example of the operational flow of the event management unit 334.

When an event participation request has been received, the event management unit 334 makes the player participate in the corresponding event. (Step S520).

The event management unit 334 obtains a template for the corresponding event from the server storage unit 32' (Step S522).

The event management unit 334 sends the obtained template to the portable device 2 (Step S524). Then, the event management unit 334 terminates the processing.

On the other hand, when a different request is received from the portable device 2 via the server communication unit 31 (Step S504—No), the server control unit 331' executes different processing corresponding to the request (Step S208).

As have been described above, by making preexisting templates distributable, it becomes possible to make an event happen in accordance with the arrangement of facilities, which increases the attractiveness of city building games, and makes it possible to continuously attract players to the game.

It should be noted that the present invention is not limited to the above-described embodiment. For example, in the above-described embodiment, it is assumed that a preexisting template is distributed depending on occurrence of an event. But templates may not only be used when an event is happening. During a so-called tutorial that is meant to teach players how to play by arranging various facilities, templates with arrangements for different intended uses, such as balance type, resource protecting type, and so forth may be provided.

Further, in the above-described embodiment, the creation and application of a template are performed by the portable device 2. However, the creation and application may also be performed by the server 3. In this case, the server 3 may store facilities arranged within the game space for each player, and in response to commands by the player, create and/or apply a template to a predetermined area within the game space of the player.

Further, while the above-described embodiment is described by an example wherein positions of facilities are changed based on definition in the template, the types of facilities may be changed.

Further, types are not limited to buildings, walls, fences and so forth, and any other game items such as soldiers and weapons to fight back against an attack by a different player may be applicable.

A computer program for causing a computer to execute the respective functions of the device processing unit 25 and the server processing unit 33 may be provided in a form recorded on a non-transitory computer-readable recording medium such as a semiconductor recording medium, a magnetic recording medium and an optical recording medium, and may be installed on the device storage unit 22 and the server storage unit 32 from the recording medium by using a known set-up program, etc.

The preceding description has been presented only to illustrate and describe exemplary embodiments of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

The invention claimed is:

1. A method for controlling a computer, the method comprising:
   executing a game by arranging, responsive to a game-content-arrangement command from a user, a plurality of game contents within a first game space to increase a number of the game contents arranged within the first game space, the game contents including at least game contents for defending from an attack from another user within the first game space;
   creating, responsive to a template-creation command from the user, based on types and positions of the game contents arranged within the first game space, a template for defending the attack from another user, the template defining the game contents and respective positions of the game contents;
   transmitting a first parameter for reproducing the created template to a server; and
   applying, responsive to a user's selection of a first button, the created template on a second game space of the user, the second game space being different from the first game space, at least one game content having been arranged within the second game space before the template is applied,
   wherein the applying includes arranging game contents within the second game space based on the respective positions of the game contents defined by the template.

2. The method of claim 1, wherein the applying comprises, when a number of the game contents included in the created template is identical to a number of the game contents arranged within the second game space before the template is applied, arranging within the second game space the game contents at positions defined by the template.

3. The method of claim 1, wherein the applying comprises, when at least part of the game contents, arranged within the second game space before the template is applied, is not included in the created template, storing the game contents not included in the created template at a virtual warehouse.

4. The method of claim 1, wherein the server is configured to transmit, based on the first parameter, a second parameter for reproducing the created template at a terminal device different from the computer in which the template is created.

5. The method of claim 1, further comprising applying the created template on game space selected among the first game space, the second game space and a third game space different from the first game space and from the second game space.

6. The method of claim 1, further comprising receiving an event start notification relating to an event defending the second game space from enemy character.

7. The method of claim 1, wherein the computer is a mobile phone.

8. The method of claim 1, further comprising transmitting a thumbnail corresponding to the created template to the server, the thumbnail being to be transmitted to and displayed on a terminal device different from the computer in which the template is created.

9. A non-transitory computer readable medium having stored thereon a program that when executed by a computer causes the computer to implement a method for controlling a computer, the method comprising:
  executing a game by arranging, responsive to a game-content-arrangement command from a user, a plurality of game contents within a first game space to increase a number of the game contents arranged within the first game space, the game contents including at least game contents for defending from an attack from another user within the first game space;
  creating, responsive to a template-creation command from the user, based on types and positions of the game contents arranged within the first game space, a template for defending the attack from another user, the template defining the game contents and respective positions of the game contents;
  transmitting a first parameter for reproducing the created template to a server; and
  applying, responsive to a user's selection of a first button, the created template on a second game space of the user, the second game space being different from the first game space, at least one game content having been arranged within the second game space before the template is applied,
  wherein the applying includes arranging game contents within the second game space based on the respective positions of the game contents defined by the template.

10. The non-transitory computer readable medium of claim 9, wherein the applying comprises, when a number of the game contents included in the created template is identical to a number of the game contents arranged within the second game space before the template is applied, arranging within the second game space the game contents at positions defined by the template.

11. The non-transitory computer readable medium of claim 9, wherein the applying comprises, when at least part of the game contents, arranged within the second game space before the template is applied, is not included in the created template, storing the game contents not included in the created template at a virtual warehouse.

12. The non-transitory computer readable medium of claim 9, wherein the server is configured to transmit, based on the first parameter, a second parameter for reproducing the created template at a terminal device different from the computer in which the template is created.

13. The non-transitory computer readable medium of claim 9, further comprising applying the created template on game space selected among the first game space, the second game space and a third game space different from the first game space and from the second game space.

14. The non-transitory computer readable medium of claim 9, further comprising receiving an event start notification relating to an event defending the second game space from enemy character.

15. The non-transitory computer readable medium of claim 9, wherein the computer is a mobile phone.

16. The non-transitory computer readable medium of claim 9, further comprising transmitting a thumbnail corresponding to the created template to the server, the thumbnail being to be transmitted to a terminal device different from the computer in which the template is created.

17. A computer comprising:
  processing circuitry; and
  memory, wherein the memory stores instructions that when executed by the processing circuitry causes the processing circuitry to be configured to
  execute a game by arranging, responsive to a game-content-arrangement command from a user, a plurality of game contents within a first game space to increase a number of the game contents arranged within the first game space, the game contents including at least game contents for defending from an attack from another user within the first game space,
  create, responsive to a template-creation command from the user, based on types and positions of the game contents arranged within the first game space, a template for defending the attack from another user, the template defining the game contents and respective positions of the game contents,
  transmit a first parameter for reproducing the created template to a server, and
  apply, responsive to a user's selection of a first button, the created template on a second game space of the user, the second game space being different from the first game space, at least one game content having been arranged within the second game space before the template is applied,
  wherein the processing circuitry is configured to apply by being configured to arrange game contents within the second game space based on the respective positions of the game contents defined by the template.

18. The computer of claim 17, wherein the instructions further causes the processing circuitry to be configured to transmit a thumbnail corresponding to the created template to the server, the thumbnail being to be transmitted to a terminal device different from the computer in which the template is created.

* * * * *